US011003335B2

(12) United States Patent
Gottlieb

(10) Patent No.: US 11,003,335 B2
(45) Date of Patent: May 11, 2021

(54) SYSTEMS AND METHODS FOR FORMING GROUP COMMUNICATIONS WITHIN AN ONLINE EVENT

(71) Applicant: Steven M. Gottlieb, New York, NY (US)

(72) Inventor: Steven M. Gottlieb, New York, NY (US)

(73) Assignee: Shindig, Inc., New York, NY (US)

( * ) Notice: Subject to any disclaimer, the term of this patent is extended or adjusted under 35 U.S.C. 154(b) by 102 days.

(21) Appl. No.: 15/918,573

(22) Filed: Mar. 12, 2018

(65) Prior Publication Data

US 2018/0203587 A1    Jul. 19, 2018

Related U.S. Application Data

(63) Continuation of application No. 14/547,973, filed on Nov. 19, 2014, now Pat. No. 9,952,751, which is a continuation-in-part of application No. 14/255,475, filed on Apr. 17, 2014, now abandoned, and a continuation-in-part of application No. 14/255,597, filed on Apr. 17, 2014, now abandoned.

(51) Int. Cl.
*G06F 3/0484* (2013.01)
*G06F 3/0482* (2013.01)
*H04L 29/06* (2006.01)
*H04N 7/15* (2006.01)
*H04L 12/18* (2006.01)

(52) U.S. Cl.
CPC ........ *G06F 3/04842* (2013.01); *G06F 3/0482* (2013.01); *H04L 12/1827* (2013.01); *H04L 65/4038* (2013.01); *H04N 7/15* (2013.01)

(58) Field of Classification Search
CPC .... G06Q 10/10; G06Q 10/109; G06F 3/0481; H04L 29/06; H04L 29/06034
See application file for complete search history.

(56) References Cited

U.S. PATENT DOCUMENTS

| 2011/0252359 | A1* | 10/2011 | England | G06F 9/451 715/781 |
| 2011/0271211 | A1* | 11/2011 | Jones | H04M 3/567 715/753 |
| 2016/0142495 | A1* | 5/2016 | Lin | H04L 51/36 709/204 |

* cited by examiner

*Primary Examiner* — Toan H Vu
(74) *Attorney, Agent, or Firm* — Robert W. Morris; Eckert Seamans Cherin & Mellott, LLC

(57) ABSTRACT

Systems, methods, and devices for combining user communications are described herein. In some embodiments, indicators corresponding to online participants accessing an online event are provided on a user interface. An input selecting one of the indicators may be detected from an online participant, and a merged display of the selected indicator and the indicator of the online participant who made the selection may be presented on the user interface. In response to the input, a communications link between the online participants of the merged display may be created. The communication link may allow transmission of reception of prioritized communication between the online participants of the merged display.

21 Claims, 36 Drawing Sheets

SYSTEMS AND METHODS FOR FORMING GROUP COMMUNICATIONS WITHIN AN ONLINE EVENT

CROSS-REFERENCE TO RELATED APPLICATIONS

This application is a continuation of U.S. patent application Ser. No. 14/547,973, filed on Nov. 19, 2014, which is a continuation-in-part of U.S. patent application Ser. No. 14/255,597, filed on Apr. 17, 2014, which is co-pending with U.S. patent application Ser. No. 14/255,475. The disclosures of each of these applications are incorporated herein by reference in their entireties.

FIELD OF THE INVENTION

This generally relates to systems and methods for integrating in-person and online aspects of an event into a seamless event experience. This also generally relates to systems and methods for providing a composite audience view. This further relates, generally, to systems and methods for forming group communications within an online event.

BACKGROUND OF THE INVENTION

With internet capabilities becoming more and more robust, events such as lectures and presentations, may now be accessed remotely instead of solely being in-person experiences. For example, events that typically were only accessible to individuals who purchased tickets to view the event live, now may also include an online portion. In fact, some events have moved to be solely online experiences, with all participants and the host remotely logging into the event. Individuals may now have the ability to access live events from the comfort of their own home via their user device (e.g., laptop, desktop, mobile device, etc.).

Although events may be accessed by individuals both in-person and online, integrating these two aspects may raise various difficulties. For instance, online participants often are not able to interact with the event in the same manner as individuals who are physically present at the event. For example, students in a classroom may raise their hand to ask a teacher a question, whereas online participants of the classroom may not. Students accessing the class remotely may be at a disadvantage because they may not be able to interact with the teacher and/or other students of the class in the same manner as those who are physically present in the classroom.

Thus, it would be beneficial for there to be systems and methods that integrate online participants into a live event seamlessly so that they may interact and experience the event as if they were physically present.

With these abilities now affordable to online participants accessing online events, the number of online participants has also vastly increased. This can make organizing and tracking all of the online participants a much more complex task due to the large number of online participants. There are a variety of ways that a host of an event may manage the online participants. For example, each online participant may have a corresponding indicator that may be displayed on the host's device, which the host may place within various groups, select to be spotlighted, or perform a myriad of other options with. However, as the number of online participants grow, the ability to display an indicator for each online participant on a single display screen becomes especially difficult. As another example, a random sampling of online participants may be displayed on the host's device. However, this approach also has inherent drawbacks because the host may not be able to recognize one or more individuals attempting to interact with the event because their corresponding indicator(s) may not be visible to the host because they may not be included within the current random sample of participants.

Thus, it would be beneficial for there to be systems and methods that allow a host to monitor and manage indicators corresponding to a large amount of online participants of an event that allows the participants to easily interact with any attendees of the event, presenters of the event, and/or other online participants accessing the event.

Often times within online events, online participants may desire to form groups including one or more additional online participants. Typically, this is performed by creating a "room" where participants may congregate such that communications of the individuals within the room are prioritized over communications from others. However, this may provide drawbacks to individuals who desire to be in a small group or conversation with only a select few participants, or for individuals who may not want to privately communicate with every participant who has entered the room. Furthermore, participants located within a specific room may decide that they would like to form an additional subgroup within the room including one or more participants from the room, which in typical scenarios may require a separate room to be formed for the participants to then transfer to.

Thus, it would be beneficial for there to be systems and methods that allow users to form group communications directly by selecting particular participants from an online event to form the group with.

SUMMARY OF THE INVENTION

Systems, methods, and non-transitory computer readable media for integrating online and in-person aspects of an event into a seamless experience are provided. Systems, methods, and non-transitory computer readable media for dynamically adjusting indicators corresponding to online participants of an event are also provided. Additionally, systems, methods, and non-transitory computer readable media for forming group communications within an interactive online event are provided. Such systems typically include one or more processors, storage, communications circuitry, input/output interfaces, and memory containing instructions. In some embodiments, additional components such as power supplies, bus connectors, microphones, and/or speakers may also be included.

Such methods may include providing a display screen within an event. For example, a display screen may be provided to a live event attended by one or more audience members and one or more presenters, as well as one or more online participants who may access the event remotely. Attendees of the event may be capable of viewing the display screen within the event whereas online participants may also view the display screen using their user devices. In some embodiments, a first indicator displayed on the display screen may be selected. The first indicator may correspond to a first online participant of a plurality of online participants accessing the event. In response to being selected, the first indicator may be modified, and the modified version of the first indicator may be displayed on the display screen. For example, in response to being selected, the first indicator may be enlarged, and the enlarged first indicator may be displayed on the display screen.

In some embodiments, each online participant accessing the event may have an indicator that may be displayed on the display screen. For example, if there are nine (9) online participants accessing an event, nine (9) indicators may be displayed on the display screen. In some embodiments, the indicators may present video, images, and/or audio corresponding to the respective online participant. For example, the first indicator may include a video stream corresponding to the first online participant.

In some embodiments, the display screen may be placed proximate to a presenter at the event. For example, a presenter may be located on a stage in an auditorium where the event may be taking place. The stage may be configured such that audience members attending the event may view the presenter, and thus the stage, in front of them. In this scenario, the display screen may be provided adjacent to the presenter such that the presenter and the audience members may all be capable of viewing the display screen. In some embodiments, multiple display screens may be provided and viewable by the presenter and/or the audience members.

In some embodiments, online participants may provide requests to have their indicators displayed on the display screen. For example, one or more online participants of a class may request to ask a question. In some embodiments, each participant that submits a request may be placed in a queue. The queue may be organized using any suitable organizational means. For example, the queue may be organized temporally, such that each participant's indicator may be organized within the queue based on when they submitted their request. In some embodiments, a participant located in a first position within the queue may be selected to have their indicator displayed on the display screen. For example, the first online participant may correspond to a participant that was the first to provide a request. In this scenario, because the first participant was first, he/she may have their indicator displayed on the display screen prior to any other participant who also provided a request. In some embodiments, in response to displaying the selected first indicator, the first online participant may be removed from the queue and the next participant, and each subsequent participant, may be moved up in position within the queue. For example, the second online participant may move from being in a second position within the queue, to now being in the first position within the queue.

Such methods may also include providing a first set of indicators and a second set of indicators on a display screen. For example, multiple online participants of an event may be grouped within one or more sets of indicators, which may be displayed on a display screen provided within an event. In some embodiments, a selection may be received by an event administrator on a display screen of a host device. The administrator may select a point on their display screen that is substantially close to one of the first or second set of indicators. In response to the selection, the first set of indicators and the second set of indicators may be modified. For example, in response to selecting a point near the second set of indicators, the first set of indicators and the second set of indicators may switch positions on the display screen.

In some embodiments, the first set of indicators may have a first level of prominence and the second set of indicators may have a second level of prominence. For example, the first set of indicators may be larger, more pronounced, and/or in better focus than the second set of indicators. In response to selecting a point on the display screen near the second set of indicators, the first set of indicators may become smaller and the second set of indicators may become larger. In some embodiments, the first set of indicators may switch from presenting continuous video to presenting intermittent video, whereas the second set of indicators may switch from presenting intermittent video to presenting continuous video.

Such methods may still further include providing, on a user interface, a first indicator corresponding to a first user and a second indicator corresponding to a second user. In some embodiments, each of the first and second user may correspond to online participants accessing an interactive online event (e.g., a class). In some embodiments, the user interface may be displayed on a display screen located on a user device corresponding to the first user, the second user, an event administrator or host, or any other individual or online participant. An input may be detected from the first user, in the scenario where the user device corresponds to the first user, on the user interface that selects the second indicator and, in response, the first indicator and the second indicator may be displayed in a merged display on the user interface. A communication link may also be created between the first and second user in response to the selection. The communication link may allow the first user and the second user to receive/transmit prioritized communications between one another. In some embodiments, both the first and second user may be capable of receiving/transmitting communications from/to one or more additional online participants or additional communication sources while still receiving/transmitting prioritized communications between one another.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF THE INVENTION

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features.

Figure 1:
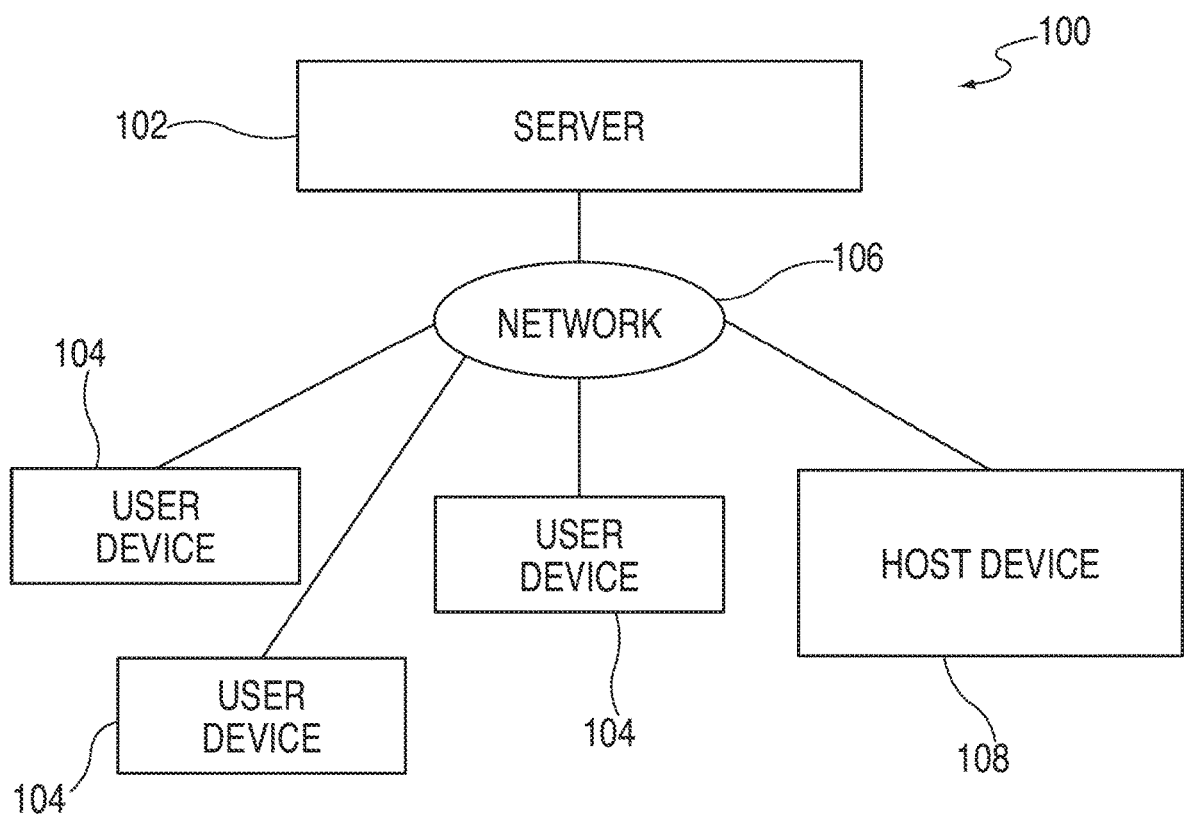
FIG. 1 is a block diagram depicting a system in accordance with various embodiments.

FIG. 1 is a block diagram depicting a system in accordance with various embodiments. System 100 may include server 102, user devices 104, and host device 108, which may communicate with one another across network 106. Although only three user devices 104, one host device 108, and one server 102 are shown within FIG. 1, persons of ordinary skill in the art will recognize that any number of user devices, host devices, and servers may be used.

Server 102 may be any number of servers capable of facilitating communications and/or servicing requests from user devices 104 and/or host device 108. User device 104 may send and/or receive data from server 102 and/or host device 108 via network 106. Similarly, host device 108 may send and/or receive data from server 102 and/or user devices 104 via network 108. In some embodiments, network 106 may facilitate communications between one or more user devices 104.

Network 106 may correspond to any network, combination of networks, or network devices that may carry data communications. For example, network 106 may be any one or any combination of local area networks ("LAN"), wide area networks ("WAN"), telephone networks, wireless networks, point-to-point networks, star networks, token ring networks, hub networks, or any other type of network, or any combination thereof. Network 106 may support any number of protocols such as Wi-Fi (e.g., 802.11 protocol), Bluetooth®, radio frequency systems (e.g., 900 MHZ, 1.4. GHZ, and 5.6 GHZ communication systems), cellular networks (e.g., GSM, AMPS, GPRS, CDMA, EV-DO, EDGE, 3GSM, DECT, IS-136/TDMA, iDen, LTE, or any other suitable cellular network protocol), infrared, TCP/IP (e.g., any of the protocols used in each of the TCP/IP layers), HTTP, BitTorrent, FTP, RTP, RTSP, SSH, Voice over IP ("VOIP"), or any other communications protocol, or any combination thereof. In some embodiments, network 106 may provide wired communications paths for user devices 104 and/or host device 108.

User devices 104 may correspond to any electronic device or system capable of communicating over network 106 with server 102, host device 108, and/or with one or more additional user devices 104. For example, user devices 104 may be portable media players, cellular telephones, pocket-sized personal computers, personal digital assistants ("PDAs"), desktop computers, laptop computers, and/or tablet computers. User devices 104 may include one or more processors, storage, memory, communications circuitry, input/output interfaces, as well as any other suitable feature. Furthermore, one or more components of user device 104 may be combined or omitted.

Host device 108 may correspond to any electronic device or system capable of communicating over network 106 with server 102 or user devices 104. For example, host device 108 may be a portable media player, cellular telephone, pocket-sized personal computer, personal digital assistant ("PDA"), desktop computer, laptop computer, and/or tablet computer. In some embodiments, host device 108 may be substantially similar to user devices 104, and the previous description may apply. In some embodiments, one or more additional host devices may be included and/or host device 108 may be omitted entirely.

Although examples of embodiments may be described for a user-server model with a server servicing requests of one or more user applications, persons of ordinary skill in the art will recognize that any other model (e.g., peer-to-peer), may be available for implementation of the described embodiments. For example, a user application executed on user device 104 may handle requests independently and/or in conjunction with server 102.

Figure 2:
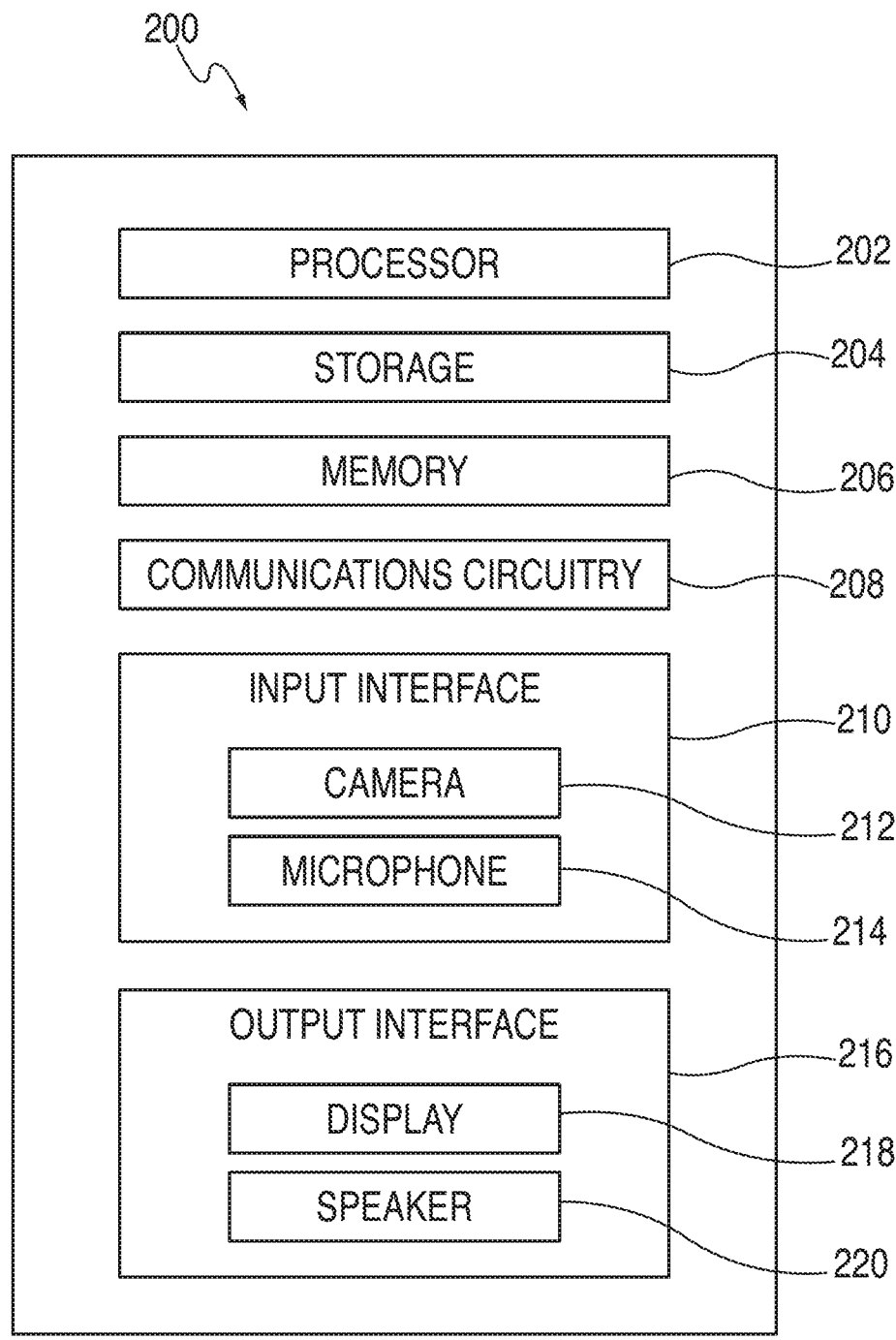
FIG. 2 is an illustrative block diagram of a device in accordance with various embodiments.

FIG. 2 is an illustrative block diagram of a device in accordance with various embodiments. Device 200 may, in some embodiments, correspond to one of user devices 104 and/or host device 108 of FIG. 1. It should be understood by persons of ordinary skill in the art that device 200 is merely one example of a device that may be implanted within a server-device system, and it is not limited to being only one part of the system. Furthermore, one or more components included within device 200 may be added or omitted.

In some embodiments, device 200 may include processor 202, storage 204, memory 206, communications circuitry 208, input interface 210, and output interface 216. Input interface 210 may, in some embodiments, include camera 212 and microphone 214. Output interface 216 may, in some embodiments, include display 218 and speaker 220. In some embodiments, one or more of the previously mentioned components may be combined or omitted, and/or one or more components may be added. For example, memory 204 and storage 206 may be combined into a single element for storing data. As another example, device 200 may additionally include a power supply, a bus connector, or any other additional component. In some embodiments, device 200 may include multiple instances of one or more of the components included therein. However, for the sake of simplicity only one of each component has been shown in FIG. 2.

Processor 202 may include any processing circuitry, such as one or more processors capable of controlling the operations and functionality of device 200. In some embodiments, processor 202 may facilitate communications between various components within device 202. Processor 202 may run the device's operation system, applications resident on the device, firmware applications, media applications, and/or any other type of application, or any combination thereof. In some embodiments, processor 202 may process one or more inputs detected by device 200 and perform one or more actions in response to the detected inputs.

Storage 204 may include one or more storage mediums. Various types of storage mediums may include, but are not limited to, hard-drives, solid state drives, flash memory, permanent memory (e.g., ROM), or any other storage type, or any combination thereof. Any form of data or content may be stored within storage 204, such as photographs, music files, videos, contact information, applications, documents, or any other file, or any combination thereof. Memory 206 may include cache memory, semi-permanent memory (e.g., RAM), or any other memory type, or any combination thereof. In some embodiments, memory 206 may be used in place of and/or in addition to external storage for storing data on device 200.

Communications circuitry 208 may include any circuitry capable of connecting to a communications network (e.g., network 106) and/or transmitting communications (voice or data) to one or more devices (e.g., user devices 104 and/or host device 108) and/or servers (e.g., server 102). Communications circuitry 208 may interface with the communications network using any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quadband, VOIP, or any other protocol, or any combination thereof.

Input interface 210 may include any suitable mechanism or component for receiving inputs from a user operating device 200. Input interface 210 may also include, but is not limited to, an external keyboard, mouse, joystick, musical interface (e.g., musical keyboard), or any other suitable input mechanism, or any combination thereof.

In some embodiments, user interface 210 may include camera 212. Camera 212 may correspond to any image capturing component capable of capturing images and/or videos. For example, camera 212 may capture photographs, sequences of photographs, rapid shots, videos, or any other type of image, or any combination thereof. In some embodiments, device 200 may include one or more instances of camera 212. For example, device 200 may include a front-facing camera and a rear-facing camera. Although only one camera is shown in FIG. 2 to be within device 200, it persons of ordinary skill in the art will recognize that any number of cameras, and any camera type may be included.

In some embodiments, device 200 may include microphone 214. Microphone 214 may be any component capable of detecting audio signals. For example, microphone 214 may include one more sensors for generating electrical signals and circuitry capable of processing the generated electrical signals. In some embodiments, user device may include one or more instances of microphone 214 such as a first microphone and a second microphone. In some embodiments, device 200 may include multiple microphones capable of detecting various frequency levels (e.g., high-frequency microphone, low-frequency microphone, etc.). In some embodiments, device 200 may include one or external microphones connected thereto and used in conjunction with, or instead of, microphone 214.

Output interface 216 may include any suitable mechanism or component for generating outputs from a user operating device 200. In some embodiments, output interface 216 may include display 218. Display 218 may correspond to any type of display capable of presenting content to a user and/or on a device. Display 218 may be any size and may be located on one or more regions/sides of device 200. For example, display 218 may fully occupy a first side of device 200, or may occupy a portion of the first side. Various display types may include, but are not limited to, liquid crystal displays ("LCD"), monochrome displays, color graphics adapter ("CGA") displays, enhanced graphics adapter ("EGA") displays, variable graphics array ("VGA") displays, or any other display type, or any combination thereof. In some embodiments, display 218 may be a touch screen and/or an interactive display. In some embodiments, the touch screen may include a multi-touch panel coupled to processor 202. In some embodiments, display 218 may be a touch screen and may include capacitive sensing panels. In some embodiments, display 218 may also correspond to a component of input interface 210, as it may recognize touch inputs.

In some embodiments, output interface 216 may include speaker 220. Speaker 220 may correspond to any suitable mechanism for outputting audio signals. For example, speaker 220 may include one or more speaker units, transducers, or array of speakers and/or transducers capable of broadcasting audio signals and audio content to a room where device 200 may be located. In some embodiments, speaker 220 may correspond to headphones or ear buds capable of broadcasting audio directly to a user.

Figure 3:
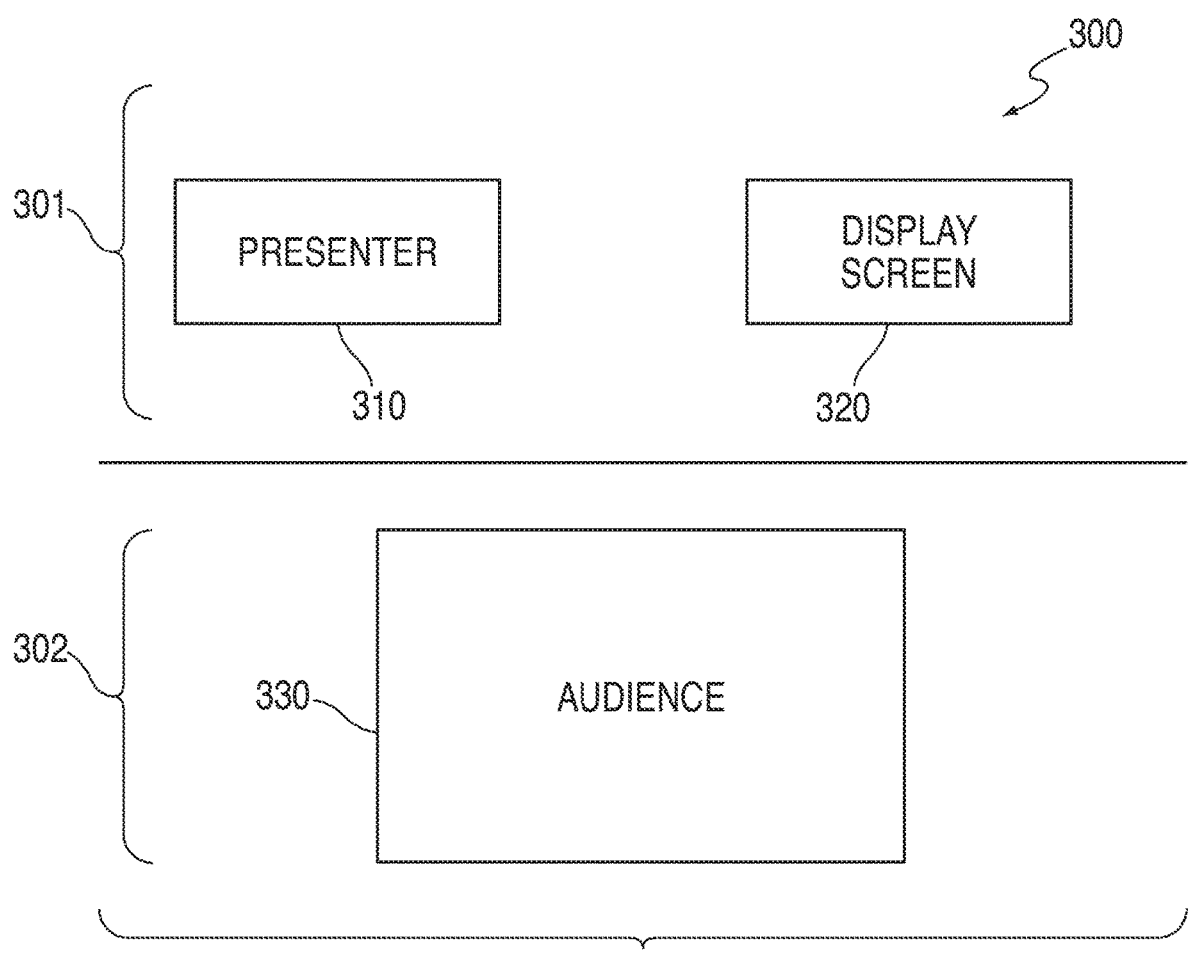
FIG. 3 is a schematic illustration of an area where an event may occur in accordance with various embodiments.

FIG. 3 is a schematic illustration of an event area in accordance with various embodiments. Area 300 may, in some embodiments, correspond to a physical location, such as a lecture hall, concert hall, auditorium, theatre, chamber, meeting site, amphitheater, or any other location where an event may occur. Area 300 may include first region 301 and second region 302. Persons of ordinary skill in the art will recognize that any number of regions may be included within area 300, and the use of two regions is merely exemplary.

In some embodiments, first region 301 may include presenter 310. Presenter 310 may correspond to any individual that may be capable of presenting material to one or more individuals accessing the event. For example, presenter 310 may correspond to a professor lecturing in a classroom. As another example, presenter 310 may correspond to a presenter at a conference. In some embodiments, presenter 310 may correspond to a display screen presenting a video or audio feed of a presentation. For example, a presenter may be located off-site from the event and may tele-conference into the event. In this scenario, presenter 310 may correspond to a display screen displaying the presenter's video and/or audio. In some embodiments, first region 301 may include one or more instances of presenter 310. For example, presenter 310 may correspond to one or more teachers or lecturers presenting a lesson together in a classroom. As another example, presenter 310 may include a combination of presenters physically present in area 300 at the event and/or presenters remotely accessing the event.

In some embodiments, first region 301 may include display screen 320. Display screen 320 may be any display screen capable of presenting one or more indicators corresponding to one or more online participants accessing an event. In some embodiments, display screen 320 may be substantially similar to device 200 of FIG. 2, and the previous description of the latter may apply to the former. Display screen 320 may, in some embodiments, be positioned proximate to presenter 310 such that presenter 310 may be capable of viewing content output from display screen 320. For example, display screen 320 may display a video stream of an online participant of the event. In this scenario, display screen 320 may be positioned such that a presenter (e.g., presenter 310) may be capable of viewing the video stream and/or providing images, video, and/or audio which may be transmitted back to one or more online participants via the display screen.

In some embodiments, second region 302 may include audience 330. Audience 330 may include any number of audience members physically attending the event within area 300. For example, the event may correspond to a play, and audience 330 may correspond to audience members sitting and watching the play in a theatre (e.g., area 300). In some embodiments, audience 330 may be capable of viewing presenter 310 and display screen 320. For example, both presenter 310 and display screen 320 may be located in front of audience 330. In one particular scenario, region 301 may correspond to a stage and presenter 310 and display screen 320 may be located on the stage, which may be viewable by individuals sitting within audience 330.

In some embodiments, audience 330 may be capable of viewing online participants accessing the event using display screen 320. For example, online participants of the event may have individual indicators that may be displayed on display screen 320. In some embodiments, one or more selected indicators for one or more online participants may be displayed on display screen 320, and audience 330 may view the selected indicators thereon.

In some embodiments, region 302 may include one or more instances of audience 330. For example, audience 330 may include an in-person portion of the event (e.g., individuals attending the event within area 300) and online participants accessing the event remotely. In the latter scenario, one or more online participants may be capable of viewing the same display screen presented to the in-person audience as well as the presenter. The display screen presented to the online participants may also include the one or more indicators. In some embodiments, when an indicator is selected to be presented within a full screen mode on display screen 320, the online participants of audience 330 may be presented the selected indicator in a full screen mode only, or in addition to presenter 310.

Figure 4:
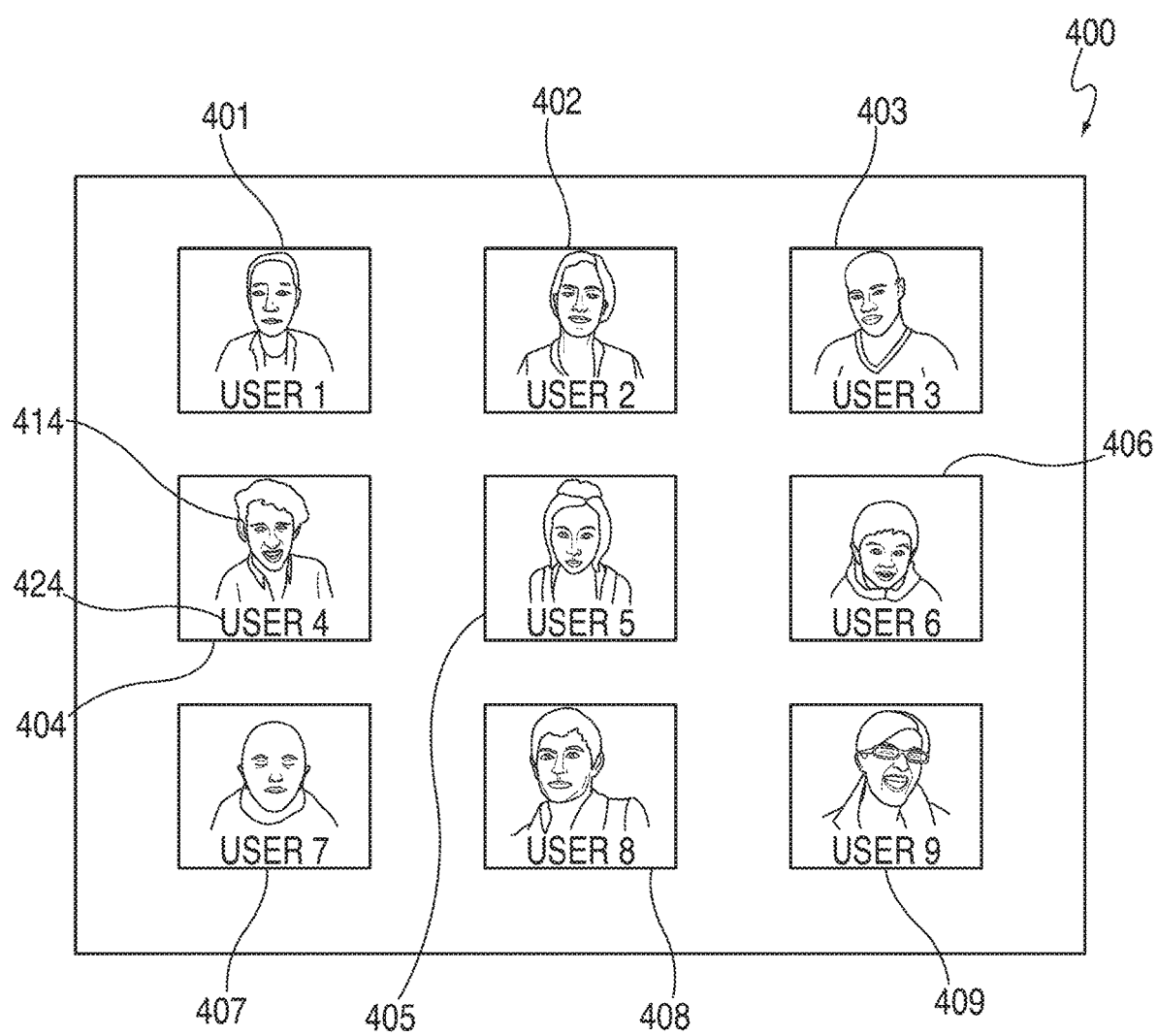
FIG. 4 is a schematic illustration of a display screen in accordance with various embodiments.

FIG. 4 is a schematic illustration of a display screen in accordance with various embodiments. Display screen 400 may correspond to a display screen presented to a presenter at an event, an audience within the event, and/or one or more online participants accessing the event. In some embodiments, display screen 400 may be presented to an online participant accessing an event. In some embodiments, display screen 400 may be substantially similar to display screen 320 of FIG. 3, and the previous description of the latter may apply. In some embodiments, display screen 400 may correspond to a user interface displayed on an event administrator's device. For example, an administrator of an event may be presented with display screen 400 on their host device while monitoring the event.

Display screen 400 may present one or more indicators corresponding to online participants of an event. For example, display screen 400 may present indicators 401-409, each of which may correspond to a separate online participant accessing the event. Each of indicators 401-409 may transmit communications from a corresponding online participant to any other online participants accessing the event, the event administrator, individuals attending the event in-person (e.g., audience members), and/or a presenter. In some embodiments, each indicator may include a video stream of a corresponding online participant. For example, indicator 404 may include video stream 414 which may be presented on display screen 400.

In some embodiments, the video steam may include video communications captured by an online participant's user device. For example, a camera located on a user device (e.g., camera 212) may capture video from an online participant accessing an event. In some embodiments, the video stream may also include audio communications captured by one or more microphones located on the user device (e.g., microphone 214). In some embodiments, each indicator may present various images or photographs, and/or static images or photographs, instead of, or in addition to, any captured audio communications and/or video communications. For example, a user device not including a camera, but having a microphone, may display a static photograph in addition to audio communications from the online participant.

In some embodiments, each indicator may include a participant identifier. For example, indicator 404 may include identifier 424. Identifier 424 may display the online participant corresponding to indicator 404. For example, indicator 404 may correspond to an online participant named "USER 4", which may be displayed by identifier 424. In some embodiments, identifier 424 may display the online participants name, user name, user handle, login information, email address, or any other piece of user identification information, or any combination thereof. For example, an online participant may register for an event through a web-based interface. Within the registration, the user may provide various pieces of information including, but not limited to, their name, email address, nickname, instant message identifier, or social media account. Any of these may be used as identifier 424 corresponding to the online participant of indicator 404.

In some embodiments, each of indicators 401-409 may include a video stream and identifier similar to video stream 414 and identifier 424 corresponding to indicator 404. In some embodiments, one or more indicators from indicators 401-409 may include static images, no images, and/or only audio communications instead of a video stream. For example, indicator 409 may display a blank indicator, a static image, or a photograph of a corresponding online participant, instead of a video stream. In some embodiments, one or more of indicators 401-409 may include an identifier having a different format than identifier 424, or one or more indicators may not include an identifier at all. Persons of ordinary skill in the art will recognize that although nine (9) indicators are displayed within display screen 400, any number of indicators may be presented. For example, display screen 400 may present twenty (20), sixty-four, one hundred (100), or one thousand (1,000) indicators. Furthermore, any information may be included within each displayed indicator, and the use of a video stream and an identifier is merely exemplary.

In some embodiments, indicators 401-409 may correspond to various online participants located within a single grouping or room of an event. For example, multiple online participants may remotely access an event, and based on one or more characteristics, the various online participants may be placed within certain groups or rooms for the event. For example, rooms may be populated with participants temporally. As participants access the event, they may be automatically placed within a room until that room reaches a capacity level. Once at the capacity level, any additional participants accessing the event may be placed in a next room, which again may be populated until it reaches its capacity level, and then those additional participants may be placed in another room, and so on.

In some embodiments, an event administrator may view indicators 401-409 on their display screen 400 in response to interacting with a room or group. For example, a host or event administrator may view every room or group of an event on their device. In response to a selection of a group, the indicators located within that group may "pop" out and be displayed to the administrator. For example, the host may hover a finger or computer mouse over a certain room, which may cause indicators 401-409, corresponding to the online participants located within the room, to be displayed on display screen 400 of the host device. Persons of ordinary skill in the art will recognize that any individual accessing the event may also view the indicators included within a certain room or group, and the aforementioned is merely exemplary. For example, an online participant of the event may select a room or group of an event, and in response to the selection, indicators 401-409 corresponding to online participants of the event located within the room, may be displayed on display screen 400 presented on the online participant's user device.

Figure 5:
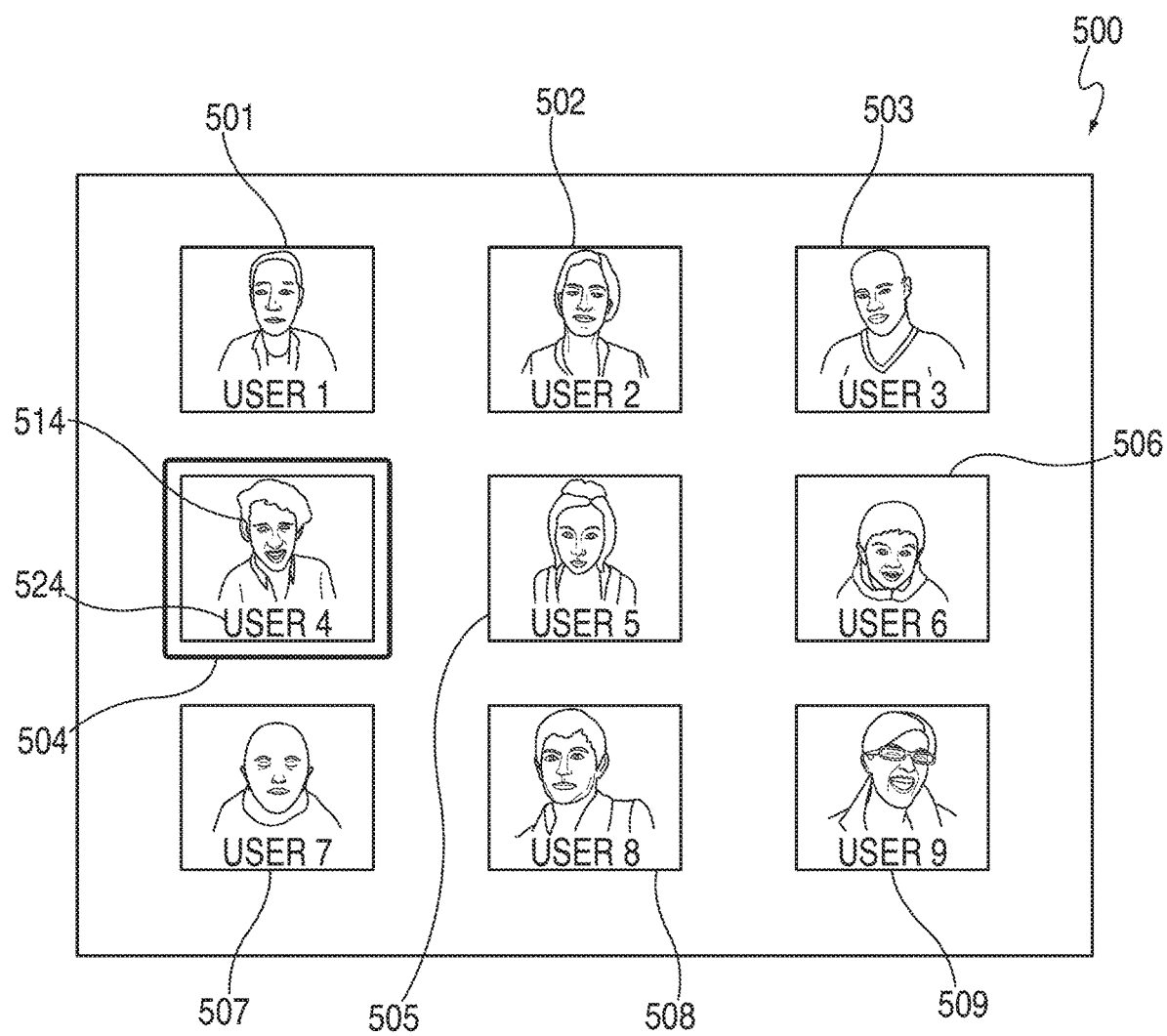
FIG. 5 is a schematic illustration of a display screen in accordance with various embodiments.

FIG. 5 is a schematic illustration of a display screen in accordance with various embodiments. Display screen 500 may include indicators 501-509, which, in some embodiments, may be substantially similar to indicators 401-409 of FIG. 4, and the previous description of the latter may apply to the former. Each indicator may include a video stream and identifier therein, which may correspond to an online participant accessing an event. For example, indicator 504 may include video stream 514 and identifier 524, which may be substantially similar to video stream 414 and identifier 424 of FIG. 4, and the previous description of the latter may apply to the former.

An online participant accessing an event may transmit a request to a host or administrator of the event to perform one or more actions. For example, an online participant accessing a class online may transmit a request to an administrator of the class to ask a presenter (e.g., a teacher) a question. The host or administrator may receive the request from the online participant in the form of one or more notifications on their host device. In some embodiments, a format of indicator 504 may be modified in response to receiving a request from a corresponding online participant. For example, indicator 504 may become bolded, enlarged, highlighted, and/or animated, which may indicate to the host or administrator that the online participant corresponding to indicator 504 has transmitted a request.

In some embodiments, in response to transmitting a request, an online participant's indicator may become highlighted on the display screen presented within the event. For example, audience 330 of FIG. 3 may initially view display screen 400 including indicators corresponding to any online participants of the event. In some embodiments, any online participants accessing the event may also be presented with a display screen substantially similar to display screen 400. In response to USER 4, corresponding to indicator 404, providing a request to the system or host device, indicator 404 may change to become highlighted as seen by indicator 504 of FIG. 5. This may allow any event attendee or online participant accessing the event to see that a specific online participant has submitted a request. For example, the online participant may desire to ask a question, and the audience members, online participants, and/or presenter may be capable of seeing the online participant "raising their hand," just as if the participant was there in person.

Figure 6A:
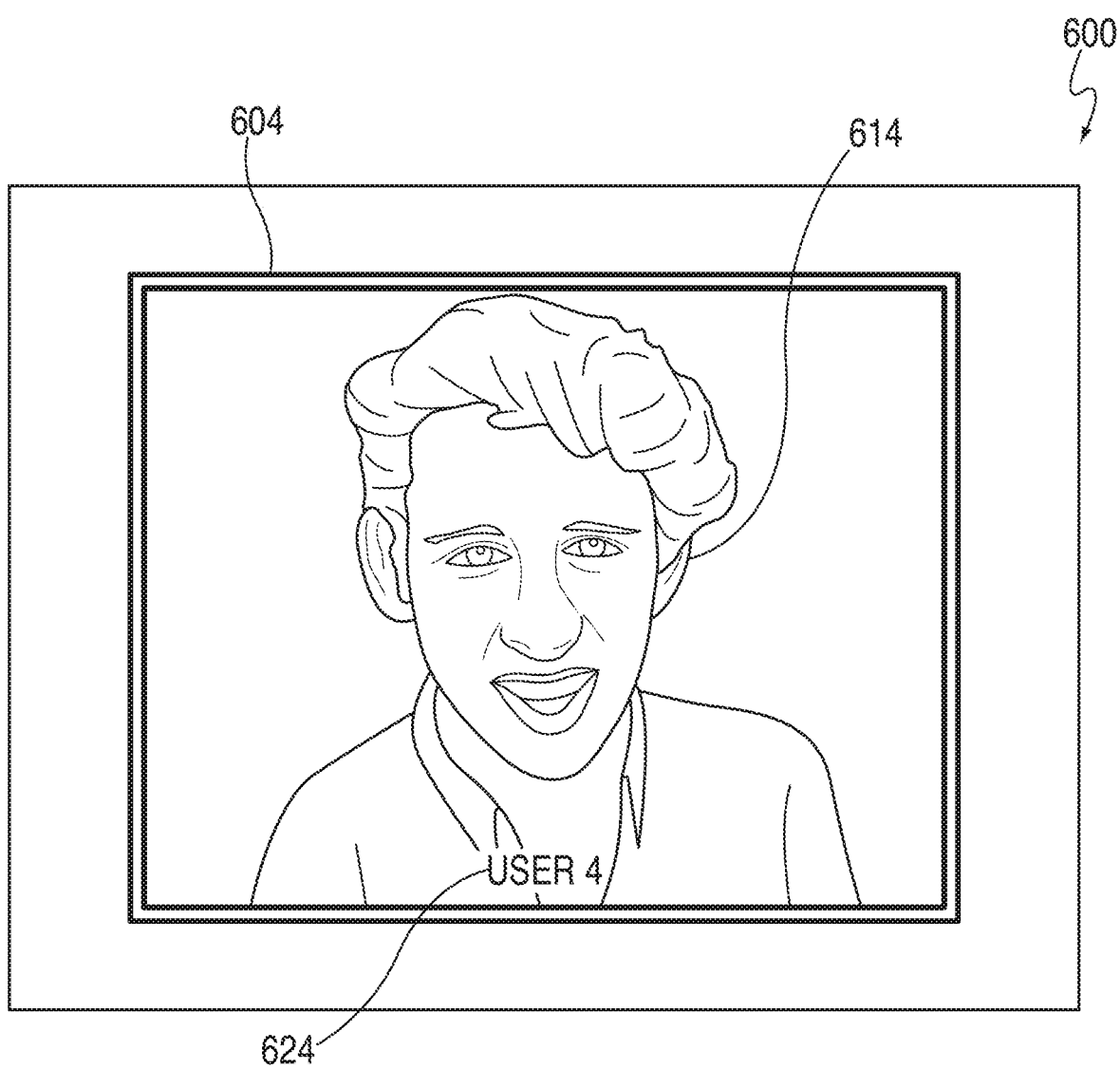
FIG. 6A is a schematic illustration of a display screen in accordance with various embodiments.

FIG. 6A is a schematic illustration of a display screen in accordance with various embodiments. Display screen 600 may include indicator 604, video stream 614, and identifier 624, which may, in some embodiments, be substantially similar to display screen 500, indicator 504, video stream 514, and identifier 524 of FIG. 5, with the exception that the former may be displayed in a spotlighted mode. In some embodiments, in response to an online participant submitting a request, an event administer may select the online participant's indicator and display a spotlighted version on the display screen. For example, in response to detecting the request from the online participant corresponding to indicator 504 of FIG. 5, the administrator may spotlight that indicator on display screen 600.

Indicator 604 may be spotlighted in any suitable manner. For example, spotlighted indicator 604 may be presented on display screen 600 in a substantially full screen mode. When spotlighted, indicator 604 may display video stream 614 in an enlarged format. For example, the video stream for the selected online participant may occupy the entire display screen. As an illustrative example, an online participant may want to ask a question to a teacher and, in response to having their indicator selected, the online participant's video stream may be presented on a display screen (e.g., display screen 320) so that the teacher and/or the students (e.g., presenter 310 and/or audience 330) may also see and hear the online participant's question.

In some embodiments, the spotlighted indicator may be displayed on the host device prior to, or instead of, the display screen within the event. For example, the administrator may select an indicator corresponding to an online participant (e.g., indicator 504), and spotlight that indicator (e.g., indicator 604) on their host device. In this scenario, the administrator may control who will be presented to the other attendees of the event by first viewing and analyzing the online participants.

In some embodiments, in response to an online participant's indicator being selected for spotlighting, the online participant's audio may be adjusted. For example, a selected online participant may have their audio output raised in response to being spotlighted. This may allow any attendee accessing the event to receive a clearer and louder audio signal from the selected online participant. For example, one or more audio outputs located on the stage display screen may output the audio of the selected online participant at a louder or greater intensity than other audio produced by the output. As another example, the audio outputted to each user device may be increased to have the selected online participant's audio signal provided at a higher volume than other communications. In some embodiments, in response to an online participant's indicator being selected, audio of other online participants accessing the event may be modified. For example, in response to indicator 604 being spotlighted, other indicators (e.g., indicators 501-503 and 505-509) may have their audio output lowered. This may allow the spotlighted participant to have their audio presented in a clearer and louder format than any ambient noise generated by the additional online participants or event attendees. In some embodiments, both the spotlighted online participant's audio may be raised in addition to any other non-spotlighted online participants, who may have their audio lowered.

Figure 6B:
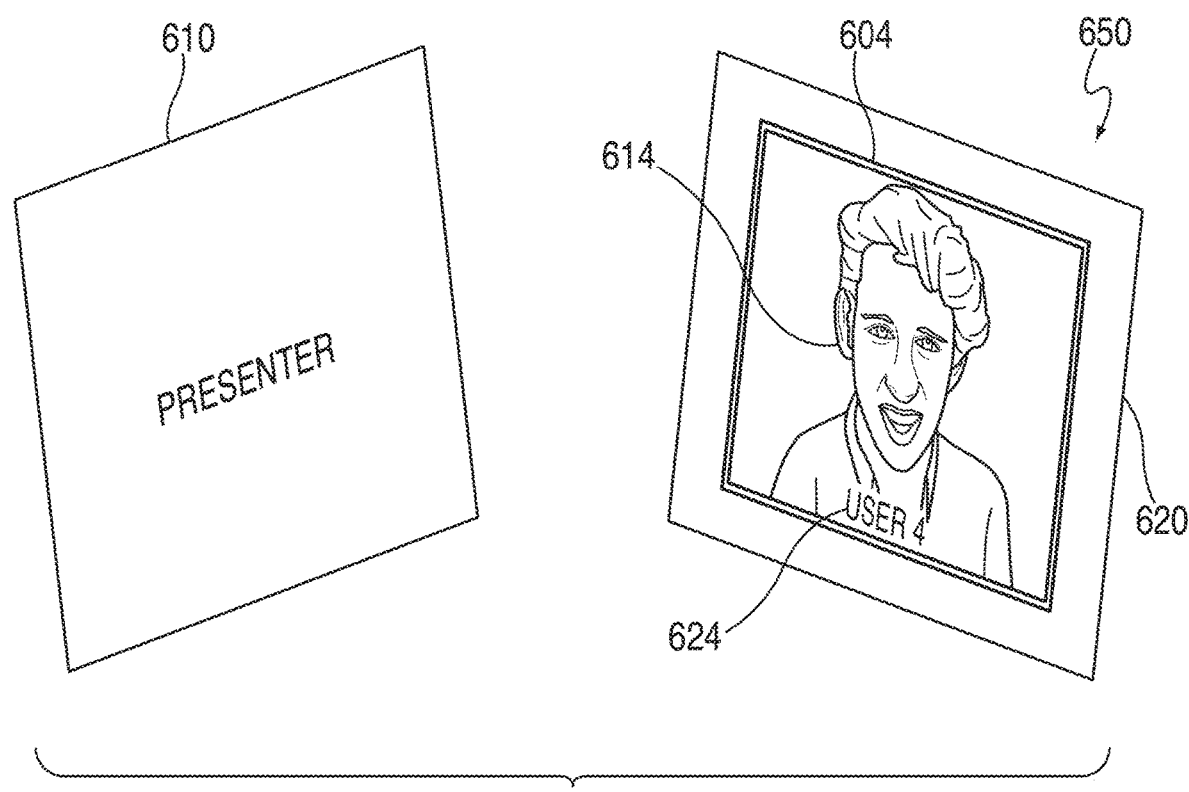
FIG. 6B is a schematic illustration of a first region of an event area in accordance with various embodiments.

FIG. 6B is a schematic illustration of a first region of an event area in accordance with various embodiments. Region 650 may, in some embodiments, be substantially similar to region 301 of FIG. 3, with the former depicted at a more granular level. In some embodiments, region 650 may include presenter 610 and display screen 620, which may be substantially similar to presenter 310 and display screen 320 of FIG. 3, and the previous description of the latter may apply to the former. Furthermore, display screen 620 may be substantially similar to display screen 600 of FIG. 6A, and the previous description may also apply.

Display screen 620 may present indicator 604, corresponding to an online participant accessing an event. In some embodiments, indicator 604 may include video stream 614 and identifier 624, which may be substantially similar to those similarly labeled elements of FIG. 6A, and the previous description may apply.

In some embodiments, region 650 may display a selected online participant whose indicator may be spotlighted and displayed on a display screen to a presenter at an event. For example, presenter 610 may correspond to a teacher in a classroom. An online participant, such as USER 4 corresponding to identifier 624, may submit a request to ask the teacher a question. In response to being selected, the teacher may view display screen 620, which may present video stream 614 corresponding to the online participant. This may allow the teacher to directly interact with a student participating in the class remotely, just as if the student was present in the classroom. This may be extremely beneficial for students who, for one reason or another, may not be able to attend a classroom in person, but still would like to participate in the classroom lesson. In some embodiments, presenter 610 may correspond to a presenter who has a video feed displayed on a presenter display screen. In this scenario, the online participant and the presenter may view each other being displayed on their corresponding display screen. Furthermore, in some embodiments, audience members may be present, and/or online participants may access the event, and both may be capable of viewing the presenter and the spotlighted online participant on the display screen. Thus, online participants remotely accessing the event may be seamlessly integrated into the event.

Figure 7:
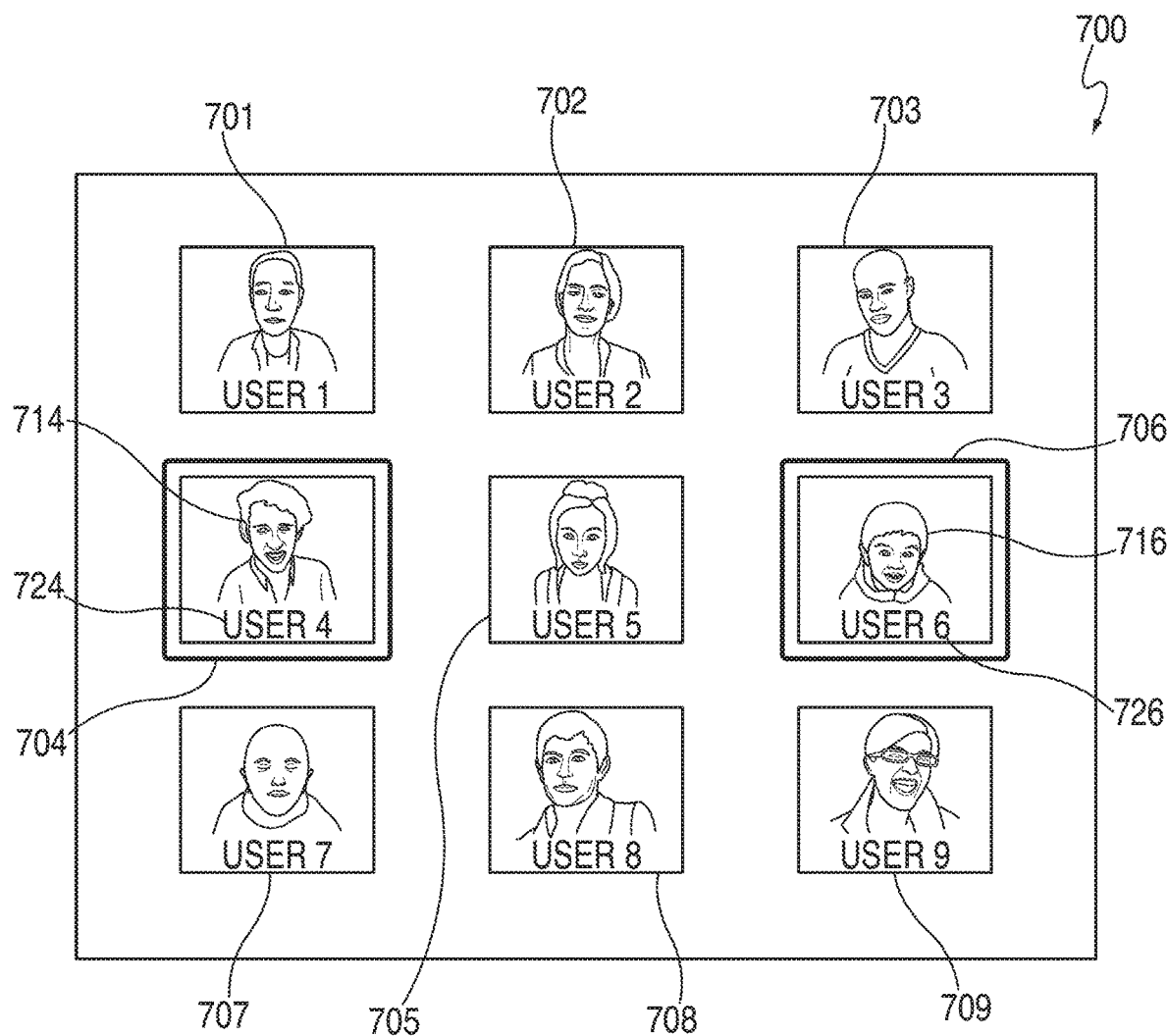
FIG. 7 is another schematic illustration of a display screen in accordance with various embodiments.

FIG. 7 is another schematic illustration of a display screen in accordance with various embodiments. Display screen 700 may, in some embodiments, be substantially similar to display screen 500, with the exception that the former may display multiple indicators corresponding online participants who may have submitted requests. Display screen 700 may include indicators 701-709, where indicators 704 and 706 may each correspond to an online participant who has provided a request to an event administrator or host. Indicators 704 and 706 may include video streams 714 and 716, respectively, as well as identifiers 724 and 726, respectively. In some embodiments, indicator 724 may correspond to a first online participant called "USER 4", whereas indicator 726 may correspond to a second online participant called "USER 6".

In some embodiments, both online participants (e.g., USER 4 and USER 6) may submit requests to an event administrator or host. In response to submitting the requests, a format of each online participant's respective indicator may be modified. For example, indicators 704 and 706 may become bolded, enlarged, highlighted, and/or animated, which may indicate to the host or event administrator that the online participants corresponding to indicators 704 and 706 have submitted a request. In some embodiments, indicators 704 and 706 may be substantially similar to indicator 504 of FIG. 5, and the previous description of the latter may apply.

Any online participant may submit a request at any time. For example, USER 4 may submit a request first, and then USER 6 may submit a request. As another example, USER 6 may submit a request prior to USER 4, or both may be submitted at a substantially same time. In some embodiments, the order that the requests are received by the host or administrator may correspond to the order that each online participant's indicator may be modified. However, persons of ordinary skill in the art will recognize that any ordering scheme may be used to modify indicators in response to a participant's request, and the aforementioned illustrations are merely exemplary.

Figure 8:
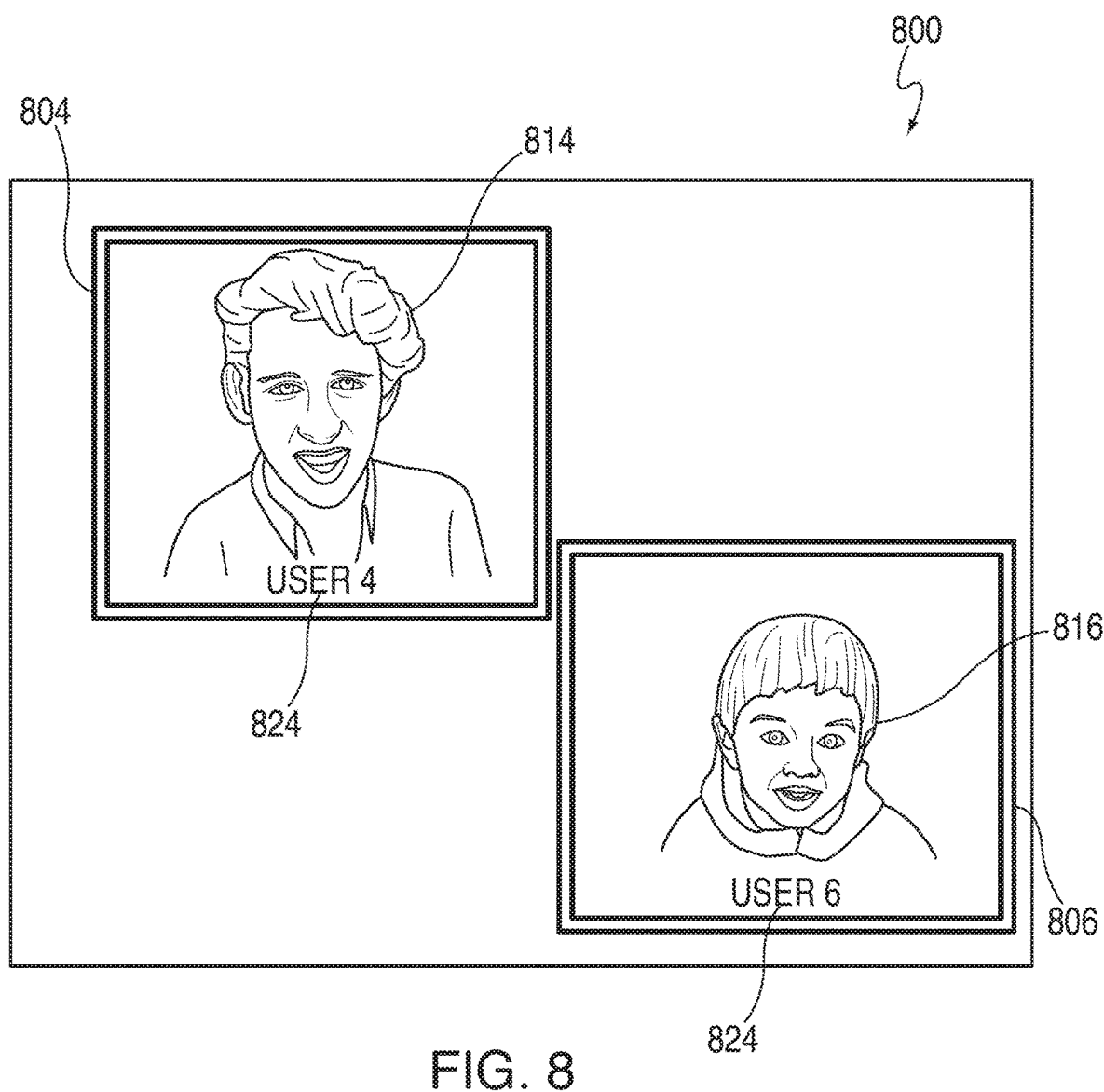
FIG. 8 is another schematic illustration of a display screen in accordance with various embodiments.

FIG. 8 is another schematic illustration of a display screen in accordance with various embodiments. Display screen 800 may, in some embodiments, be substantially similar to display screen 600 of FIG. 6A with the exception that more than one indicator may be displayed thereon. In some embodiments, as shown in FIG. 7, multiple online participants accessing an event may submit a request to an event administrator or host. For example, online participants corresponding to indicators 704 and 706 may each submit a request, which may be signified by presenting modified versions of the indicators on display screen 700.

In response to submitting the request, the host or administrator may select one or more of the modified indicators to be spotlighted. For example, the online participants corresponding to indicators 704 and 706 may submit requests. The host or event administrator may select both indicators and may present the indicators in a spotlighted format on display screen 800. Indicator 804 and indicator 806 may respectively correspond to spotlighted versions of indicators 704 and 706. For example, indicators 804 and 806 may include video streams 814 and 816, respectively, as well as identifiers 824 and 826, respectively, which may be substantially similar to video streams 714 and 716 and identifiers 724 and 726, respectively, of FIG. 7, and the previous description may apply. In some embodiments, both spotlighted indicators 804 and 806 may be presented within a single display screen, such as display screen 800.

Spotlighted indicators 804 and 806 may be presented in any suitable manner and in any suitable order. For example, indicator 704 of FIG. 7 may submit a request first, and therefore indicator 804 may be spotlighted within display screen 800 first. In some embodiments, because indicator 804 may have been spotlighted first, it initially may be presented in a substantially full screen mode. For example, the online participant corresponding to indicator 504 of FIG. 5 may submit a request, and upon selection, corresponding indicator 604 may be presented within display screen 600 of FIG. 6A in a substantially full screen mode. In response to the host or event administrator selecting indicator 706, which may correspond to an online participant who has submitted a request after the first online participant, a spotlighted version of that indicator may be presented within the display screen. For example, indicator 806 may correspond to a spotlighted version of indicator 706. In some embodiments, because indicator 806 was spotlighted after indicator 704, the size of both indicators may be modified such that both may be presented within display screen 800.

In some embodiments, both indicators 804 and 806 may be presented in a substantially similar manner when spotlighted. For example, both may have a similar size or a similar prominence on the display screen. However, persons of ordinary skill in the art will recognize that either of indicators 804 and 806 may be displayed differently than one another. For example, indicator 804 may be presented in a slightly larger format than indicator 806, having a greater prominence than indicator 806, and/or having any other suitable presentation means, or any combination thereof.

In some embodiments, the online participants corresponding to each of indicators 804 and 806 may have their audio adjusted in response to being selected. For example, the audio corresponding to both online participants USER 4 and USER 6 may be raised to allow either a presenter at the event, an audience at the event, and/or one or more online participants accessing the event to more clearly hear the participants' audio.

Figure 9A:
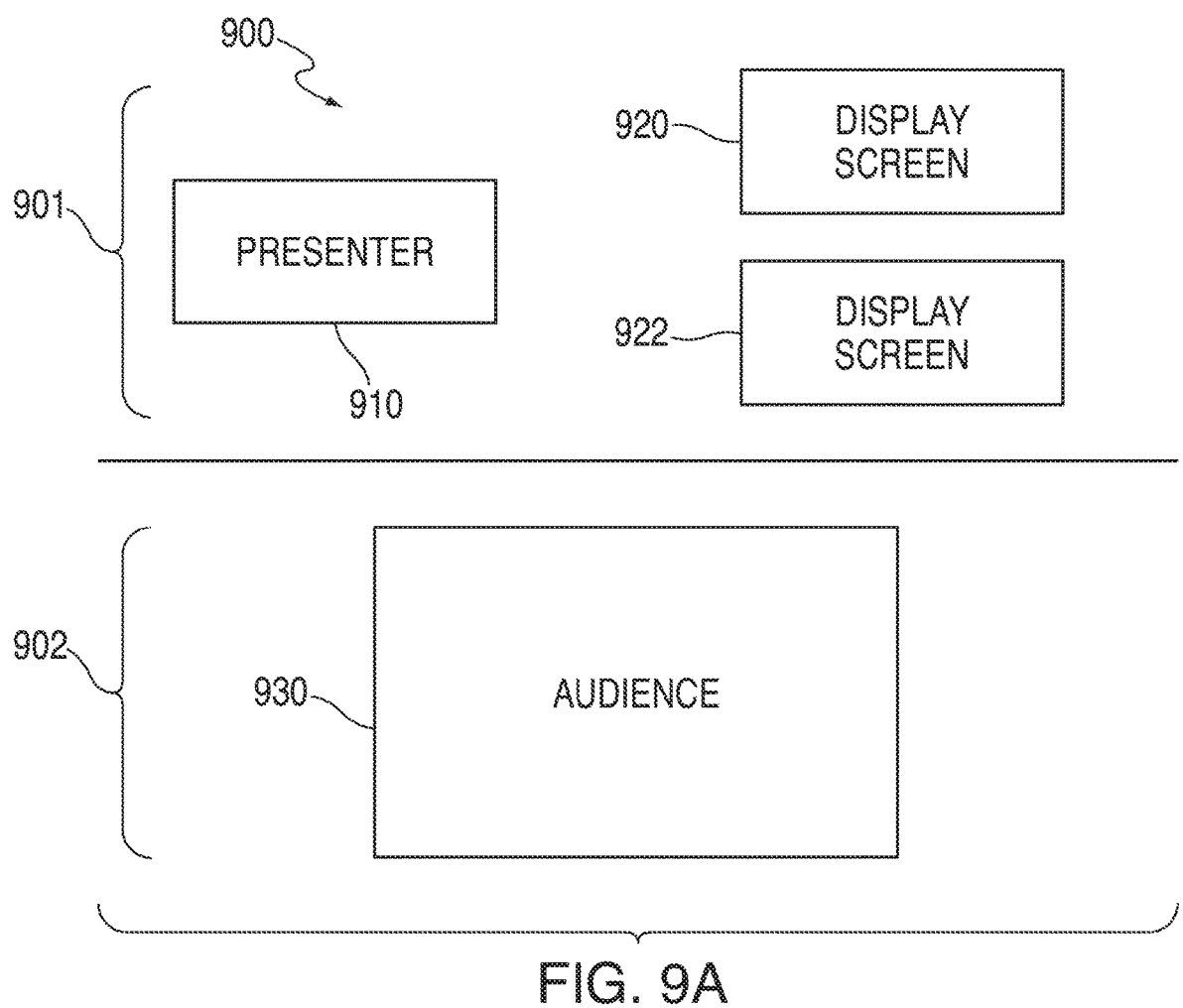
FIG. 9A is another schematic illustration of an area where an event may occur in accordance with various embodiments.

FIG. 9A is another schematic illustration of an area where an event may occur in accordance with various embodiments. Area 900 may, in some embodiments, include first region 901 and second region 902. First region 901 may, in some embodiments, be substantially similar to first region 301 of FIG. 3 with the exception that the former include two or more display screens. For example, region 901 may include display screens 920 and 922. In some embodiments, one or more additional display screens may be provided within first region 901, and the use of two display screens is merely exemplary. Furthermore, each of display screens 920 and 922 may be substantially similar to one another and/or display screen 320 of FIG. 3, and the previous description of the latter may apply to the former. First region 901 may also include presenter 910, which may be substantially similar to presenter 310 of FIG. 3, and the previous description may apply.

Second region 902 may include audience 930 and, in some embodiments, may be substantially similar to second region 302 and audience 330 of FIG. 3, and the previous description of the latter may apply to the former.

Figure 9B:
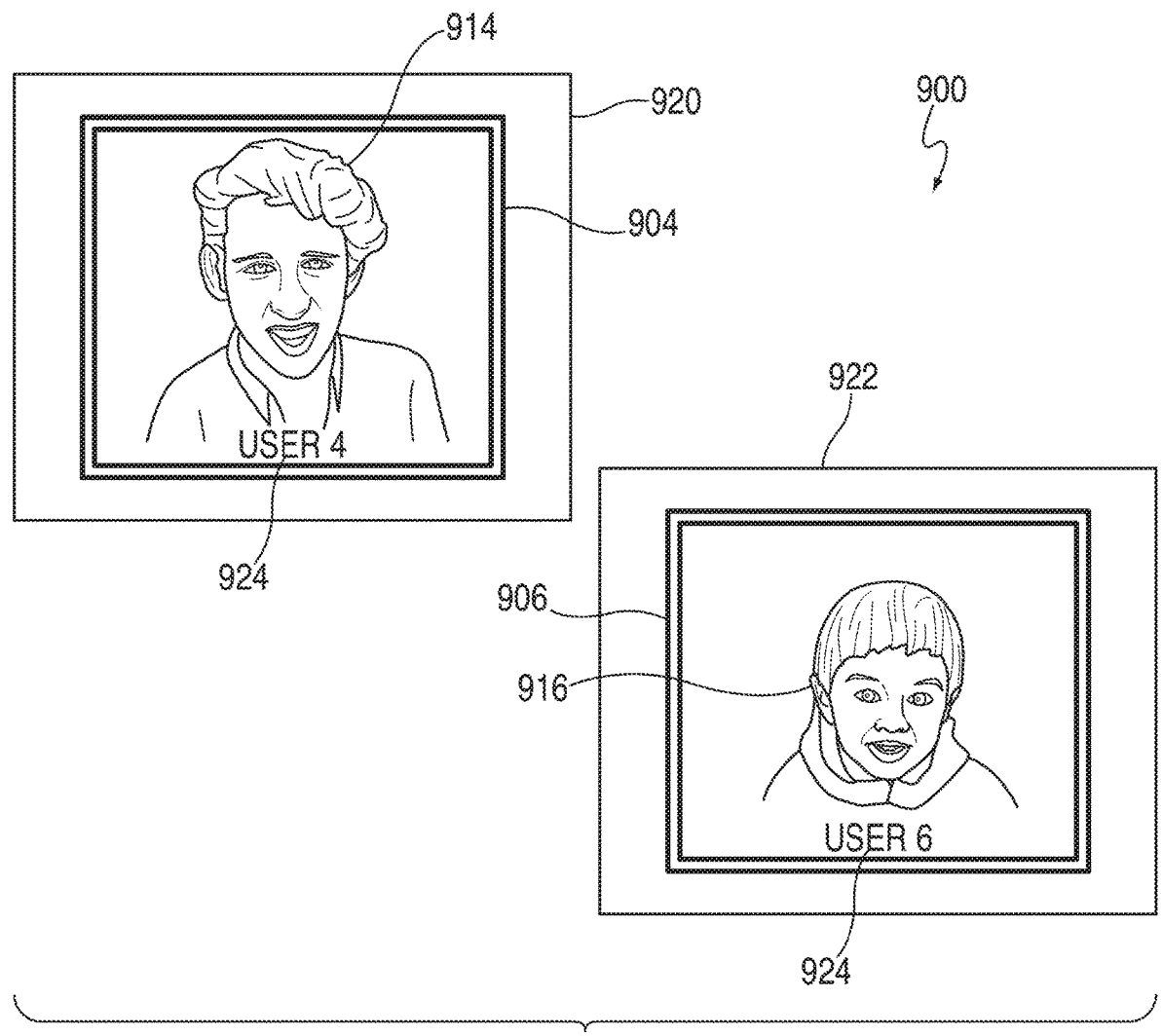
FIG. 9B is a schematic illustration of multiple display screens presented within an event area in accordance with various embodiments.

FIG. 9B is a schematic illustration of multiple display screens presented within an event area in accordance with various embodiments. In some embodiments, event area 900 may include display screens 920 and 922. Display screens 920 and 922 may be substantially similar to display screen 800 of FIG. 8, with the exception that both indicators 804 and 806 may be presented on separate display screens as opposed to a single display screen. For example, indicator 904, which may correspond to a spotlighted version of indicator 704 of FIG. 7, may be displayed within a first display screen, such as display screen 920. As another example, indicator 906, which may correspond to a spotlighted version of indicator 706 of FIG. 7, may be displayed within a second display screen, such as display screen 922. Each indicator may include a corresponding online participant's video stream and identifier. For example, indicator 904 may include video stream 914 and identifier 924. In some embodiments, video stream 914 and identifier 924 may be substantially similar to video stream 714 and identifier 724 of FIG. 7, and the previous description may apply. As another example, indicator 906 may include video stream 916 and identifier 926. In some embodiments, video stream 916 and identifier 926 may be substantially similar to video stream 716 and identifier 726 of FIG. 7, and the previous description may also apply.

In some embodiments, display screens 920 and 922 may be provided within an event proximate to a presenter, such as presenter 910. In some embodiments, display screens 920 and 922 may be located adjacent to presenter 910 and on a same side of presenter 910. For example, display screens 920 and 922 may be provided on a left side of presenter 910. In some embodiments, display screen 920 may be provided on a first side of presenter 910, while display screen 922 may be provided on a second side of presenter 920. In this particular scenario, both display screens 920 and 922 may be capable of being viewed by one another as well as the presenter (and audience). However, persons of ordinary skill in the art will recognize that any orientation and layout of the display screens may be used, and the aforementioned illustrations are merely exemplary. Furthermore, persons of ordinary skill in the art will recognize that any number of display screens may be provided, and each may display any number of spotlighted indicators. For example, if three indicators are selected to be spotlighted, each may be presented on their own display screen, two may be presented on one display screen while the other may be displayed on a second display screen, or all three indicators may be displayed on a single display screen.

In some embodiments, presenter 910 may be displayed within display screens 920 or 922. For example, a presenter accessing the online event remotely may have their video stream (and audio) presented via a first display screen (e.g., display screen 920), while additional online participants "called up" may be displayed on a second display screen (e.g., display screen 922). In this way, even the presenters may be able to access the event in a similar fashion as the online participants.

In some embodiments, a single presenter or multiple presenters may be spotlighted so that they may be presented within a display screen. In some embodiments, an event administrator may select a presenter from a group of presenters to be spotlighted. For example, multiple presenters may "raise their hands" to present a presentation. The event administrator may select one or more presenters and display the presenter's video stream(s) within display screen 920 and/or display screen 922.

In some embodiments, one or more display screen included within an event may be capable of displaying content from an external source, feed, or stream. For example, display screen 920 may be capable of presenting a video streaming from the Internet, while display screen 922 may present a video communications of an online participant. In some embodiments, a first display screen may display a prerecorded video or communication, while a second display screen displays an additional video. For example, a first display screen may present video from a DVD, while a second display screen presents video from an online participant of an event. In some embodiments, both the first and the second display screens may be viewable by each event attendee including both the in-person audience members as well as the online participants.

Figure 10A:
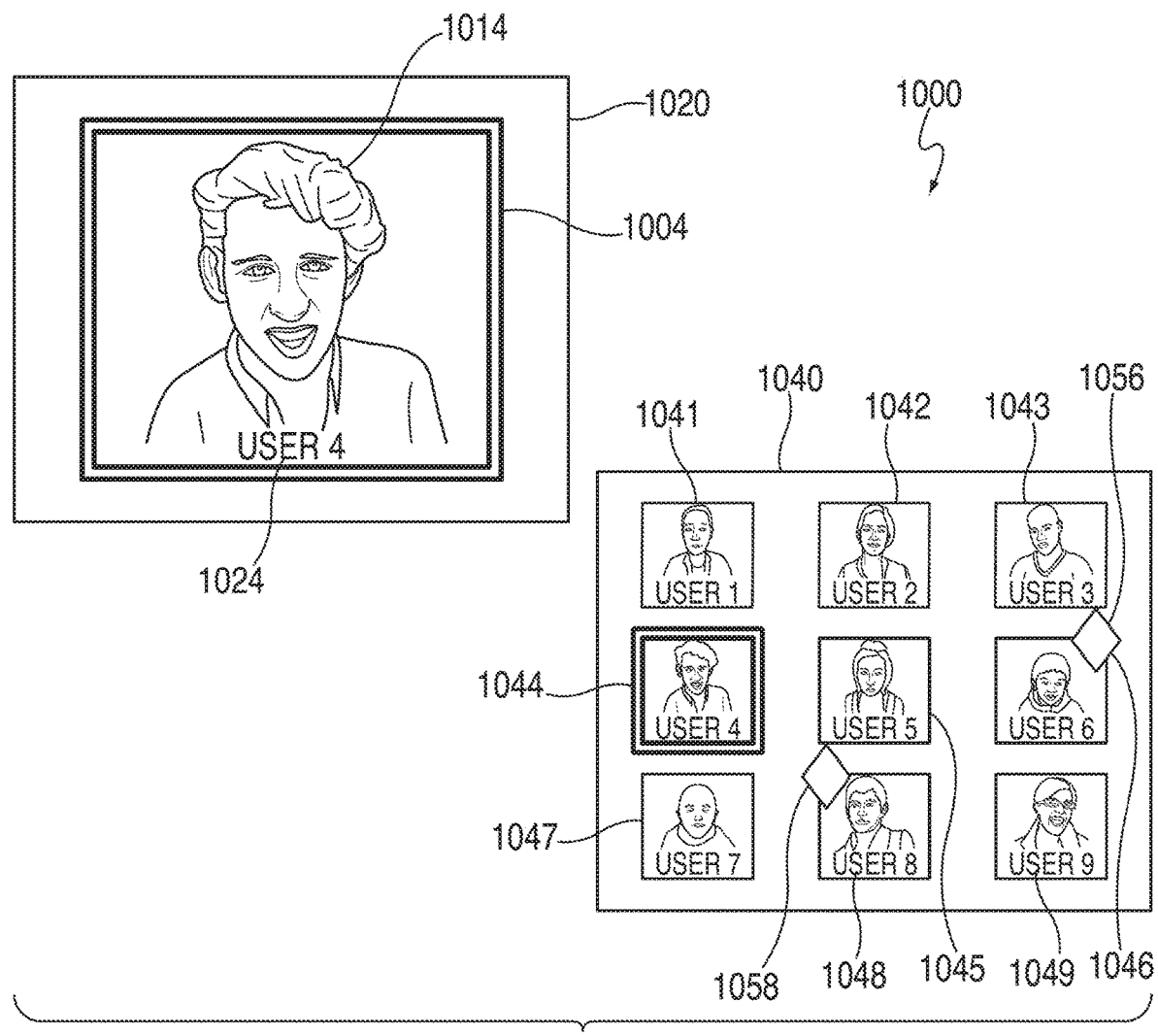
FIG. 10A is an illustrative diagram of a display screen presenting a selected indicator and a display screen for a host device in accordance with various embodiments.

FIG. 10A is an illustrative diagram of a system providing a display screen presenting a selected indicator and a display screen of a host device in accordance with various embodiments. System 1000 may include display screens 1020 and 1040. Display screen 1020 may correspond to a display screen presenting a selected indicator, such as indicator 1004. Indicator 1004 may include video stream 1014 and identifier 1024. In some embodiments, display screen 1020, indicator 1004, video stream 1014, and identifier 1024 may be substantially similar to display screen 600, indicator 604, video stream 614, and identifier 624 of FIG. 6, and the previous description of the latter may apply to the former.

In some embodiments, display screen 1040 may correspond to a display screen presented to an event administrator on their host device (e.g., host device 108 of FIG. 1). Display screen 1040 may present indicators 1041-1049, which may, in some embodiments, be substantially similar to indicators 401-409 of FIG. 4, and the previous description may apply. Display screen 1040 may display an indicator which has been selected to be spotlighted on an event display screen, such as display screen 1020. For example, indicator 1044 may be highlighted, which may indicate to the administrator that that particular indicator is being spotlighted on display screen 1020. Persons of ordinary skill in the art will recognize that one or more additional indicators may also be displayed on one or more additional display screens, or on a same display screen as a currently displayed indicator, and the use of one indicator being displayed on one display screen is merely exemplary. For example, indicators 804 and 806 may both be presented on display screen 800 of FIG. 8. In this scenario, both indicators would be highlighted on an administrator's display screen. As another example, indicators 904 and 906 may be displayed separately on display screens 920 and 922, respectively.

In some embodiments, one or more additional online participants may submit a request to be selected while a different online participant may have their indicator displayed within the event. For example, a student asking a question within a class may spur another student to think of a question that he/she would like to ask. As another example, a teacher in a classroom may ask a question and multiple students may attempt to answer the question by submitting a request to be selected.

Upon accessing the event, an online participant may be capable of submitting a request to be selected. In response to submitting the request, the server may transmit the request to the host device, and a visual notification may be provided on the display screen. For example, the online participant corresponding to indicator 1046 may submit a request while indicator 1044 is being displayed on display screen 1020. Indicator 1046 may now be presented on display screen 1040 with notification marker 1056, signifying to the administrator that the online participant corresponding to indicator 1046 has submitted a request. Similarly, the online participant corresponding to indicator 1048 may also have submitted a request, which may be presented to the administrator by notification marker 1058. Persons of ordinary skill in the art will recognize that any notification marker, or any notification means may be used to signify to the administrator that an online participant correspond to a particular indicator may have submitted a request, and the aforementioned illustration is merely exemplary.

In some embodiments, each indicator within a room may initially be locked, disabled, or set to a specific privacy level such that a user may not accidently be placed within a queue. For example, an event administrator, or other online participant, monitoring indicators 1041-1049 may accidently select an online indicator. If the indicator is not locked, then that indicator may be placed in the queue erroneously. In some embodiments, the user corresponding to the online participant may have their microphone and/or video enabled erroneously. Thus, each user may be capable of selecting a privacy setting so that they will not be erroneously accessed.

In some embodiments, an online participant may have their default setting be private, such that no one has the ability to open their microphone or video except for the user. For example, if another online participant and/or the administrator accidently selects an online participant, that participant may remain "locked" and unable to have their communication lines opened. In some embodiments, the online participant may have their setting configured such that only certain online participants (e.g., friends, the administrator) may be capable of "unlocking" their communication lines (e.g., microphone, video). In some embodiments, the online participant's identification, name, and/or any other additional information may also be hidden if the user chooses to privatize their settings.

Figure 10B:
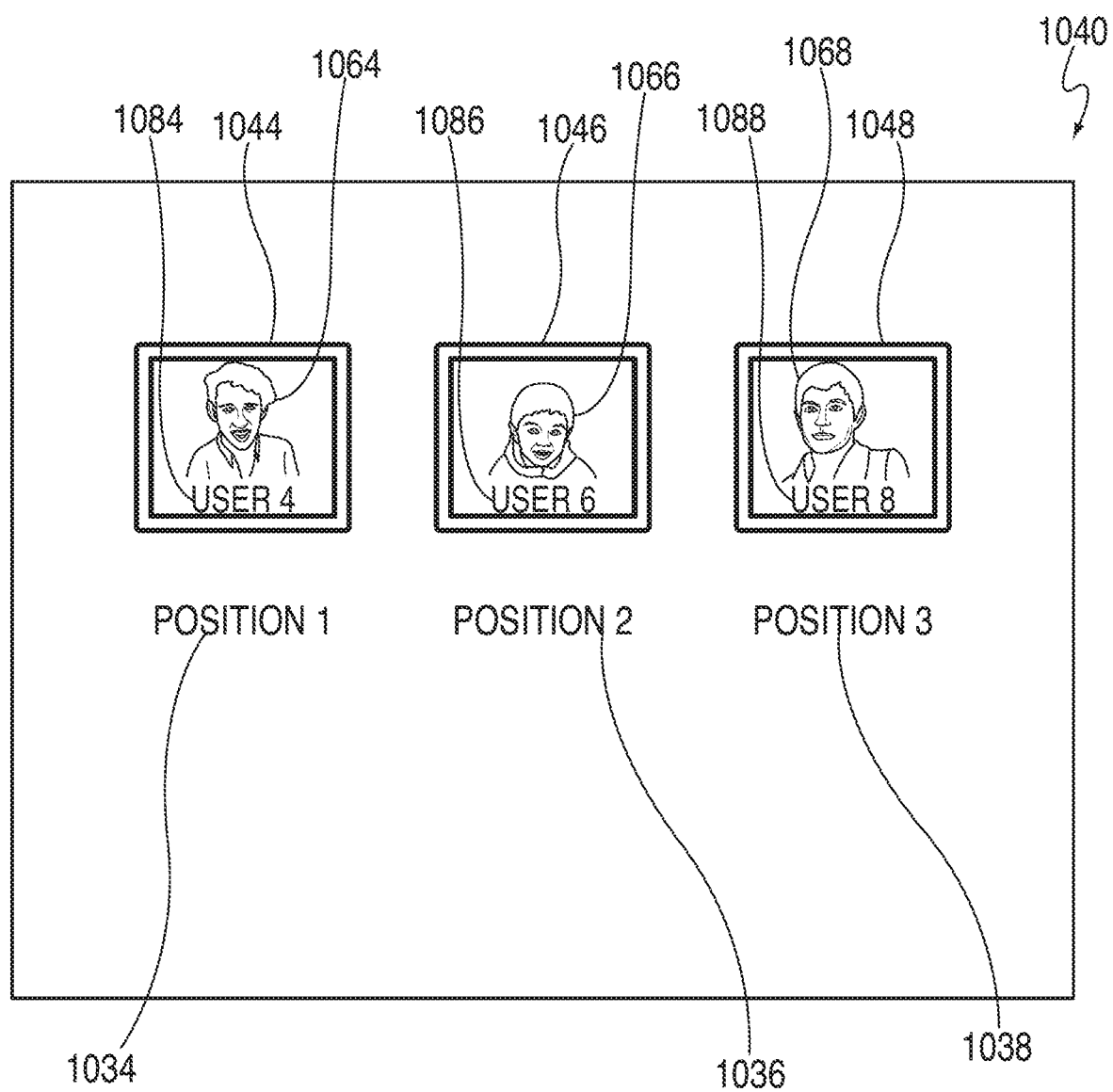
FIG. 10B is an illustrative diagram of a user interface displayed to an event administrator in accordance with various embodiments.

FIG. 10B is an illustrative diagram of a user interface displayed to an event administrator in accordance with various embodiments. User interface 1040 may correspond to a user interface displayed on a display screen of a host device, such as host device 108 of FIG. 1. An event having a live component and an online component may have one or more administrators monitoring the event to help facilitate interactions between the two components. In some embodiments, an event administrator may monitor online participants of the event to determine when one or more online participants have submitted a request, such as to ask a question. For example, students accessing a class remotely may desire to ask a teacher a question. When a student asks a question, that student's request may be received by the administrator, and then the student's audio and/or video stream may be presented on a display screen within the event (e.g., display screen 320 of FIG. 3). In some embodiments, if multiple participants submit requests, the multiple participants may be placed in a queue.

In some embodiments, placing online participants in a queue in response to submission of a request may allow an event administrator to organize the participants to facilitate interactions within the event. For example, if the event corresponds to a class, a teacher of the class may ask whether any students have a question. In response, one or more students may "raise their hand" to ask a question. This may correspond to submitting a request to the administrator allowing the online participant to ask a question. In some embodiments, the ordering that participants may then ask questions to the teacher may be based on the order that they are placed in the queue. In some embodiments, the queue's order may be organized after the participants have been placed therein.

In some embodiments, the participants may be organized temporally based on when a participant submits a request. For example a first participant, second participant, and a third participant may each have submitted a request. In response to submitting the request, the online participant's corresponding indicator may be displayed within the administrator's display screen in a queue. For example, indicators 1004, 1006, and 1008 may each be displayed within display screen 1000.

Each indicator may include a video stream and identifier corresponding to a specific online participant. For example, an online participant corresponding to indicator 1004 may have video stream 1014 and identifier 1024 displayed therein. Similar, indicators 1006 and 1008 may include video streams 1016 and 1018, respectively, and identifiers 1026 and 1028, respectively. In some embodiments, indicators 1004, 1006, and 1008, video streams 1014, 1016, and 1018, and identifiers 1024, 1026, and 1028 may be substantially similar to indicators 704 and 706, video streams 714 and 716, and identifiers 724 and 726 of FIG. 7, and the previous description of the latter may apply.

In some embodiments, an online participant corresponding to indicator 1004 may have submitted a request prior to any other online participant. In this scenario, indicator 1004 may be placed in first position 1034 within a queue. In some embodiments, the system may be capable of detecting any online participant who has submitted a request and may automatically place those participants into the queue. This may allow the system to automatically accommodate for a large number of participants submitting request so that the event administrator or host does not need to manually place each one within the queue. In some embodiments, any indicator located within the first position may be the next indicator to be displayed within a display screen at an event (e.g., display screen 320 of FIG. 3). For example, indicator 604 of FIG. 6 may currently be displayed on display screen 600 within an event. In response to the online participant corresponding to indicator 604 no longer being presented within the display screen, indicator 1004 may automatically be presented within the event's display screen. The change from presenting indicator 604 to displaying indicator 1004 may occur, for example, due to an online participant being finished asking a question, having an amount of time for presenting expire, logging out of an event, or for any other reason.

In some embodiments, the administrator may manually move an indicator from being in the first position in the queue to being presented on the display screen. For example, display screen 1000 may correspond to an administrator's display screen on a host device. The administrator may select an indicator from the queue (e.g., indicator 1004), and move the selected indicator to a display screen for an event (e.g., display screen 320 of FIG. 3). This may cause the selected indicator to be displayed on the event's display screen so that any audience member, presenter, and/or online participant accessing the event may view the corresponding online participant's video stream and/or identifier.

In some embodiments, the transition from a currently displayed indicator to an indicator occupying a first position within the queue may occur seamlessly. For example, in response to a currently displayed indicator ending their presentation or finishing their display time, the server (e.g., server 102 of FIG. 1) may be configured to select the indicator occupying a first position within the queue and place or spotlight the indicator on the display screen. In some embodiments, the server may transmit a notification to the user device corresponding to the indicator to be placed on the display screen prior to placing the indicator on the display screen. This may allow the user to be cognizant that their video stream may soon be displayed and broadcasted to the event attendees.

In some embodiments, various online participants may each submit a request at different points in time. Based on when a certain online participant submits a request, that particular participant may be placed in a specific position within the queue. For example, the first participant to submit a request may be placed in first position 1034, while a second participant to submit a request may be placed in second position 1036, and a third participant to submit a request be placed in third position 1038. Persons of ordinary skill in the art will recognize that any number of online participants may submit a request, and the use of three online participants each submitting a request is merely exemplary. Furthermore, any number of organization methods may be used to organize the queue, and the order that online participants within the queue based on when they submit a request is merely exemplary. For example, positions within the queue may be based on the type of request the participant makes (e.g., a question, a comment, etc.) the content of the request, or the frequency that a user submits requests.

In some embodiments, the administrator may move indicators to different positions within the queue. For example, although indicator 1004 may initially be located at first position 1034 and indicator 1006 may initially be located at second position 1036, the administrator may be capable of switching the two. Thus, indicator 1006 may be moved to be located at first position 1034 and indicator 1036 may be moved to be located at second position 1036. Persons of ordinary skill in the art will recognize that any indicator may be moved to any position within the queue, and the aforementioned illustration is merely exemplary.

In some embodiments, upon being added to the queue, the corresponding online participant may receive a notification on his/her user device indicating their position within the queue. For example, a user may submit a request to ask a question. In response to submitting the request, the user may receive an acknowledgment notification indicating that the user request has been received and that the user is currently third "in line" to ask a question. In some embodiments, in response to a change in a position of the user's indicator within the queue, another notification may be transmitted to the user device indicating the user's current position within the queue.

Figure 11A:
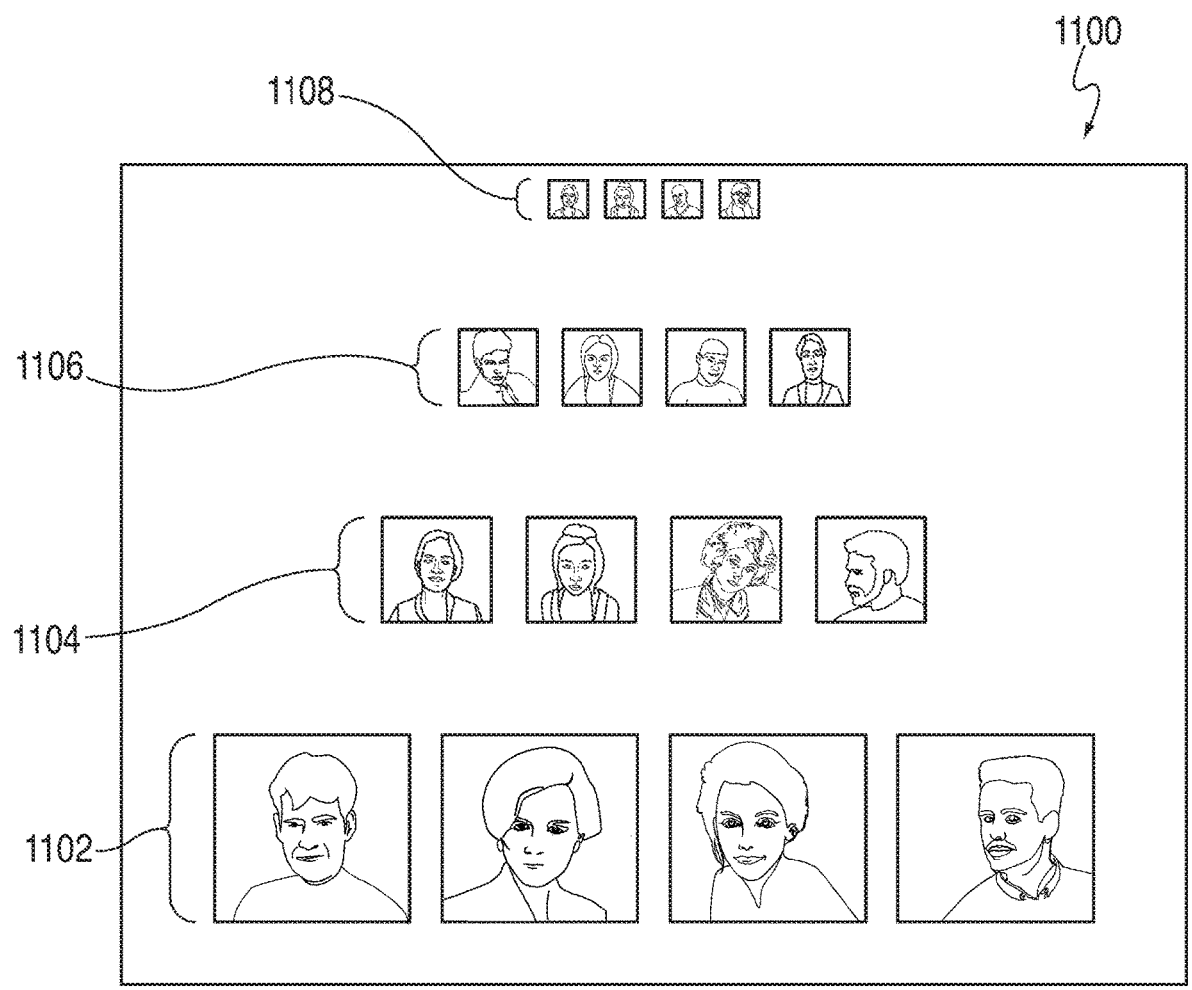
FIG. 11A is an illustrative diagram of a display screen presenting a plurality of indicators in accordance with various embodiments.

FIG. 11A is an illustrative diagram of a display screen presenting a plurality of indicators in accordance with various embodiments. Display screen 1100 may, in some embodiments, correspond to a host device (e.g., host device 108 of FIG. 1) operated by an event administrator. For example, an event administrator may have screen 1100 displayed on their device to control and moderate an event including online participants, in-person audience members, and/or presenters.

In some embodiments, display screen 1100 may display a plurality of indicators, where each may correspond to an online participant accessing the event. The indicators may be displayed in any suitable manner within the display screen, such as in sets or groups of indicators. For example, display screen 1100 may include sets of indicators 1102, 1104, 1106, and 1108. In some embodiments, each set of indicators may include one or more indicators having common attributes or features. For example, each set of indicators may correspond to one or more indicators from a specific room within the event. As another example, each set may include one or more indicators corresponding to various online participants that have similar characteristics such as occupation, college, age, interest, social media connections, or any other characteristic, or any combination thereof.

In some embodiments, the indicators may float about the display screen individually and/or within their set. For example, each indicator from set 1102 may float about the screen (e.g., moving slightly up/down or right/left) along with the other indicators from within the set. In some embodiments, each indicator may rotate in position within the set. For example, an indicator located at a left most position on the display screen within set 1102 may rotate with an indicator located at a right most position. In some embodiments, there may be more indicators within a set than may be capable of being viewed, and the indicators may slowly move across the display screen to allow all indicators to be seen, similar to a scan.

In some embodiments, the various sets of indicators may be displayed such that they provide a three dimensional appearance and feel to the display screen. For example, set 1102 may be presented at a first location within the display screen. Set 1102 may be a first size that, in some embodiments, may be similar to a size of indicators 401-409 of FIG. 4. Set 1104 may be presented at a second location within the display screen and may have a smaller size than the indicators of set 1102. This may allow the indicators to appear as if they are "behind" the first set. This process may continue with sets 1106 and 1108, which may be presented at a third location and a fourth location, respectively, on the display screen, where each may have a smaller size than the indicators presented before them. Thus, the indicators may appear as if they are fading to a vantage point on display screen 1100. Persons of ordinary skill in the art will recognize that any location within the display screen may be used as a vantage point and any number of sets of indicators may be used to create the three-dimensional appearance, and the aforementioned illustrations are merely exemplary.

In some embodiments, indicators located at a first position on the display screen may each have a first level of prominence or resolution. Each set of indicators located after or "behind" the first set of indicators may have a lower level of prominence or resolution than the previous set. For example, set 1102 may be located at a first location on display screen 1100 and therefore may have a greater prominence than set 1104 located at a second location. Furthermore, sets 1106 and 1108 may each then have a lower level of prominence than the previous set (e.g., sets 1104 and 1106). This may help in distinguishing between sets of indicators because the set at the forefront of the display screen may have a highest level of prominence or highest resolution.

In some embodiments, the set of indicators located in the first position may include indicators having a continuous video stream. For example, set 1102 may be located in the front or at the forefront of display screen 1100, and may have continuous video stream included within each indicator. Set 1104, which may be located at a second position, may include indicators having intermittent video. Set 1106, which may be located at a third position, may include indicators having still images, and set 1108, which may be located at a fourth position, may include indicators having thumbnail resolution images or no images at all. This may also help distinguish between different sets of indicators by creating a similar scenario as if the administrator were looking out into a crowd of indicators. The further out in the crowd the administrator looks, the less clear the people within the crowd may appear, whereas the people in the front of the crowd may appear the clearest.

Figure 11B:
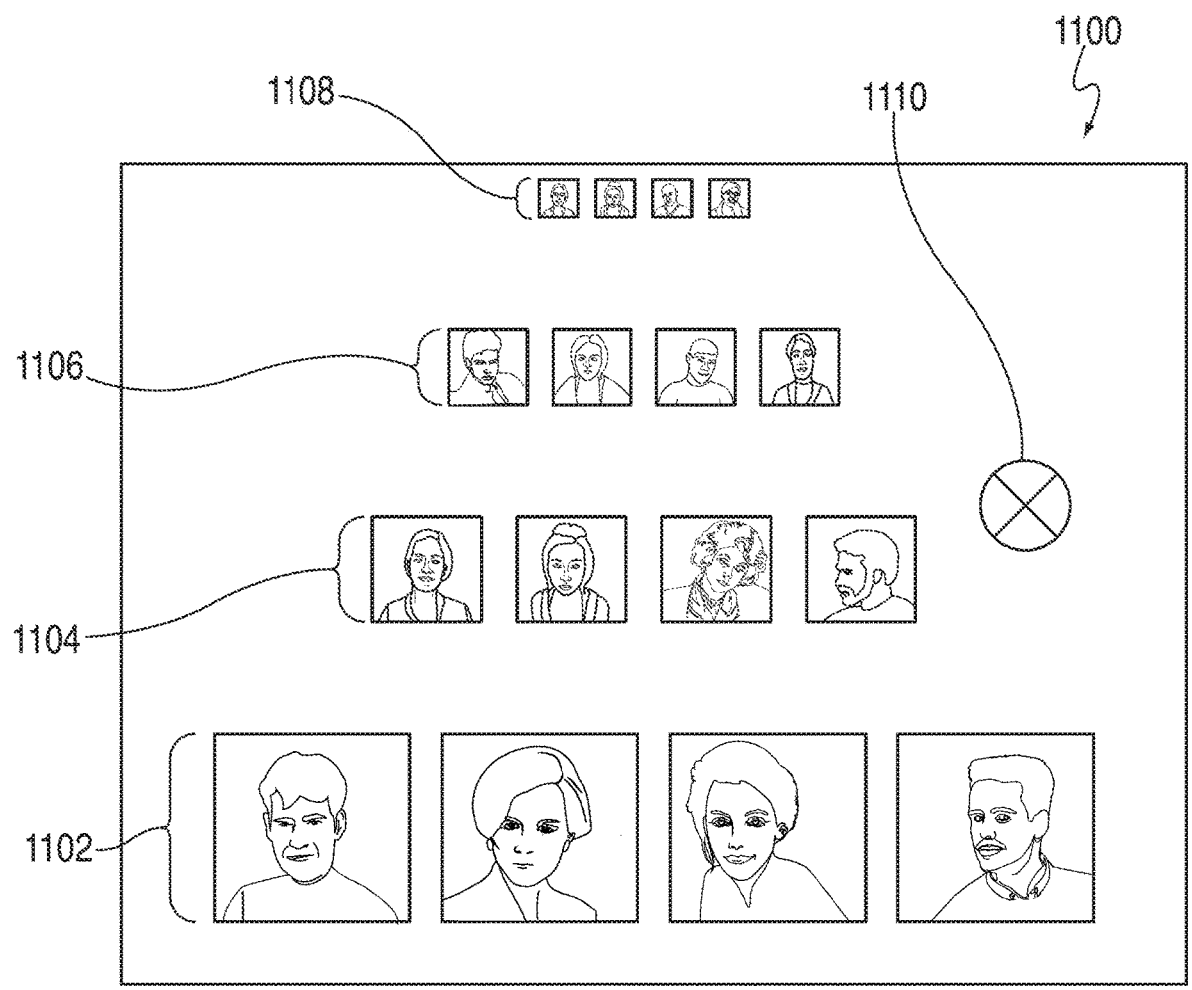
FIG. 11B is another illustrative diagram of a display screen presenting a plurality of indicators in accordance with various embodiments.

FIG. 11B is another illustrative diagram of a display screen presenting a plurality of indicators in accordance with various embodiments. In some embodiments, display screen 1100 of FIG. 11B may be substantially similar to display screen 1100 of FIG. 11A, with the exception that the former may include selection marker 1110. In some embodiments, the administrator may bring a set of indicators to a different position on the display screen by selecting those indicators. For example, set 1102 may be located at a first position on the display screen while set 1104 may be located at a second position. The administrator may want to view set 1104 at the first position and may select set 1104, which may move set 1104 to be at the first position and set 1102 to be at the second position.

In some embodiments, the administrator may select a point on the display screen substantially near a set of indicators in order to select that set. For example, the administrator may click a computer mouse or tap on a touch screen of their host device, which may correspond to the location of selection marker 1110. The host device may recognize the location on the display screen that the administrator has selected and determine a distance between selection marker 1110 and each of the sets of indicators (e.g., sets 1102, 1104, 1106, and 1108) displayed on the display screen. The device may then determine which set of indicators the selection marker is closest to, and that set of indicators may accordingly be selected in response. For example, selection marker 1110 may be located closest to set 1104, and thus the host device may determine that set 1104 may be selected.

Figure 12:
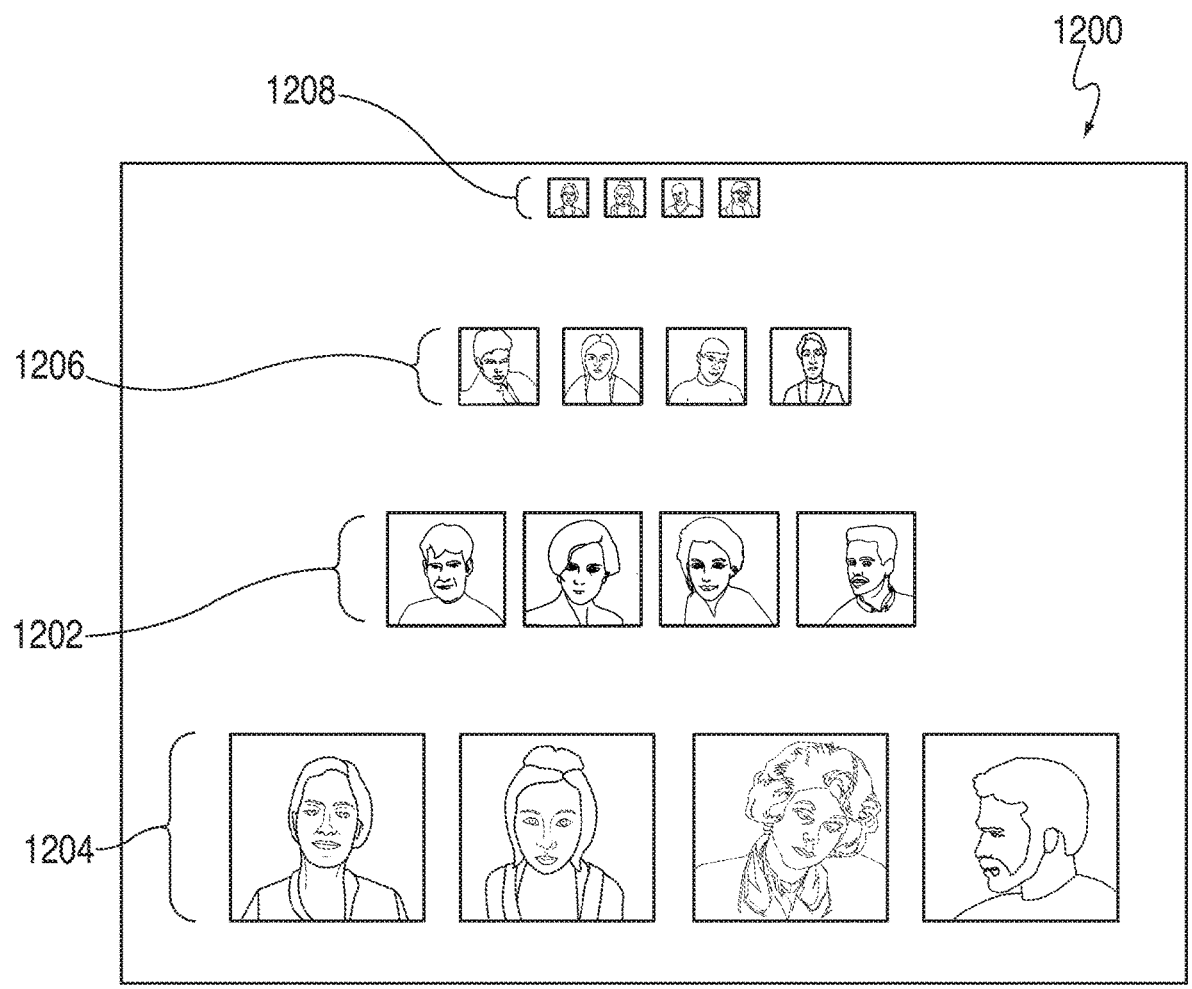
FIG. 12 is yet another illustrative diagram of a display screen presenting a plurality of indicators in accordance with various embodiments.

FIG. 12 is yet another illustrative diagram of a display screen presenting a plurality of indicators in accordance with various embodiments. Display screen 1200 may be substantially similar to display screen 1100 of FIG. 11 with the exception that the former may present sets of indicators placed at various locations in response to a selection by an administrator. For example, display screen 1200 may correspond to the display screen of FIG. 11B after the administrator has inputted a selection, such as selection marker 1110 selecting set 1104.

In response to selecting set 1104, it may be placed within the first position within the display screen. For example, set 1204 of FIG. 12 may be located in the position of set 1102 of FIG. 11, whereas set 1202 may now be located within the position of set 1104. This may correspond to the two sets of indicators "switching" positions. In some embodiments, when sets of indicators switch positions, characteristics of the indicators within the sets may also change. For example, set 1102 may have initially displayed indicators having continuous video streams, whereas set 1104 may have initially displayed indicators having intermittent video. In response to the selection of set 1104, the user may be presented with display screen 1200, where set 1204 may be displayed having continuous video streams and set 1202 may be displayed having intermittent video. In some embodiments, sets 1206 and 1208 may be substantially similar to sets 1106 and 1108 of FIG. 11 and may remain unchanged in response to the switch.

In some embodiments, the sets of indicators may rotate between various levels of prominence. For example, initially set 1102 may be displayed having continuous video streams, set 1104 may be displayed having intermittent video, set 1106 may be displayed having static images, and set 1108 may display a thumbnail resolution image or no image at all. After a certain period of time, or in response to a user interaction or request, the sets may change locations and displayed content or style. For example, after a few seconds, set 1104 may move to the position of set 1102, set 1106 may move to the position of set 1104, set 1108 may move to the position of set 1106, and set 1102 may move to the position of set 1108. In response to moving to their new positions, each set may take on similar features of their preceding set. For example, set 1104 may now display indicators having continuous video streams, set 1106 may now display indicators having intermittent video, set 1108 may now display indicators having static images, and set 1102 may now display indicators having thumbnail resolution images or no images at all. Furthermore, the size and/or resolution of each set of indicators may change based on the new location of the set. This may give the user the feeling that the sets of indicators are "floating" between positions. This may also allow the administrator to continually view the various sets of indicators, instead of manually having to select the sets and/or having to only view certain sets with certain display characteristics. Persons of ordinary skill in the art will recognize that any number of sets of indicators may be displayed having any characteristic, and the aforementioned illustrations are merely exemplary. For example, not all sets of indicators may rotate, and only indicators corresponding to certain sets may rotate.

Figure 13:
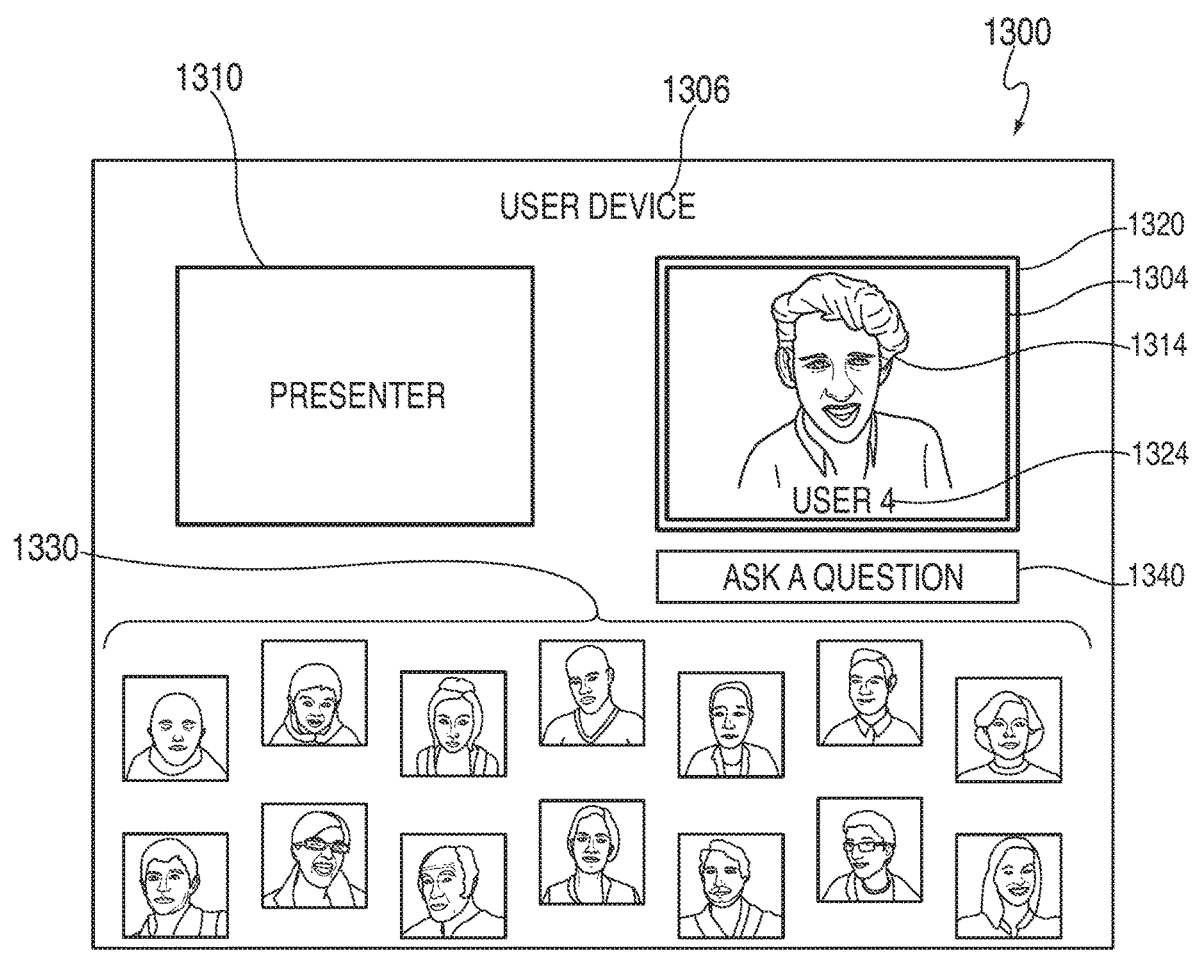
FIG. 13 is an illustrative diagram of a user interface displayed on a user device in accordance with various embodiments.

FIG. 13 is an illustrative diagram of a user interface displayed on a user device in accordance with various embodiments. User interface 1300 may be displayed on a user device, such as user device 104 of FIG. 1. In some embodiments, user interface 1300 may include presenter window 1310 and display screen window 1320. An online participant accessing an event or audience member attending the event may be presented with a presenter's video and/or audio via presenter 310 of FIG. 3, for example. As a particular example, the presenter may be displaying slides, and presenter window 1310 may display a live video feed of the slides. In some embodiments, the presenter may be accessing the event remotely, and presenter window 1310 may correspond to a live video feed from the presenter. For example, the presenter may be video conferencing into an event, and window 1310 may display a video stream of the presenter.

In some embodiments, display screen window 1320 may present a video and/or audio feed of a display screen presented within an event, such as display screen 320 of FIG. 3. In some embodiments, window 1320 may present a currently spotlighted online participant. The spotlighted online participant may be an online participant selected to have their corresponding indicator presented within the event. For example, in response to an online participant submitting a request to be selected, a host or administrator of an event may select the online participant. The selected online participant's indicator may be presented within a display screen of an event, such as display screen 600 of FIG. 6. Within the user interface, display screen window 1320 may be presented, which may include some or all of the presented content from the display screen within the event. For example, window 1320 may present content that may be substantially similar to content presented within display screen 600 of FIG. 6 or display screen 320 of FIG. 3.

Window 1320 may include a spotlighted online participant's indicator, video stream, and/or identifier. For example, window 1320 may include indicator 1304, which displays video stream 1314 and identifier 1324, and these may be substantially similar to indicator 604, video stream 614, and identifier 624 of FIG. 6, and the previous description of the latter may apply to the former. In some embodiments, window 1320 may include one or more additional indicators corresponding to additional online participants accessing the event. For example, window 1320 may include spotlighted indicator 1304 and one or more additional indicators that are not currently being spotlighted, but are also accessing the event.

In some embodiments, user interface 1300 may include device title 1306. Title 1306 may indicate who the corresponding device belongs to, or the name that the device may be registered under for the event. For example, an online participant may access an event and create a login nickname. In this scenario, title 1306 may indicate the login nickname for the user. In some embodiments, title 1306 may indicate the user's email address, full name, instant message name, or any other name or title, or any combination thereof.

User interface 1300 may also present audience members 1330. In some embodiments, the audience members may be displayed within a background or backdrop of user interface 1300. This may allow the user to view the audience in the background while presenter window and/or display screen window are displayed on the user interface. In some embodiments, audience members 1330 may be captured via one or more cameras located at the event, and may be transmitted from the cameras to each user device accessing the event. In some embodiments, audience members 1330 may include some members of the audience physically at the event, such as audience 330 of FIG. 3, and/or it may include one or more online participant's indicators who may be accessing the event remotely. Persons of ordinary skill in the art will recognize that any number of indicators or audience members may be presented with audience 1330. For example, user interface 1300 may be filled with various live images of the audiences members at the event, or it may be filled with dynamically changing images of the audience at the event. In the latter scenario, one or more cameras at the event may continually pan the audience and transmit the changing video content from the event to each user device. This may help establish the feeling for any online participant accessing the event, what it would feel like at to be located at the event.

In some embodiments, user interface 1300 may include button 1340. For example, button 1340 may correspond to an "Ask a Question" button that allows an online participant to submit a request to ask a question. In some embodiments, the user may press button 1340 in order to be selected to be spotlighted on the display screen. In some embodiments, pressing button 1340 may place the corresponding online participant within a queue of online participants who have also pressed a similar button on their device. Persons of ordinary skill in the art will recognize that button 1340 may correspond to any request that the user may be capable of making to the server or host, and the "Ask a Question" button is merely exemplary. Furthermore, user interface 1300 may include any number of buttons operable to transmit any number of requests, and the use of only one button 1340 is merely exemplary.

Figure 14:
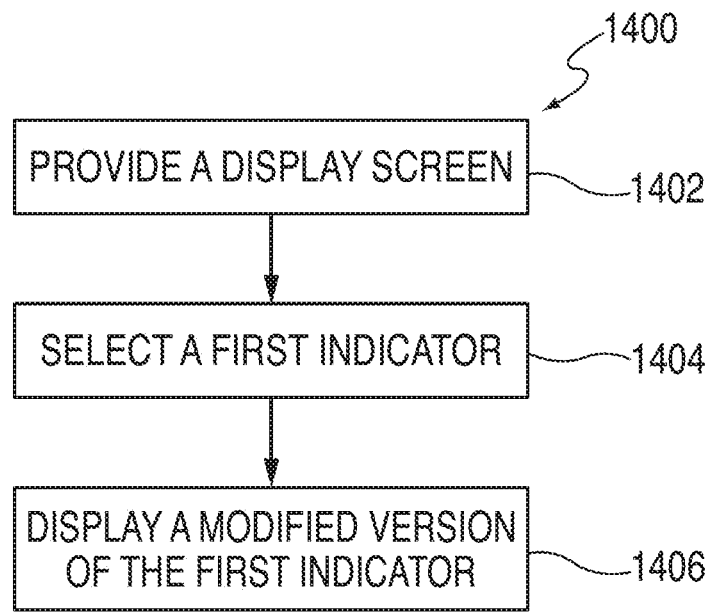
FIG. 14 is an illustrative flowchart of a process for integrating in-person and online aspects into a seamless event experience in accordance with various embodiments.

FIG. 14 is an illustrative flowchart of a process for integrating in-person and online aspects into a seamless event experience. Process 1400 may being at step 1402. At step 1402, a display screen may be provided within an event. For example, display screen 320 may be included within event area 300 of FIG. 3, which may be viewable by presenter 310 and/or audience 330. In some embodiments, the display screen may be proximate to the presenter. For example, display screen 320 may be located next to presenter 310 such that the presenter and the audience may be capable of viewing the display screen.

At step 1404, a first indicator corresponding to a first online participant of the event may be selected. For example, a plurality of online participants may access an event, such as an online class. Each online participant may have a corresponding indicator, such as indicators 401-409 of FIG. 4, which may be displayed on the display screen. The indicators may be capable of displaying audio, video, and/or textual communications for the corresponding online participant. For example, indicator 404 of FIG. 4 may include video stream 414, which may present video and/or audio for a corresponding online participant. In some embodiments, an indicator may be selected, such as indicator 514 of FIG. 5. The selection may be performed automatically by a server (e.g., server 102) and/or by a host or administrator of the event (e.g., host device 108).

In some embodiments, a request to be selected may be submitted by the first participant. For example, the first online participant accessing an online classroom may submit a request to ask a question. In some embodiments, a notification that a particular online participant has submitted a request may be displayed with the first indicator. For example, the first indicator may become bolded, highlighted, bounce, jiggle, and/or have a demarcation displayed along with it (e.g., a check mark).

At step 1406, a modified version of the selected indicator may be displayed on the display screen. In some embodiments, this may be referred to as spotlighting an indicator. In response to selecting indicator 504 to be spotlighted, an enlarged version of the indicator, such as indicator 604 of FIG. 6, may be displayed on the display screen. In some embodiments, upon being selected to be spotlighted, an audio output from the first online participant may be adjusted. For example, the audio of the spotlighted online participant may be raised so that the presenter, audience, and/or online participants may be capable of hearing the participant's comment or question more clearly. In some embodiments, displaying the modified version of the indicator and adjusting the audio of the indicator's corresponding online participant may occur at a substantially same time.

Figure 15:
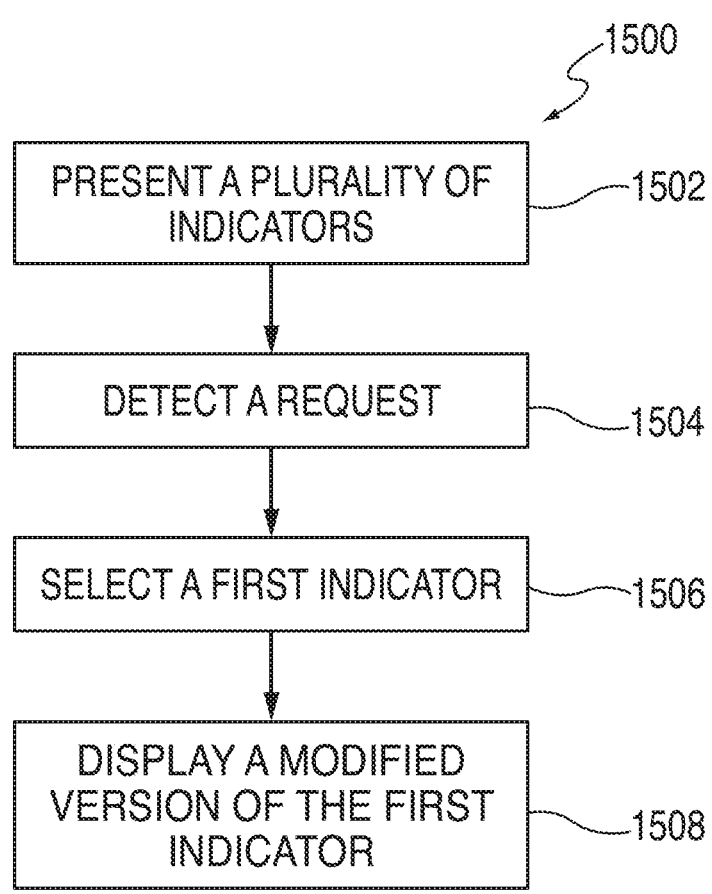
FIG. 15 is an illustrative flowchart of a process for integrating aspects into an event experience in accordance with various embodiments.

FIG. 15 is an illustrative flowchart of a process for integrating various aspects into an event experience in accordance with various embodiments. Process 1500 may begin at step 1502. At step 1502, a plurality of indicators may be presented on a display screen. For example, indicators 401-409 may be displayed on display screen 400 of FIG. 4. Each indicator may, in some embodiments, correspond to an online participant accessing an event. For example, each indicator may correspond to a student remotely accessing a class.

At step 1504, a host device may detect a request submitted by a first online participant accessing the event. For example, user device 104 of FIG. 1 may submit a request to host device 108, which may be transmitted across network 106. In some embodiments, the request may first go to a server, such as server 102, and then may be transmitted to the host device.

At step 1506, a first indicator corresponding to a first online participant may be selected using the host device. For example, an event administrator may select indicator 504 of FIG. 5 in response to receiving a request from the online participant corresponding to indicator 504.

At step 1508, a modified version of the selected indicator may be displayed on the display screen. For example, in response to selecting indicator 504, an enlarged version or spotlighted version of the indicator, such as indicator 604, may be displayed on the display screen. In some embodiments, steps 1506 and 1508 of FIG. 15 may be substantially similar to steps 1404 and 1406 of FIG. 14, and the previous description of the latter may apply to the former.

Figure 16:
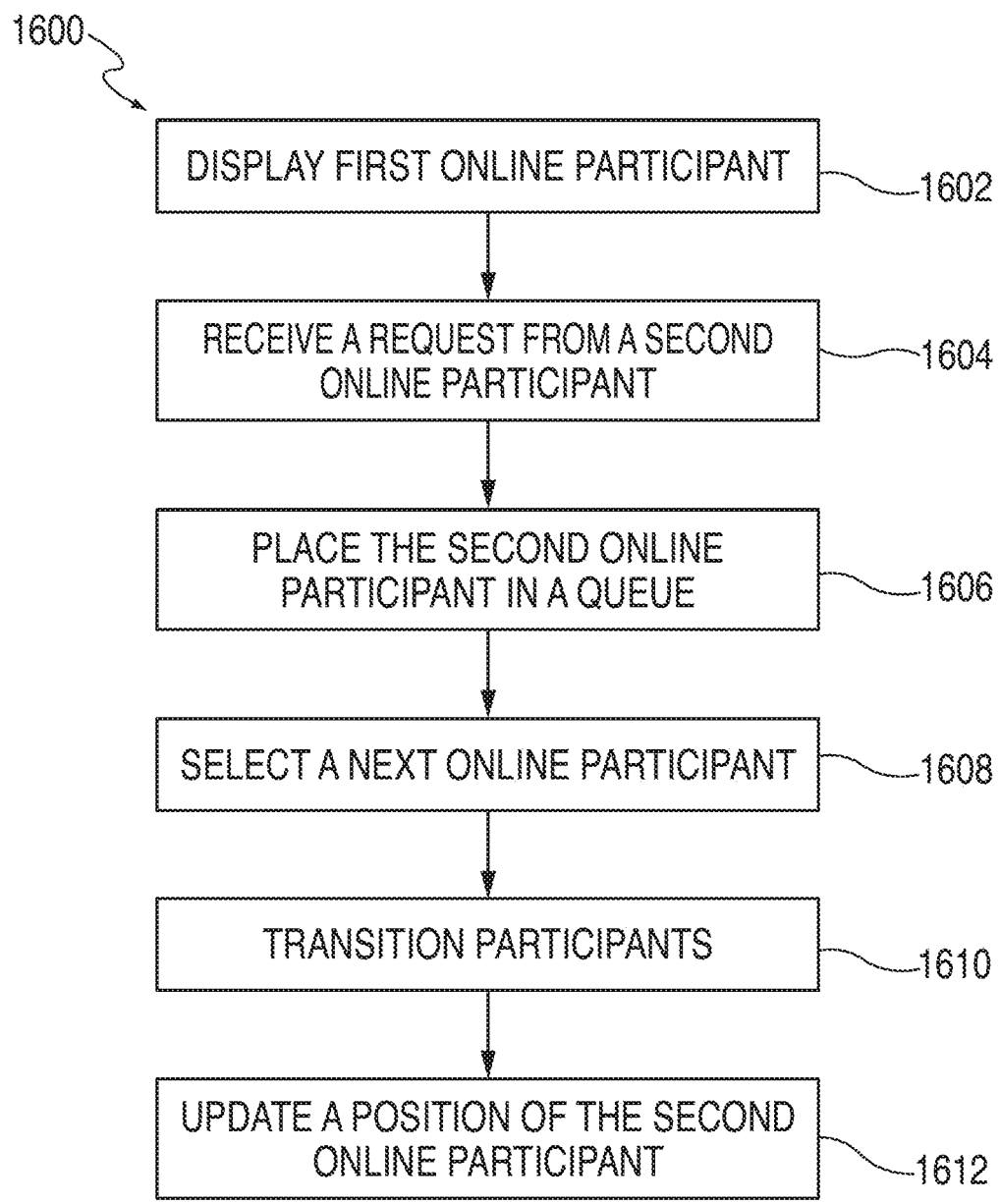
FIG. 16 is an illustrative flowchart of a process for organizing indicators for online participants of an event within a queue in accordance with various embodiments.

FIG. 16 is an illustrative flowchart of a process for organizing indicators corresponding to online participants of an event within a queue in accordance with various embodiments. Process 1600 may begin at step 1602. At step 1602, a first online participant may be displayed on a display screen at an event. For example, indicator 404 of FIG. 4 may be displayed on display screen 400. The displayed indicator may, in some embodiments, include video stream 414 and/or identifier 424 corresponding to the first online participant.

At step 1604, a request may be submitted by a second online participant of the event while the first online participant may be displayed on the display screen. For example, the online participant corresponding to indicator 1046 may submit a request to be selected while indicator 1004 is displayed on a display screen 1020. In some embodiments, a notification marker may be displayed along with the indicator in response to the request being submitted. For example, notification marker 1056 may be displayed with indicator 1046, signifying that the online participant corresponding to indicator 1046 has submitted a request.

At step 1606, the second online participant's indicator may be placed within a queue of other online participants' indicators that have also submitted requests to be selected. In some embodiments, the indicators within the queue may each have been selected or may have submitted a request to be selected. For example, online participants corresponding to indicators 1044, 1046, and 1048 may each have submitted a request to be selected. In response to submitting the request, the indicators may be placed within a queue. In some embodiments, the queue may be organized temporally such that as each online participant submits a request, they are placed within the queue in the order with which the requests have been received by the event's administrator. For example, the online participant corresponding to indicator 1044 may submit a request first, which may place that indicator within first position 1034 within the queue. After the first request has been submitted and the first position has been filled, the next online participant, corresponding to indicator 1046, may be placed in the queue at a second position after indicator 1044, such as second position 1036. Similarly, the online participant corresponding to indicator 1048 may have submitted a request after the online participants corresponding to indicators 1044 and 1046, which may cause indicator 1048 to be placed at third position 1038 within the queue.

At step 1608, a next online participant from within the queue may be selected. For example, the online participant corresponding to indicator 1044, located at first position 1034 of the queue, may be selected. In some embodiments, an indicator corresponding to the second, third, or fourth position within the queue may be selected. The administrator may select any indicator based on any suitable criteria. For example, the administrator may determine that a specific indicator located at a twentieth position within the queue corresponds to a particular online participant, and the administrator may select that indicator in response.

At step 1610, the selected online participant may be transitioned from the queue to being displayed on the display screen. In some embodiments, a currently displayed indicator may be removed from the display screen in response to the corresponding online participant ending their transmission and/or the administrator of the event ending the transmission. For example, an online participant may ask a question, and in response to finishing asking the question, the online participant's indicator may be removed from the display screen. Upon removal of the currently displayed indicator, a next indicator from the queue may be placed on the display screen. For example, indicator 1044, located in first position 1034 may be placed on the display screen in response to the currently displayed indicator being removed.

At step 1612, the position of the second online participant within the queue may be updated. In some embodiments, in response to placing an online participant's indicator on the display screen, that indicator may be removed from the queue. This may cause any indicators located at a subsequent position within the queue to be sequentially moved up in position within the queue. For example, if indicator 1044 has been selected, it may be removed from the queue and may no longer occupy first position 1034. In this scenario, indicator 1046 may update to now be located at position 1034, while indicator 1048 may now be located at position 1036.

In some embodiments, after an indicator has been selected, a notification may be transmitted to the corresponding online participant signifying that they have been selected. The notification may allow the corresponding online participant to be cognizant that their indicator, and thus their video stream, may be displayed on the display screen shortly. This may allow the online participants to make sure that they are fully prepared to be broadcasted to all individuals accessing the event.

In some embodiments, transitioning to the selected next online participant from the currently displayed online participant may occur automatically. For example, the server may detect that an online participant currently displayed on a display screen has ended their transmission. This may cause the server to automatically pull the next online participant from the queue and place that online participant's indicator within the display screen.

In some embodiments, the administrator may shuffle or move the indicators within the queue. For example, the indicators within the queue may be organized based on a format of the submitted request. For example, online participant's having video streams may be organized towards the front of the queue, while online participant's having only audio may be placed towards the back of the queue. In some embodiments, the content of the submitted request may help organize the position of the indicators within the queue. For example, online participants may submit specific questions to a presenter. The host or administrator may receive the questions first and, based the type of question or what the question is related to, may organize the indicators accordingly. This may allow the administrator to make sure that the most relevant and important questions are asked prior to any less relevant or less important questions being asked.

Figure 17:
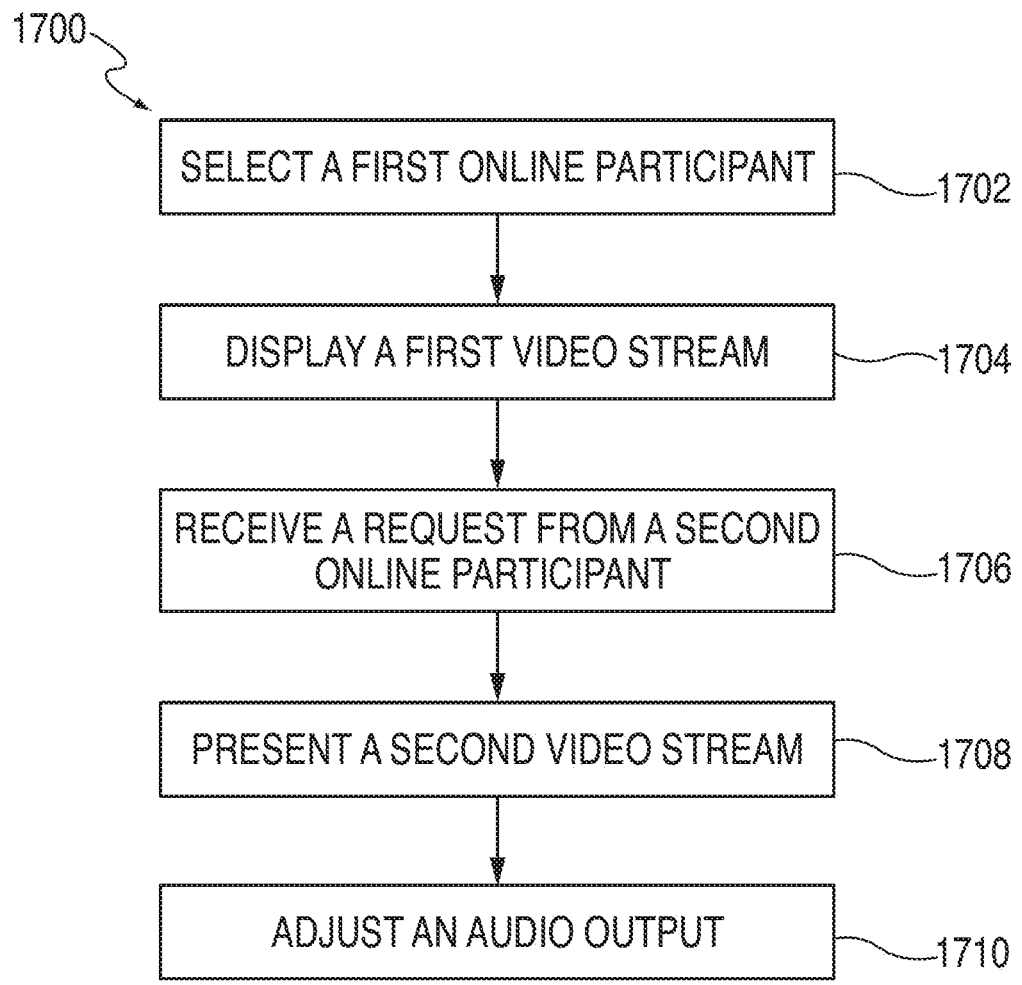
FIG. 17 is an illustrative flowchart for presenting multiple online participants within a live event in accordance with various embodiments.

FIG. 17 is an illustrative flowchart for presenting multiple online participants within a live event. Process 1700 may begin at step 1702. At step 1702, a first indicator corresponding to a first online participant may be selected from a plurality of online participants accessing an event. For example, online participants corresponding to indicators 401-409 may access an event, such as a class. In response to a request being submitted by a first online participant, a first indicator (e.g., indicator 404) corresponding to the first online participant may be selected (e.g., indicator 504).

At step 1704, a first video stream corresponding to the selected first indicator may be displayed on one or more display screens. For example, selected indicator 504 may include video stream 514. In response to being selected, indicator 604, which may correspond to a spotlighted version of indicator 504, may be displayed on display screen 604. In some embodiments, when spotlighted, the first online participant's video stream may be displayed in an enlarged format. For example, video stream 614 may be presented in a substantially full screen mode within display screen 600.

At step 1706, a request from a second online participant of the plurality of online participants may be received. For example, while indicator 1304 is displayed within display screen window 1320, a user, such as the user corresponding to the user device displaying user interface 1300, may submit a request to ask a question using button 1340. In some embodiments, the request may be received by a host or administrator of the event, such as by host device 108 of FIG. 1. In some embodiments, multiple online participants may submit request that are received by the event administrator.

At step 1708, a second video stream corresponding to the second online participant may be presented within one or more display screens. In some embodiments, the second video stream may be presented within a same display screen that the first video stream may currently be displayed on. For example, video stream 814 corresponding to indicator 804 may be presented within display screen 800 in addition to video stream 816 corresponding to indicator 806. In this scenario, both video streams, and thus both indicators, may be presented within a single display screen located at an event (e.g., display screen 320 of FIG. 3). In some embodiments, the first video stream and the second video stream may each be presented on separate display screens. For example, video stream 914, corresponding to indicator 904 may be presented on display screen 920, while video stream 916 corresponding to indicator 906 may be presented on display screen 922.

At step 1710, the audio outputted from the one or more display screens may be adjusted. In some embodiments, each video stream may include a video component and an audio component. Prior to being presented on the display screen(s), an online participant's audio output may be at a nominal level such that their audio output does not overshadow any currently spotlighted online participants and/or the presenter. However, in response to being selected to be spotlighted, the online participant's audio output may be raised. This may help ensure that the online participant's communications are heard/received by any participants accessing or attending the event. In some embodiments, in addition to raising the selected online participants' audio, any other online participants accessing the event may have their audio output lowered. This may help increase the prominence of the selected participants' audio and minimize any ambient noise from the other attendees.

Figure 18:
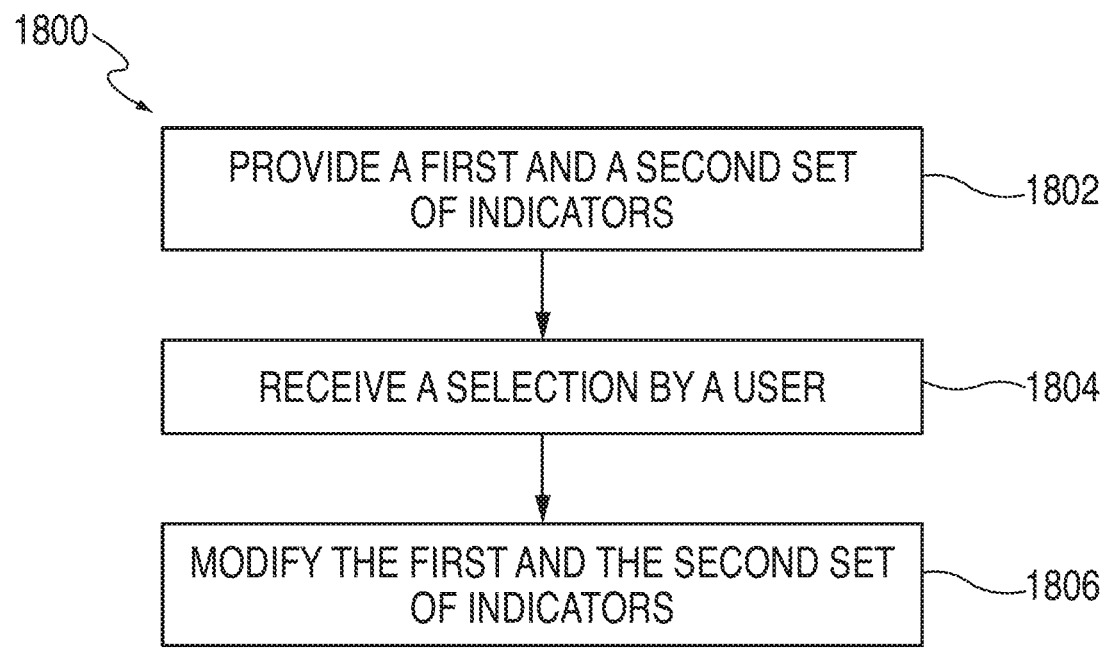
FIG. 18 is an illustrative flowchart for dynamically adjusting indicators for an event in accordance with various embodiments.

FIG. 18 is an illustrative flowchart for dynamically adjusting indicators for an event in accordance with various embodiments. Process 1800 may begin at step 1802. At step 1802, a first set of indicators and a second set of indicators may be provided on a display screen. For example, sets 1102 and 1104 may be provided on display screen 1100 of FIG. 11. In some embodiments, each indicator within the set may correspond to an online participant accessing the event. The indicators may include audio, video, still images, textual communications, and/or notifications transmitted from the corresponding online participant. For example, each indicator may include a video stream, such as video stream 414 of FIG. 4, which may allow continuous, intermittent, recorded, or any other form of video content to be transmitted by the online participant and displayed within the indicator on the display screen.

In some embodiments, the first set of indicators may be located within a first plane on the display screen, whereas the second set of indicators may be located within a second plane on the display screen. For example, set 1102 of FIG. 11 may be positioned at a first location within display screen 1100, whereas set 1104 may be positioned at a second location. The various planes of indicators may help create a 3-D array of indicators on the display screen. For example, the second plane may be positioned above the first plane, and may be smaller in size, creating an appearance that any indicators located in the second plane are actually "behind" any indicators located within the first plane. In some embodiments, the indicators located within the first plane may have a higher resolution than the indicators located in the second plane, corresponding to the depth perception created. This may help create the feeling that the various sets of indicators are located further back in space on the display screen, similar to how an audience at an event may appear to an individual looking out at the audience. In this scenario, individuals located in the front of the audience may appear clearer and larger than individuals located in the back of the audience, who may appear smaller and less clear. This same experience may be provided by displaying various sets of indicators within different planes on the display screen.

At step 1804, a selection by a user may be received. For example, a host or administrator of an event may be view sets of indicators 1102, 1104, 1106, and 1108 on their host device. In some embodiments, the administrator may desire to view one or more indicators within a set of indicators. The administrator may select a point on the display screen, such as selection marker 1110, which may be substantially close to or within a plane of a particular set of indicators. For example, selection marker 1110 may be located within the second plane where set 1104 may reside. The proximity of the selection marker to a particular set of indicators may correspond to the administrator, or user of the device displaying display screen 1100, intending to interact with that particular set of indicators. In some embodiments, the selection may be made directly within a set of indicators. Persons of ordinary skill in the art will recognize that the selection may be performed by any suitable tool or instrument including, but not limited to, one or more fingers (e.g., on a touch screen), a computer mouse, a stylus, or a computer compatible pen, or any other instrument, or any combination thereof.

At step 1806, the first set of indicators and the second set of indicators may be modified in response to the selection. For example in response to selecting a region on display screen 1100 (e.g., selection marker 1110), a determination may be made that the user may want to select set 1104. In response, set 1104 may be moved from being located within the second plane to being located within the first plane. In some embodiments, this may also cause set 1102 to be moved from the first plane to the second plane. For example, set 1204, which may be substantially similar to set 1104, may now be located within the first plane, whereas set 1202 may now be located within the second plane.

In some embodiments, in response to changing the location of the sets of indicators, the level of prominence of the indicators, clarity of the indicators, and/or size of the indicators may also change. For example, indicators located within the first plane may have a higher resolution than indicators located within the second plane. Therefore, in response to the selection, set 1104 may be moved the first plane and those indicators may receive a greater resolution, whereas set 1102 may be moved to the second plane and may have their resolution lowered. In some embodiments, indicators located within the first plane may present continuous video whereas indicators located within the second plane may include intermittent video. In this scenario, modifying the first and second set of indicators may cause set 1104 to change from presenting intermittent video to presenting continuous video as set 1204, and set 1102 may change form presenting continuous video to presenting intermittent video as set 1202.

Figure 19:
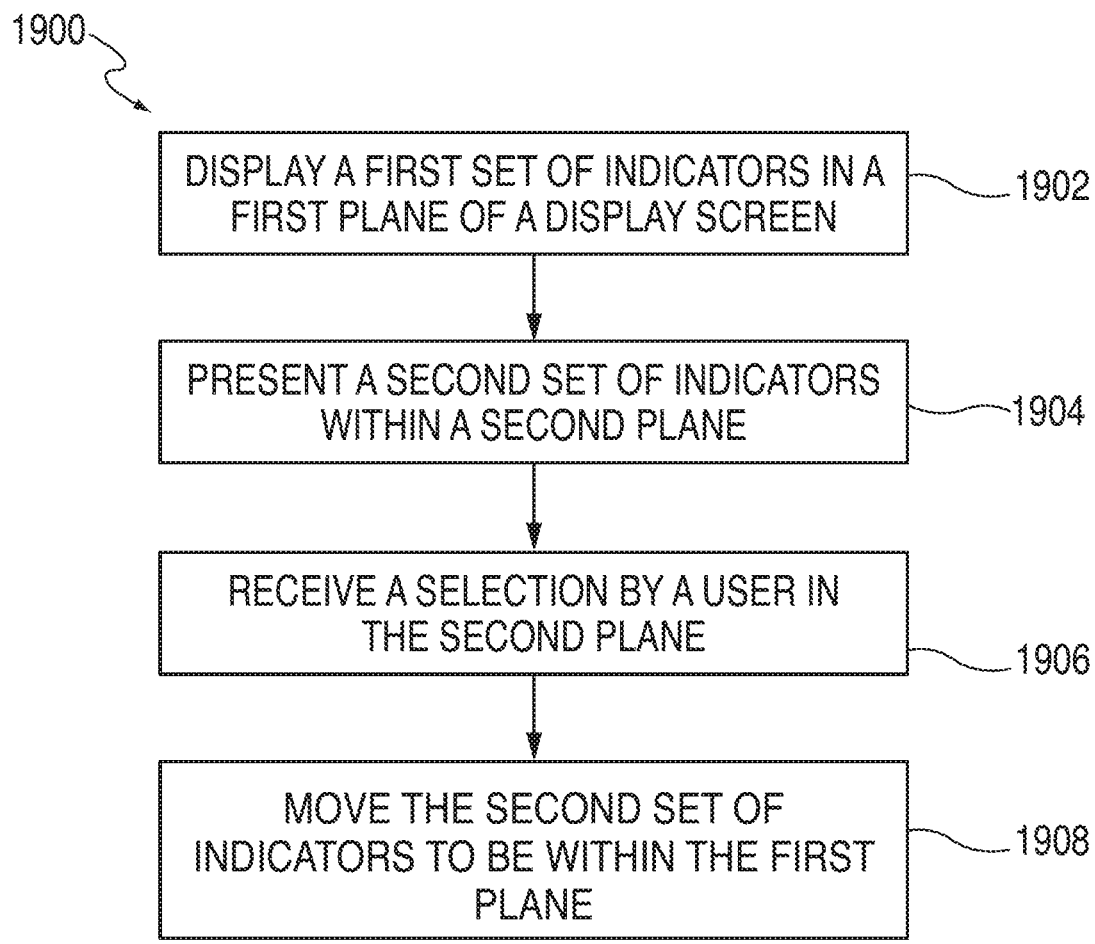
FIG. 19 is an illustrative flowchart for transition a plurality of indicators within a display screen in accordance with various embodiments.

FIG. 19 is an illustrative flowchart for transitioning a plurality of indicators within a display screen in accordance with various embodiments. Process 1900 may begin at step 1902. At step 1902, a first set of indicators may be displayed within a first plane of a display screen. For example, set of indicators 1102 may be displayed within a first plane of display screen 1100. At step 1904, a second set of indicators may be presented within a second plane of the display screen. For example, set of indicators 1104 may be presented within a second plane of display screen 1100. At step 1906, a selection from a user may be received in the second plane. For example, selection marker 1110 may be received by a user or host device displaying display screen 1100, and may be substantially proximate to set 1104. In some embodiments, steps 1902, 1904, and 1906 may be substantially similar to steps 1802 and 1804 of FIG. 18, and the previous descriptions may apply.

At step 1908, the second set of indicators may be moved to be within the first plane. For example, set 1104 may be moved to be located within the first plane where set 1102 may still reside. This may cause both the first and second sets of indicators to be displayed within a same plane. In some embodiments, any additional sets of indicators located within another plane on the display screen may adjust their position to "move up". For example, set 1106 may move from being located within a third plane on display screen 1100, to now be located within the second plane where set 1104 previously was located. In some embodiments, when set 1104 moves to be within the first plane, set 1102 may move to be within the second plane. For example, set 1204 of FIG. 12 may be located within the first plane on display screen 1200, whereas set 1202 may be located within the second plane.

Figure 20:
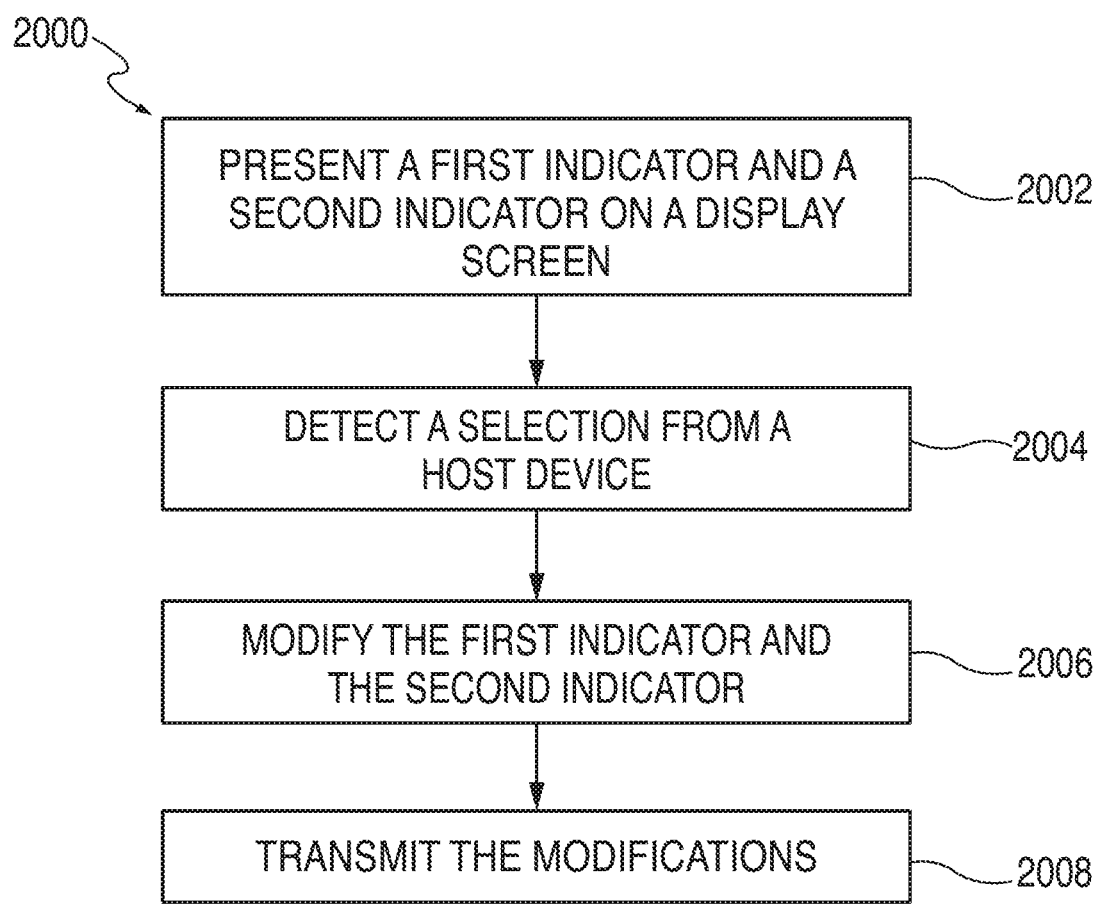
FIG. 20 is an illustrative flowchart for transmitting modifications of presented indicators to a host device in accordance with various embodiments.

FIG. 20 is an illustrative flowchart for transmitting modifications of presented indicators to a host device in accordance with various embodiments. Process 2000 may begin at step 2002. At step 2002, a first and second indicator may be presented on a display screen. For example, sets of indicators 1102 and 1104 may be presented on display screen 1100. As another example, indicators 401-409 may be presented on display screen 400 of FIG. 4.

At step 2004, a selection of the first indicator or the second indicator may be detected from the host device. For example, an administrator of an event may have a first indicator and a second indicator presented on their host device's display screen. Depending on the host's preference, he/she may select a particular indicator such as the first or second indicator.

At step 2006, the selected first or second indicator may be modified. For example, a first indicator from within set of indicators 1104 may be selected. In response to being selected, the indicator, and/or the set of indicators including the selected indicator, may change position or appearance within the display screen. For example, the selected indicator may be moved from a second plane on the display screen to a first plane on the display screen. As another example, the selected indicator may change from presenting intermittent video to presenting continuous video.

At step 2008, the modifications to the selected indicator may be transmitted to the host device. For example, if the host selects an indicator located within set 1104 of FIG. 11, then that indicator, or the set of indicators that includes the selected indicator, may be displayed in the position of set 1102. In this particular scenario, set 1104 may move to be located within a first plane, similar to set 1204 of FIG. 12. In some embodiments, the transmitted modifications may include adjusting the outputted audio. For example, the online participant corresponding to the selected indicator may have their audio raised, while other indicators corresponding to the other online participants may have their audio lowered.

Figure 21:
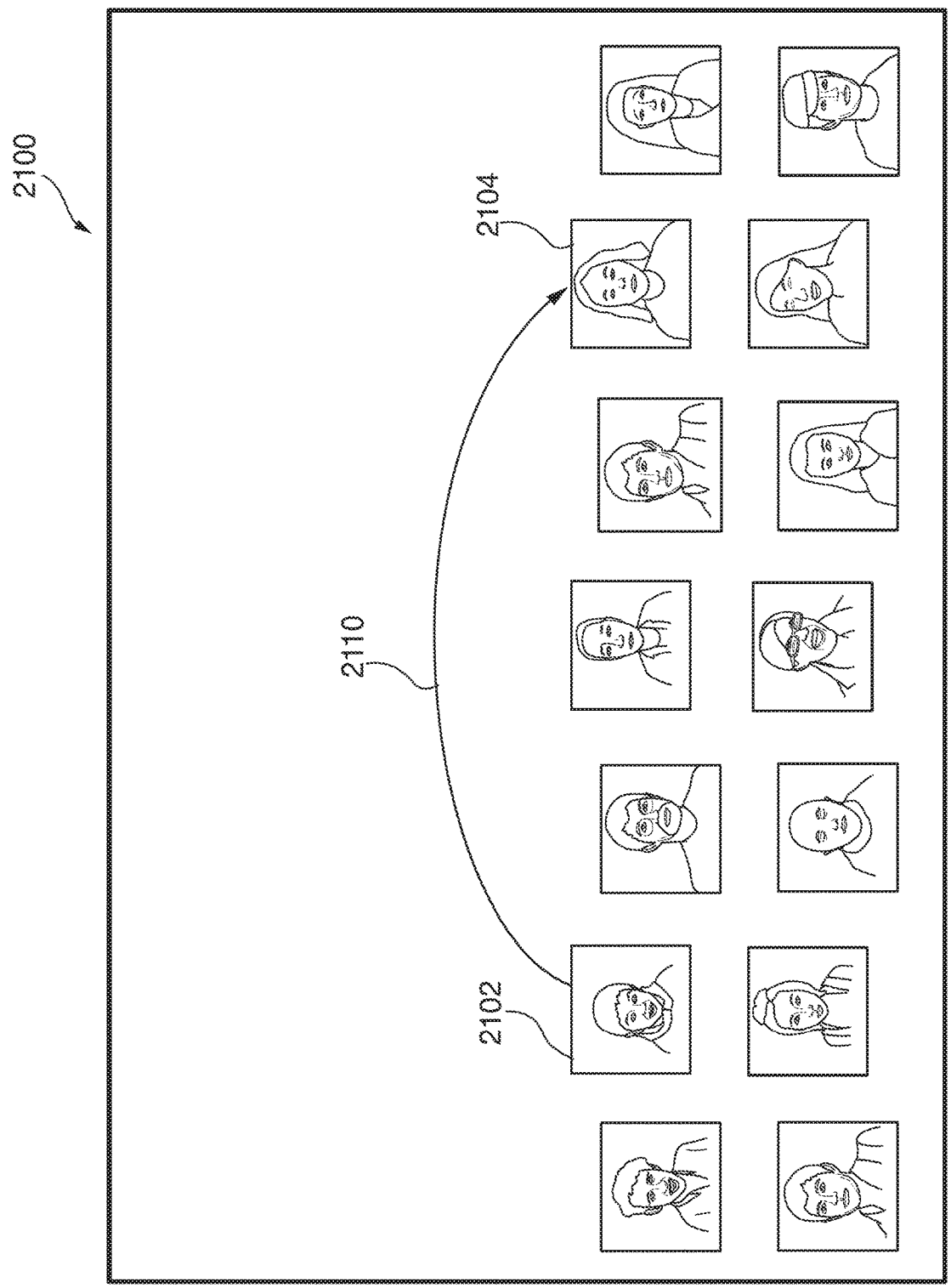
FIG. 21 is an illustrative diagram of a user interface displayed on a user device for forming group communications in accordance with various embodiments.

FIG. 21 is an illustrative diagram of a user interface displayed on a user device for forming group communications in accordance with various embodiments. User interface 2100 may be displayed on a user device, such as device 200 of FIG. 2. User interface may present an online event that a user may access. In some embodiments, one or more online participants may also access the event in addition to, or instead of, the user. For example, the user may be attending an online class, and user interface 2100 may display the online classroom as well as any other online participants (e.g., students) who may also be accessing the class.

In some embodiments, user interface 2100 may display a plurality of indicators corresponding to the user and/or the online participants accessing the online event. Continuing with the online class example mentioned above, user interface 2100 may display a plurality of indicators that may each correspond to a student "attending" the class. In some embodiments, each indicator displayed on the display screen may represent a particular online participant. The indicator may present to a static image, a video, a picture of the corresponding online participant, a periodically changing image, or any other type of displayable image that may be used to represent a participant of an event, or any combination thereof.

In some embodiments, user interface 2100 may include first indicator 2102, which may correspond to a first online participant accessing an event, and second indicator 2104, corresponding to a second online participant accessing the event. Persons of ordinary skill in the art will recognize that although only two indicators corresponding to two online participants are described, any number of indicators corresponding to any number of online participants may be displayed within user interface 2100, and the aforementioned is merely exemplary.

For example, user interface 2100 may display an indicator corresponding to every participant accessing the event, a selected number of indicators corresponding to some of the participants accessing the event, or no indicators. In some embodiments, user interface 2100 may only display an indicator corresponding to an online participant of the user device displaying user interface 2100. For example, indicator 2102 may correspond to an indicator representing an online participant of the user device displaying user interface 2100 (e.g., a user's indicator). In some embodiments, the participant may select which indicators are to be displayed on user interface 2100. However, the indicators displayed on the user interface may also be selected by an event administrator or an event moderator, for example.

In some embodiments, one or more online participants may be placed in a group within the online event. For example, while accessing an online class, one or more online participants may form a group to communicate with one another. For example, a first online participant corresponding to first indicator 2102 may seek to form a group with a second online participant corresponding to second indicator 2104. The first online participant may select second indicator 2104 to initiate the formation of the group. In response to the first online participant selecting the second indicator, a group may be formed that includes both the first and second online participant.

The selection of any indicator to form a group with that indicator's corresponding online participant may occur in any suitable fashion. For example, the first online participant may drag their indicator (e.g., indicator 2102) across user interface 2100 towards second indicator 2104, thereby forming a group between the first online participant and the second online participant. In some embodiments, user interface 2100 may be displayed on a touch-sensitive display screen, as described previously with regards to FIG. 2, which may allow the online participant to interact with the indicators directly using the touch-sensitive display screen.

Line 2110 may correspond to a path that first indicator 2102 may take when dragged across the display screen towards second indicator 2104 to form the group. Persons of ordinary skill in the art will recognize that although user interface 2100 illustrates first indicator 2102 being dragged along line 2110 to second indicator 2104 to form a group between the indicators corresponding online participants, this path is merely exemplary, and in some embodiments second indicator 2104 may be dragged across line 2110 to first indicator 2102 to the form the group, and/or the path taken by the indicators may go through other indicators. In some embodiments, the indicators may be swiped or flicked to form the group, or a user may tap or click on a particular indicator, or indicators, to the form a group. Persons of ordinary skill in the art will also recognize that any number of participants may be placed in a group, and the use of two online participants is merely exemplary.

Figure 22:
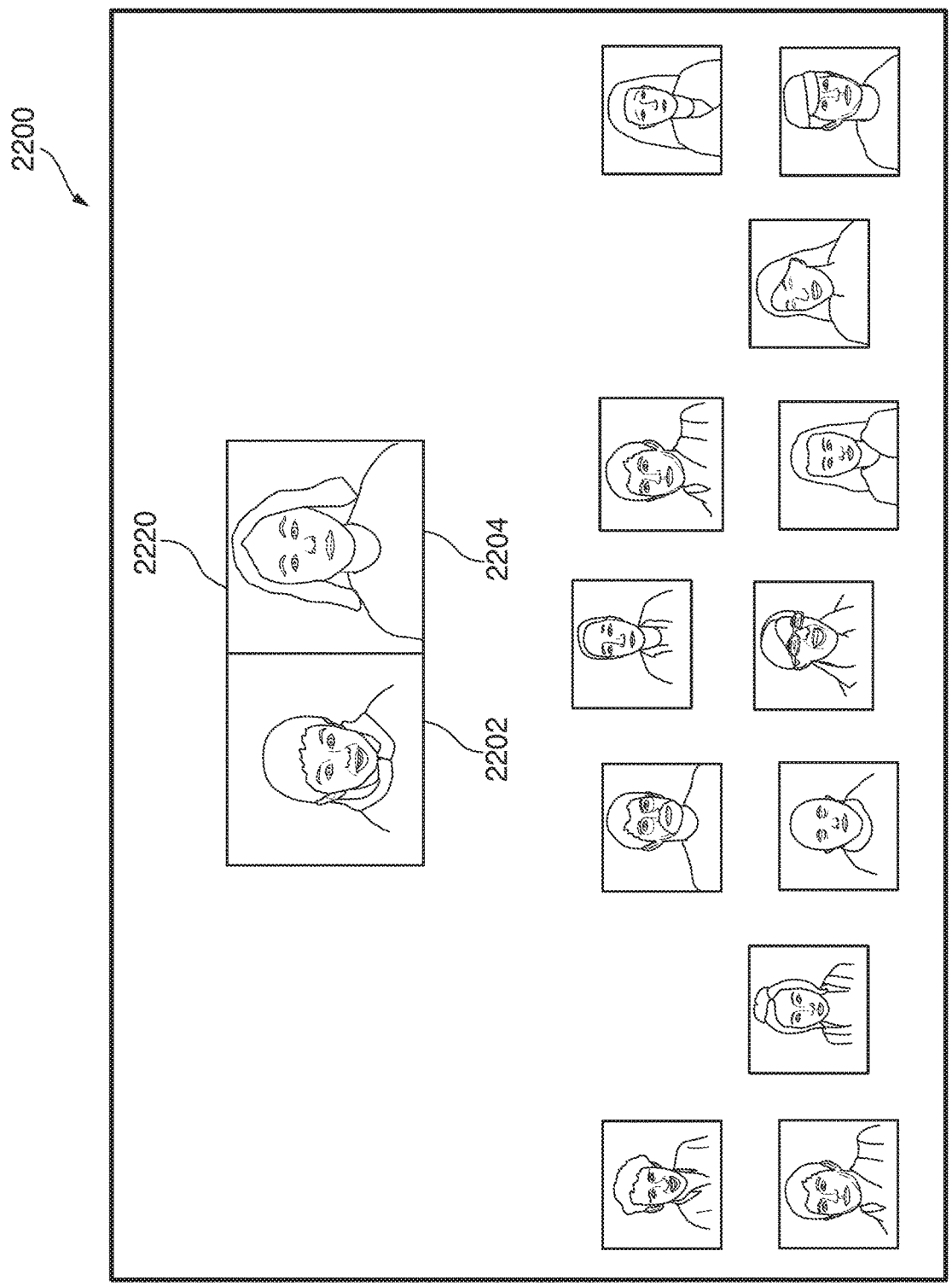
FIG. 22 is an illustrative diagram of a user interface displayed on a user device of a formed group in accordance with various embodiments.

FIG. 22 is an illustrative diagram of a user interface displayed on a user device of a formed group in accordance with various embodiments. In some embodiments, user interface 2200 may be substantially similar to user interface 2100 of FIG. 21, with the exception that user interface 2200 may include merged display 2220 displayed thereon. Merged display 2220 may include first indicator 2202 and second indicator 2204, which may, in some embodiments, be substantially similar to first indicator 2102 and second indicator 2104 of FIG. 21, and the previous description of the latter may apply.

In response to being selected, dragged, swiped, tapped, or any other user input used to place two or more online participants in a group, the online participants' indicators may be placed proximate to one another on user interface 2200 in merged display 2220 representative of the formed group. Merged display 2220 may therefore be seen by any online participating accessing the event. In some embodiments, merged display 2220 may be hidden so that other participants are not able to view the group, however this may be controlled by the any of the group's participants, the administrator, and/or event moderator.

Merged display 2220 may display indicators 2202 and 2204 in any suitable fashion. For example, indicator 2202 may be placed on a right or left side of indicator 2204, or it may be placed above or below indicator 2202. In some embodiments, the indicators may overlap one another or may merge into one indicator including images or video corresponding to each online participant of the group. The merged display may, in some embodiments, have a smaller or larger size than the two individual indicators have when placed next to one another. Persons of ordinary skill in the art will recognize that any orientation may be used to display merged display 2220, and the aforementioned are merely exemplary.

Prior to being placed in a group, each online participant accessing the event may be placed in a first communication mode with some or all of the other participants of the event. For example, each participant accessing the event may be placed in an instant ready-on mode of communication with each additional participant of the event. In the instant ready-on mode of communication, each online participant may fluidly join and/or leave groups and/or subgroups without hindering connections. As another example, each participant may initially be in an intermediate mode of communication with each additional participant of the event. In the intermediate mode of communication, participants may be capable of sending and/or receiving contextual communications. However, this is merely exemplary and the instant ready-on mode of communication and the intermediate communication mode may allow the participants to communicate in any suitable fashion. A more detailed description of modes of communication are described in U.S. Pat. No. 8,405,702, which is incorporated herein by reference in its entirety.

Each participant may, in some embodiments, be placed in the first communication mode upon accessing the online event. This may allow each participant to have an existing communication link created between some or all other participants of the event, making changing to a different communication mode easier due to the fact that a separate communication link may not need to be formed. For example, after a first online participant corresponding to first indicator 2202 and a second online participant corresponding to second indicator 2204 are placed in a group with one another, both participants may have their communication mode changed from the first communications mode to a second communications mode. In the second communications mode, the first and second online participants may be capable of communicating at a higher priority level with one another than when they were in the first communication mode. For example, the second communications mode may correspond to an intermediate communications mode, an active communications mode, or any other communications mode, or any combination thereof.

Figure 23:
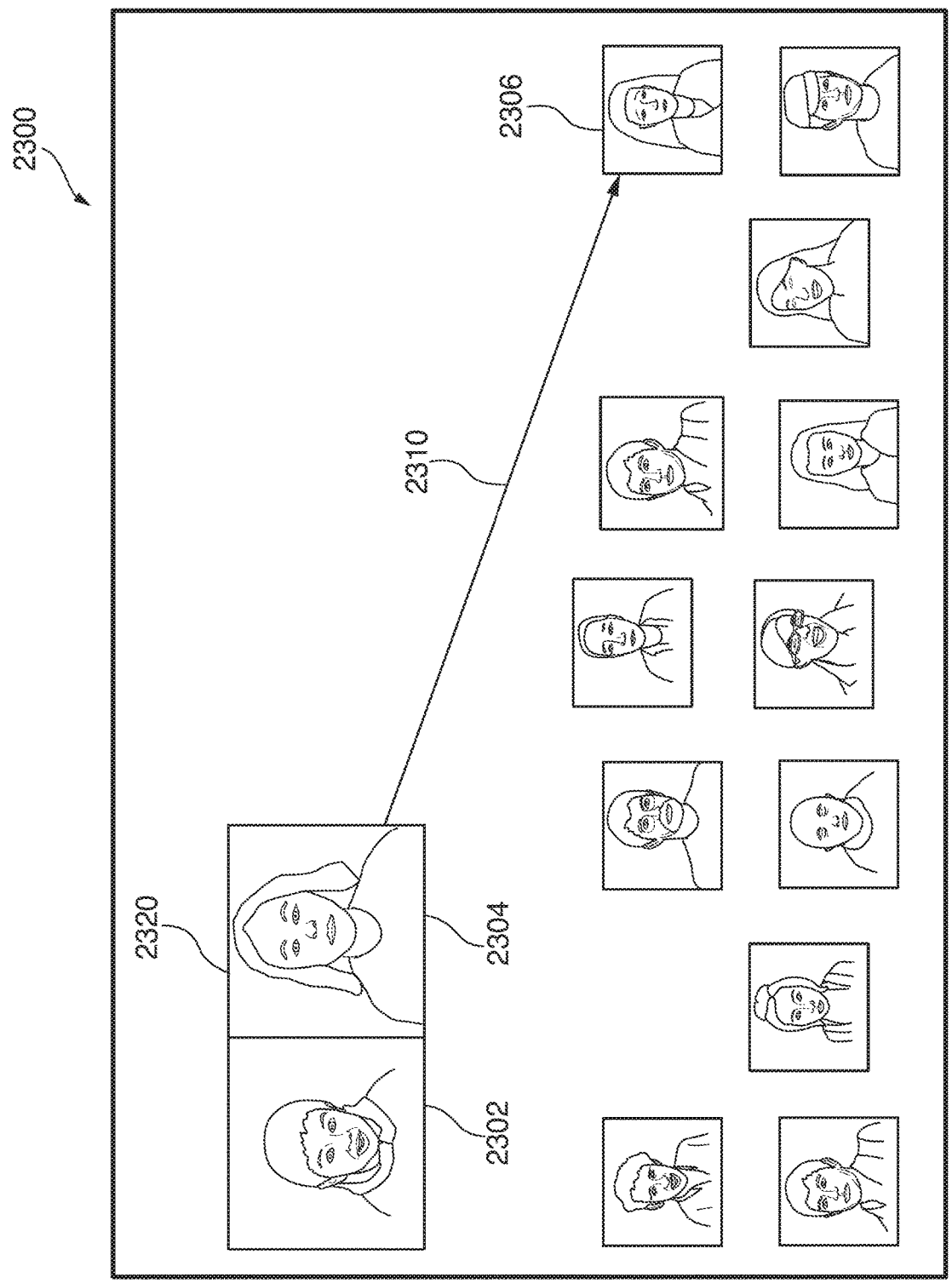
FIG. 23 is another illustrative diagram of a user interface displayed on a user device for forming group communications in accordance with various embodiments.

FIG. 23 is another illustrative diagram of a user interface displayed on a user device for forming group communications in accordance with various embodiments. User interface 2300 may be substantially similar to user interface 2100 of FIG. 21 with the exception that user interface 2300 may display merged display 2320 corresponding to an already existing group. In some embodiments, merged display 2320 may include two or more indicators, such as first indicator 2302 and second indicator 2304. Each indicator may represent an online participant accessing an event displayed on user interface 2300. For example, first indicator 2302 may correspond to a first online participant while second indicator 2304 may correspond to a second online participant. In some embodiments, indicators 2302 and 2304 may be substantially similar to indicators 2102 and 2104 of FIG. 21, and the previous description may apply.

In some embodiments, a member of the group may select one or more additional indicators, corresponding to one or more additional online participants accessing the event, to join group 2320. For example, third indicator 2306, corresponding to a third online participant accessing the event, may be displayed on user interface 2300 and may be selected to join the group by a group member. In some embodiments, only one group member may select additional indicator(s) to join the group, however in other embodiments each group member may have to approve of the additional indicator(s) in order for the online participant(s) to join. However, in some embodiments, only a majority of the group members may have to approve of the additional online participant's selection.

As an illustrative example, the second online participant, corresponding to second indicator 2304, may select third indicator 2306, corresponding to a third online participant, to join the group. The selecting and joining may be accomplished in any number of ways. For example, the second online participant may tap on third indicator 2306 on the display screen of their user device. As another example, a group member (e.g., the second online participant) may drag third indicator 2306 to merged display 2320 along line 2310 on the display screen of their user device. However, persons of ordinary skill in the art will recognize that any method may be used to add one or more additional participants to a group, and the aforementioned are merely exemplary.

Figure 24:
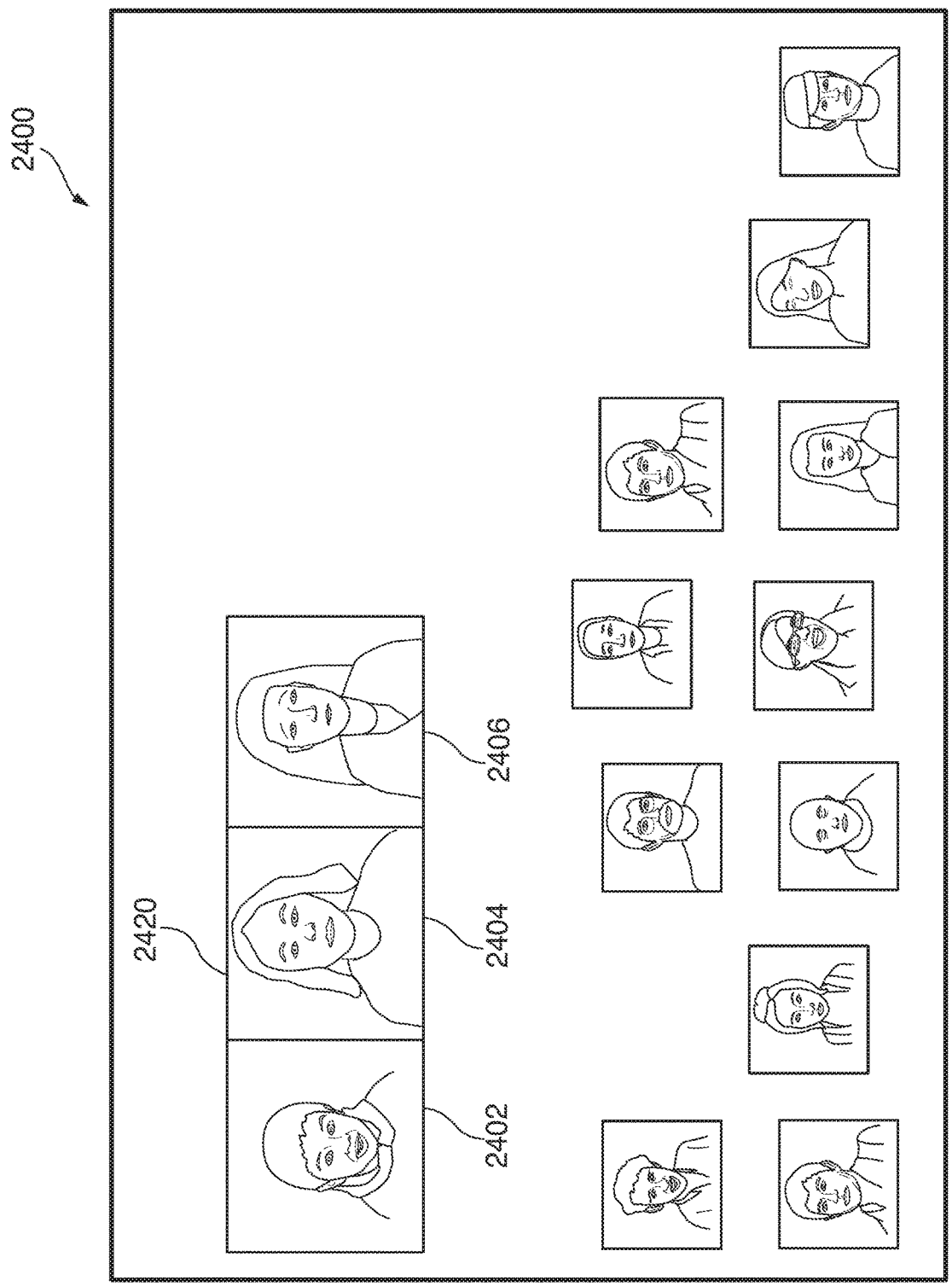
FIG. 24 is another illustrative diagram of a user interface displayed on a user device of a formed group in accordance with various embodiments.

FIG. 24 is another illustrative diagram of a user interface displayed on a user device of a formed group in accordance with various embodiments. User interface 2400 may be substantially similar to user interface 2300 with the exception that user interface 2400 may display new merged display 2420, which may include an added indicator corresponding to an additional online participant added to a pre-existing group, such as the group corresponding to merged display 2320 of FIG. 23. For example, as previously described above, third indicator 2306 may be selected and added to a pre-existing group, which included a first and second online participant accessing an online event. Merged display 2420, which corresponds to the new group, may display third indicator 2406 as well as first indicator 2402 and second indicator 2404. The third indicator (e.g., indicator 2406) may have been added to the group that initially included first indicator 2402 and second indicator 2404. For example, merged display 2420 may correspond to the updated version of merged display 2320 after indicator 2306 has been added. In some embodiments, indicators 2402, 2404, and 2406 may be substantially similar to indicators 2302, 2304, and 2306 of FIG. 23, and the previous description may apply.

In some embodiments, prior to joining the group, each participant may be in a first communication mode with one another. For example, each participant accessing the online event may be placed in an instant ready-on mode of communication, or an intermediate mode of communication, with each additional participant of the event. For example, a first online participant, corresponding to indicator 2302, and a second online participant, corresponding to indicator 2304, may be in a first communication mode with a third online participant, corresponding to indicator 2306. While in the first communication mode, each of the first, second, and third participants may be capable of receiving communications from a presenter of the online event. In response to joining group 2420, the first, second, and third participants may be also capable of transmitting/receiving video and/or audio communications between one another in addition to receiving communications from the presenter. In this way, the communication link between each participant may already be established and therefore, each participant's communication mode may be upgraded to facilitate the communications that will transpire within the group.

Figure 25:
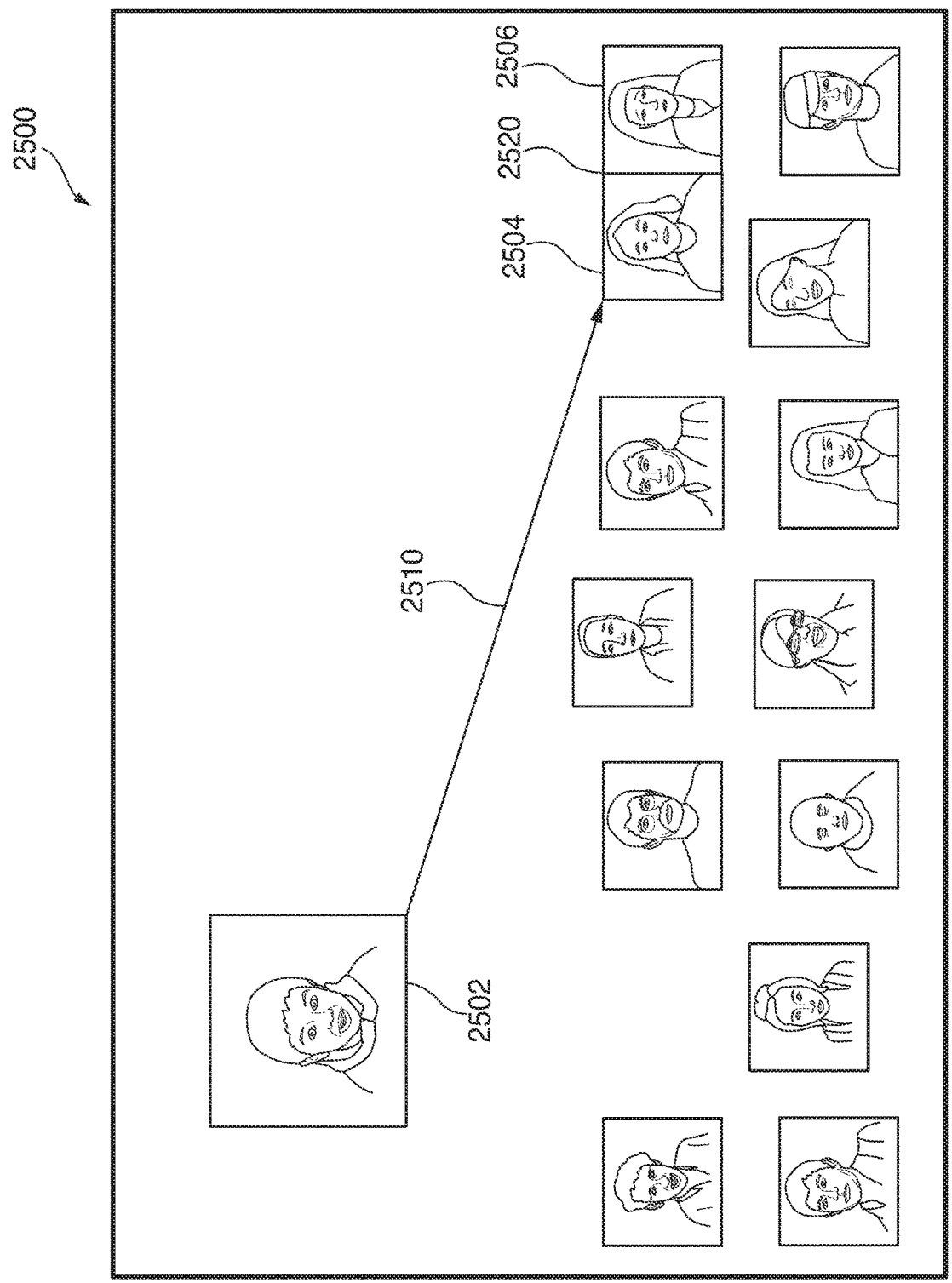
FIG. 25 is a illustrative diagram of a user interface displayed on a user device for forming group communications with a pre-existing group in accordance with various embodiments.

FIG. 25 is a illustrative diagram of a user interface displayed on a user device for forming group communications with a pre-existing group in accordance with various embodiments. User interface 2500 may be substantially similar to user interface 2300 of FIG. 23, with the exception that the former may correspond to a first online participant of an event joining a pre-existing group including two or more online participants.

User interface 2500 may display first indicator 2502 corresponding to a first online participant accessing an online event, as well as merged display 2520. Merged display 2520 may include second indicator 2504, corresponding to a second online participant, and third indicator 2506, corresponding to a third online participant. In some embodiments, merged display 2520, first indicator 2502, second indicator 2504, and third indicator 2506 may be substantially similar to merged display 2320, first indicator 2302, second indicator 2304, and third indicator 2306 of FIG. 23, and the previous descriptions may apply. In some embodiments, the first online participant may seek to join a group corresponding to merged display 2520. For example, a first online participant may see merged display 2520 and may attempt to join the corresponding group of participants represented thereby.

In some embodiments, the first online participant may drag their indicator (e.g., first indicator 2502) towards merged display 2520 to join the group on their user device's display screen. For example, first indicator 2502 may be dragged alone line 2510 towards merged display 2520 to initiate joining the group. In some embodiments, the first participant may select one or more indicators, or the merged display itself, to initiate joining the group. The selection of a group member's indicator or the merged display may accomplished using any suitable gesture or action including, but not limited to, a mouse click, a finger tap, a drag, a swipe, and/or a flick, or any other action, or any combination thereof.

Furthermore, in some embodiments, in response to the gesture or action being performed by an online participant to join a group, members of that group may be presented with one or more notifications that a new participant is attempting to join. The group members may each be presented with an option to allow the participant to join or not join, and in response to the group's selection, the participant may or may not be placed in the group. In some embodiments, only one group member may be needed to allow a new participant to join. For example, a first participant corresponding to indicator 2502 may click on second indicator 2504 corresponding to a second online participant. In this scenario, the second online participant may be presented with an option to allow the first participant to join the group. The second online participant may then, at their own discretion, confer with the other group members, or take action on their own. In some embodiments, the group members may be polled, and if a majority vote to let the new participant enter the group, the participant may be allowed to join.

In some embodiments, the group may be "closed" or "open". For example, a closed group may allow no additional participants to join the group. In this scenario, the group may reject any participant who attempts to join the group and/or only allow participants to join the group that have been selected by the group itself. An open group, however, may allow any additional online participant(s) to join.

In response to being allowed to join the group, user interface 2500 may display merged display 2520 including first indicator 2502, second indicator 2504, and third indicator 2506. For example, the new merged display may appear to be substantially similar to merged display 2420 of FIG. 24, and the previous description of the latter may apply. Furthermore, each participant's communication mode may also be modified in response to the new participant joining the group as described previously regarding user interface 2400.

Figure 26:
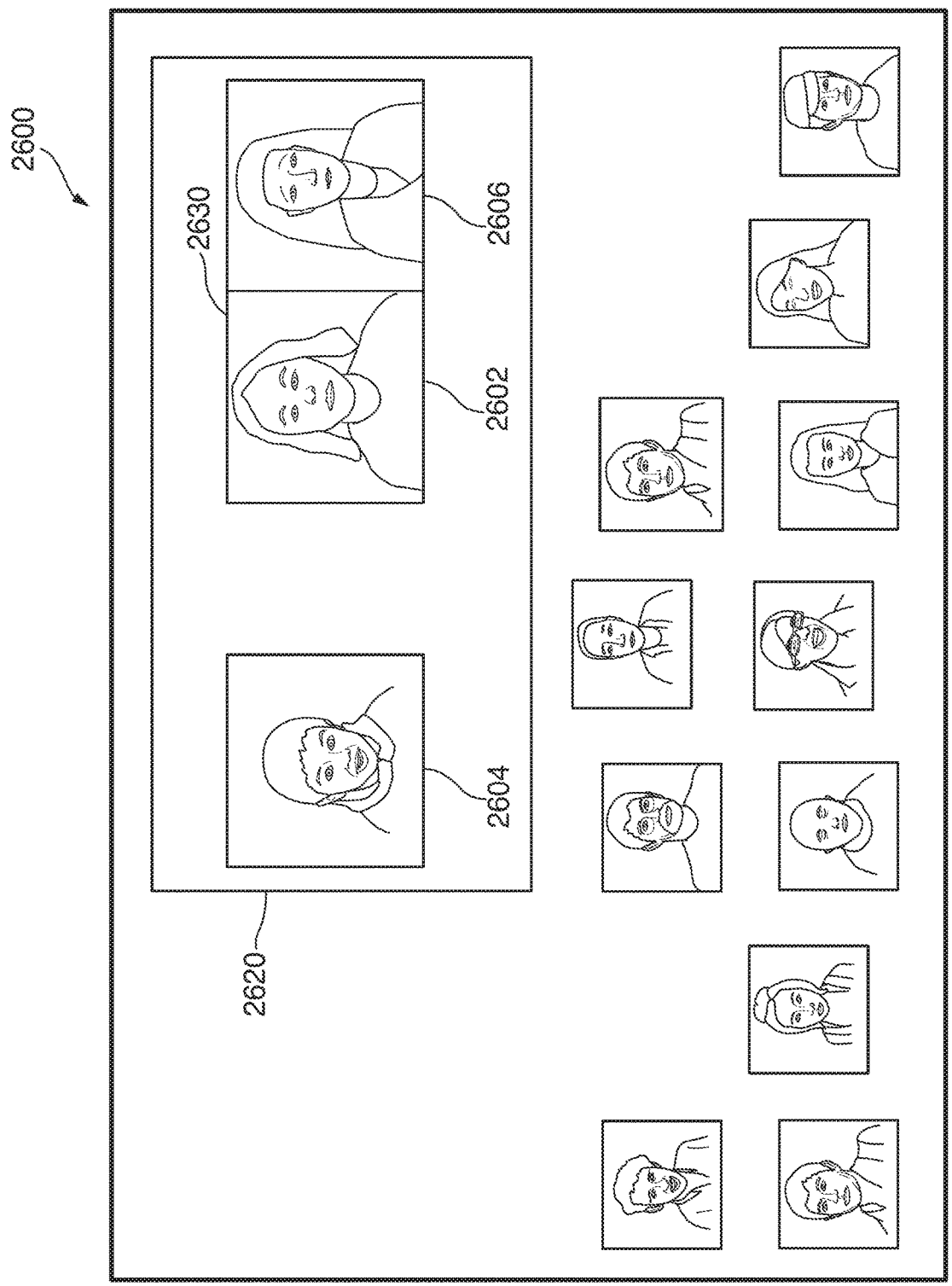
FIG. 26 is an illustrative diagram of a user interface displayed on a user device for forming group communications from a pre-existing group in accordance with various embodiments.

FIG. 26 is an illustrative diagram of a user interface displayed on a user device for forming group communications from a pre-existing group in accordance with various embodiments. User interface 2600 may be substantially similar to user interface 2400 of FIG. 24, with the exception that user interface 2600 may display a newly created group formed from a pre-existing group.

As previously mentioned, user interface 2400 of FIG. 24 may display merged display 2420 including three group members' indicators. The three group members may, for example, correspond to a first online participant, represented by first indicator 2402, a second online participant, represented by second indicator 2404, and a third online participant, represented by third indicator 2406. Each online participant may access an online event displayed on a display screen of their corresponding user device, such as user device 200 of FIG. 2. In this particular scenario, the first, second, and third online participants may be part of a group, however additional online participants may also access the event without being group members.

While in the group, each group member may communicate with the other group members in a first communication mode. For example, the group members may be in an active mode of communication with one another, which may allow them to transmit and receive audio, video, and/or contextual communications between one another. In some embodiments, group members in the first communication mode may be capable of transmitting and receiving prioritized communications between one another.

In addition to being in the first communication mode with the other group members, each group member may also be in a second communication mode with some or all of the additional online participants accessing the event, but who may not be group members. The second communication mode may allow the group members to still receive and/or transmit communications between the additional online participants accessing the event, albeit the communications may be received/transmitted at a lower priority level than communications received/transmitted within the group. For example, each member of the group may be able to communicate with one another using video communications, whereas additional online participants may only be able to transmit and/or receive audio and/or contextual communications with the group members. This may allow a group member to hold a private discussion or conversation with a select few participants while still receiving communications from the event.

As an illustrative example, a few students accessing an online class may form a group that may allow them to send video communication to one another but not to the other students also accessing the online class. The students within the group may still, however, be capable of receiving audio communications transmitted by one or more students or instructors of the online class, despite the fact that the other students or instructors may not be group members.

In some embodiments, one or more members of the group may wish to form a sub-group with one another. For example, merged display 2420 of FIG. 24 may initially include first indicator 2402, second indicator 2404, and third indicator 2406, respectively corresponding to a first, second, and third online participant. In some embodiments, the first online participant and the third online participant may seek to form a sub-group with one another while still being members of the group. This may allow for some group members to communicate with one another using a different communication mode than that with which the other group members communicate by.

Referring now to user interface 2600, first indicator 2602, corresponding to the first online participant, second indicator 2604, corresponding to the second online participant, and third indicator 2606, corresponding to the third online participant, may each be group members of the group represented by merged display 2620, which may be substantially similar to merged display 2420 of FIG. 24. For example, each participant the group may be in a first communication mode with the other participants within the group, as well as being in a second communication mode with some or all of the additional online participants accessing the event who are not members of the group.

In some embodiments, one or more group members may seek to form a sub-group. For example, the first participant, corresponding to indicator 2602, may seek to form a sub-group within the group represented by merged display 2620 including the third participant, corresponding to indicator 2606. In this scenario, the first online participant may send a request or notification to the third online participant to form a sub-group. The request/notification may, in some embodiments, not be viewable by the second online participant. In response to accepting the request/notification, the first and third online participants may be placed in a new group. For example, indicators 2602 and 2606, corresponding respectively to the first and third online participants, may be placed in a sub-group represented on the user interface by merged display 2630.

Members of the sub-group may be capable of communicating with one another in a third communication mode. In some embodiments, the third communication mode may receive a higher priority level than the first and/or second communication mode. For example, communications transmitted between the first online participant and the third online participant may take priority over any communications transmitted by the second online participant to each of the first and third online participants. This may allow members of the sub-group to freely communicate with one another without interference from other group members of the group.

As an illustrative example, students in a class may have formed group (e.g., represented by merged display 2620) to discuss a problem. One of the students (e.g., the first online participant) may want to ask another student (e.g., the third online participant) a question without any of the other group members hearing or knowing. In this scenario, the student may form a sub-group (e.g., represented by merged display 2630) to discuss the question with the other student without the other members of the group, or any other students being aware or receiving their communications. However, while in the sub-group, the group members may still be capable of receiving communications from the group members and/or any other online participants accessing the event, however, those communications may be received using a different communication mode. For example, the first online participant and the third online participant may communicate using a first communication mode, whereas second online participant may communicate with the first and third online participants using a second communication mode. The second communication mode may be lower in priority than the first communication mode.

Figure 27:
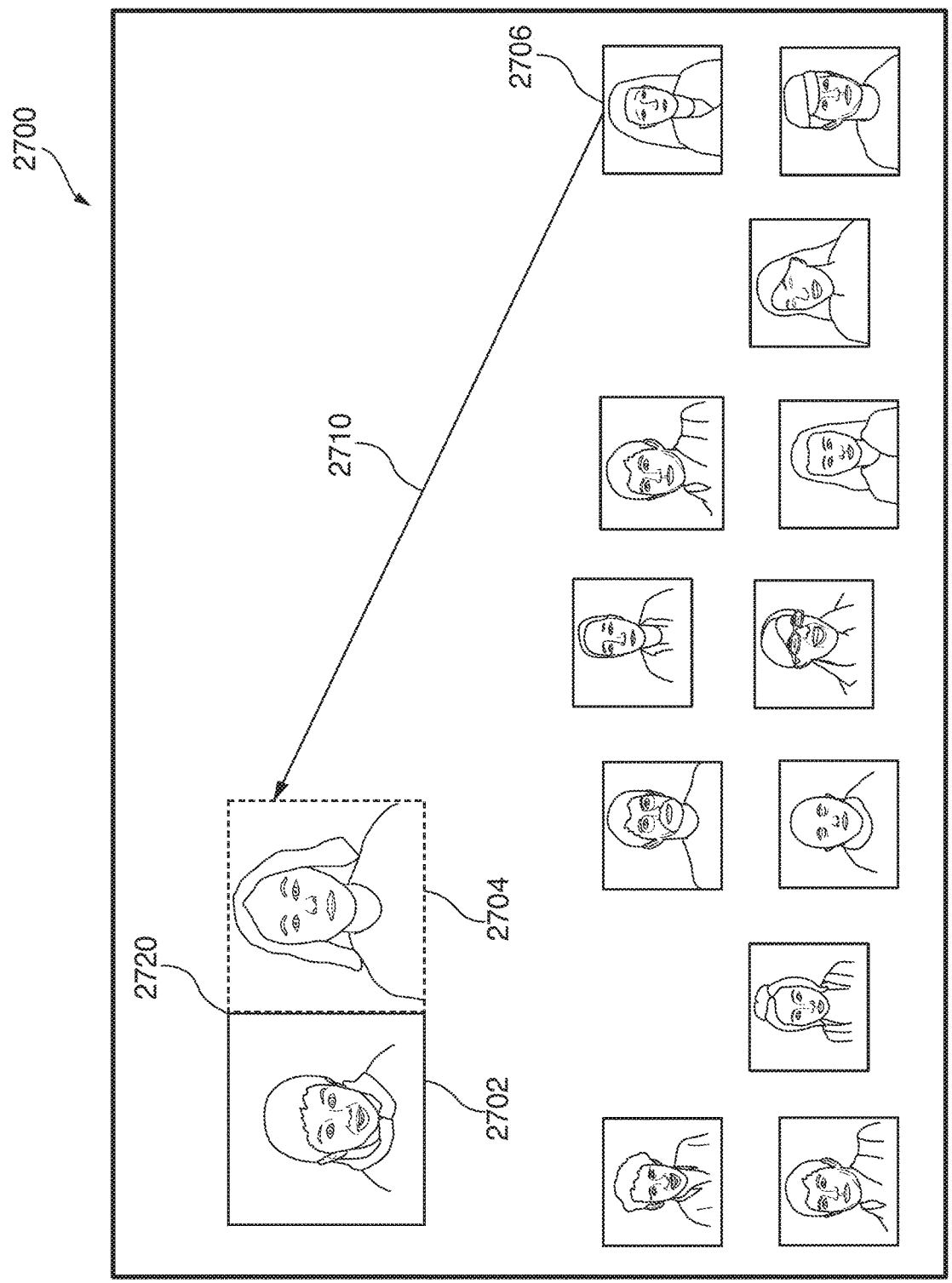
FIG. 27 is still another illustrative diagram of a user interface displayed on a user device relating to a user attempting to form a group from a pre-existing group in accordance with various embodiments.

FIG. 27 is still another illustrative diagram of a user interface displayed on a user device relating to a user attempting to form a group from a pre-existing group in accordance with various embodiments. User interface 2700 may be substantially similar to user interface 2300 of FIG. 23, with the exception that the former relates to forming a group including one or more members of a pre-existing group.

User interface 2700 may include first indicator 2702, corresponding to a first online participant, and second indicator 2704, corresponding to a second online participant, who are both members of a group represented by merged display 2720, as well as third indicator 2706 corresponding to a third online participant. In some embodiments, first indicator 2702, second indicator 2704, third indicator 2706, and merged display 2720 may be substantially similar to first indicator 2302, second indicator 2304, third indicator 2306, and merged display 2320 of FIG. 23, and the previous description may apply.

In some embodiments, the third online participant may seek to form a group including one or more online participants who are currently members of a pre-existing group. For example, the third online participant may seek to form a group with the second online participant, who may already be a member of a group that does not include the third online participant. In this scenario, the third online participant may select second indicator 2704, corresponding to the second online participant, to initiate the new group's formation. In some embodiments, the third online participant may drag their indicator (e.g., third indicator 2706) along line 2710 towards second indicator 2704, corresponding to the second online participant, on a display screen of their user device.

In some embodiments, in response to the third online participant selecting second indicator 2704, the second online participant may receive a notification that they are being requested to form the new group with the third online participant. The second online participant may be able to then either accept or reject the invitation to join the new group. In some embodiments, in response to receiving the request to form a new group with the third online participant, the second online participant may in turn send a request for the third online participant to join the pre-existing group instead. However, this may depend on the policies or practices for adding new members that the pre-existing group follows.

In response to an online participant accepting a request join a new group, the online participant may choose to either stay in the group they are currently in or leave their current group. For example, the second online participant may choose to leave the pre-existing group in response to accepting the third online participant's request to join the new group. In this scenario, communications between the second online participant and any other group members of the pre-existing group may modify. This may include the second online participant having the communications from the pre-existing group changed from a first communication mode to a second communication mode. In some embodiments, this may correspond to the second online participant receiving communications from members of the pre-existing group at a same priority level as any other participant accessing the event. In some embodiments, this may correspond to the second online participant receiving communications from the group that have only been made public.

As another example, the second online participant may choose to remain in the pre-existing group while still joining the new group. This may place the user in a substantially similar scenario to that of the sub-group represented by merged display 2630 of FIG. 26, in that the online participant may still receive communications from group members of the pre-existing group at a first priority level, but now may also receive communications from the third online participant at a second priority level, which may be higher than the first priority level.

Figure 28:
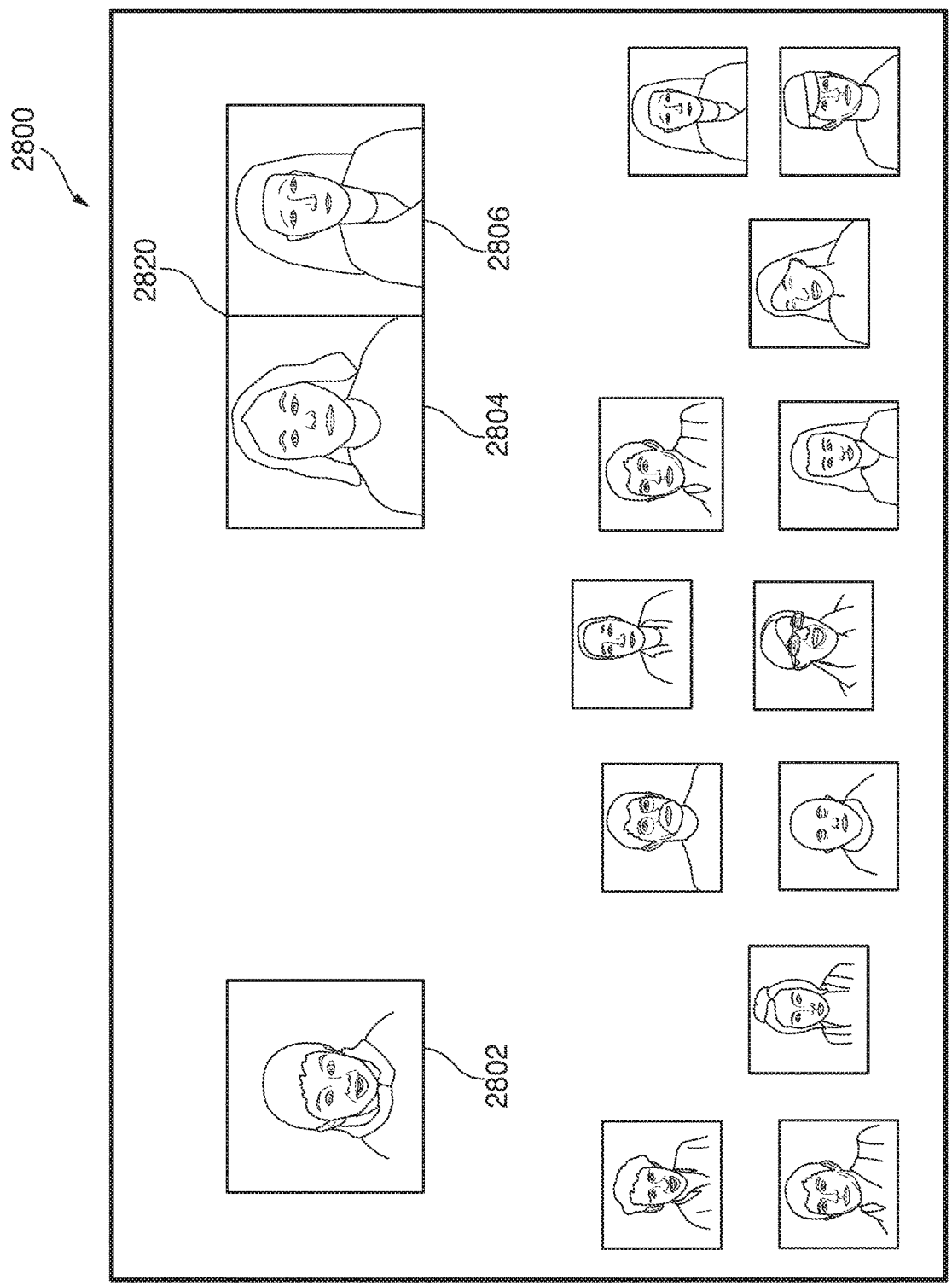
FIG. 28 is still another illustrative diagram of a user interface displayed on a user device of a formed group in accordance with various embodiments.

FIG. 28 is still another illustrative diagram of a user interface displayed on a user device of a formed group in accordance with various embodiments. User interface 2800 may be substantially similar to user interface 2700 of FIG. 27 with the exception that user interface 2800 may display a scenario where an online participant has left one group to join another group.

As previously mentioned, the third online participant, corresponding to indicator 2706 of FIG. 27, may request to form a new group with the second online participant corresponding to indicator 2704, who may already be a member of a pre-existing group (e.g., the pre-existing group represented by merged display 2720 of FIG. 27). In some embodiments, in response to accepting the request to join the new group, the second online participant may leave the initial group to form the new group with the third online participant.

Merged display 2830 may correspond to the newly formed group. Merged display 2830 may include second indicator 2804, corresponding to the second online participant, and third indicator 2806, corresponding to the third online participant. In some embodiments, merged display 2830 may be substantially similar to merged display 2630 of FIG. 26, and the previous description may apply.

User interface 2800 may also display merged display 2820, which may include first indicator 2802 corresponding to a first online participant. In some embodiments, merged display 2820, first indicator 2802, second indicator 2804, and third indicator 2806 may be substantially similar to merged display 2720, first indicator 2702, second indicator 2704, and third indicator 2706 of FIG. 27, and the previous description may apply.

After the second online participant joins the new group with the third online participant, they may be placed in a third communication mode with one another. In the third communication mode, members of the new group may be able to receive and transmit communications to other members of the new group at a higher priority than other communications sent and/or received from other online participants not in the group. For example, the second and third online participants of the new group may communicate using video communications, whereas the first online participant and the second online participant may communicate via audio communications. Persons of ordinary skill in the art will recognize, however, that any number of participants may be placed in any number of groups, and each participant may communicate with other participants using any suitable communication mechanism, and the aforementioned illustrations are merely exemplary.

Figure 29A:
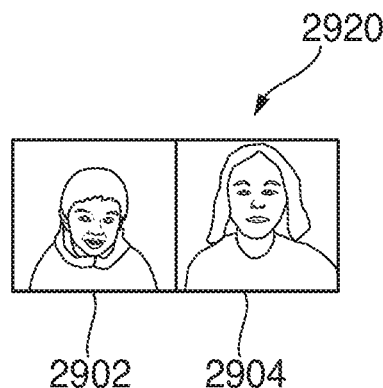
FIGS. 29A-C are various illustrative diagrams of merged displays in accordance with various embodiments.
Figure 29B:
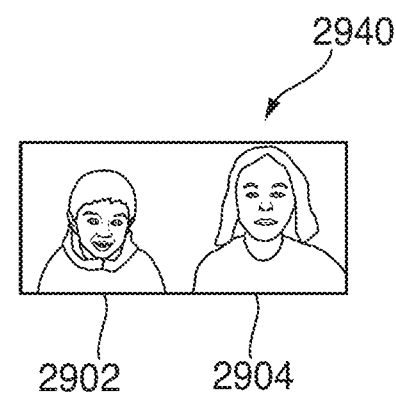
Figure 29C:
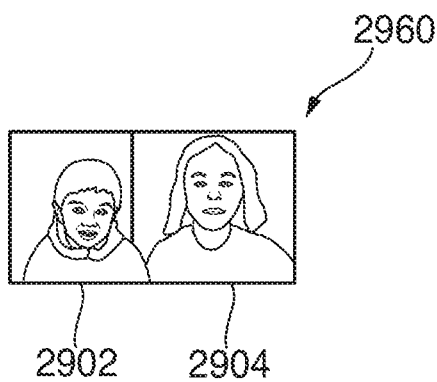

FIGS. 29A-C are various illustrative diagrams of merged displays in accordance with various embodiments. FIG. 29A is a first exemplary embodiment of a merged display. Merged display 2920 may be substantially similar to merged display 2220 of FIG. 22, and the previous description may apply. Merged display 2920 may include first indicator 2902 and second indicator 2904 merged together symmetrically. In this particular scenario, first indicator 2902 may be placed horizontally proximate to second indicator 2904 such that the two indicators are aligned horizontally. Initially, first indicator 2902 and second indicator 2904 may each have a substantially same size and shape (e.g., square). After indicators 2902 and 2904 have formed merged display 2920, the merged display may now still have a same height as indicators 2902 and 2904, however, merged display 2920 may have double the width. This may correspond to merged display 2920 being substantially rectangular in shape.

In some embodiments, merged display 2920 may have indicators 2902 and 2904 merged together slightly off axis from the horizontal. For example, instead of being aligned proximate to one another horizontally, one of indicators 2902 and 2904 may be slightly raised or lowered with respect to the horizontal alignment axis. However, persons of ordinary skill in the art will recognize that merged display 2920 may display indicators 2902 and 2904 in any suitable format, and the aforementioned are merely exemplary. For example, in some embodiments, indicator 2902 and 2904 may be on opposite sides (e.g., indicator 2904 on a left side and indicator 2902 on a right side), or indicators 2902 and 2904 may be stacked vertically. Persons of ordinary skill in the art will further recognize that although merged display 2920 displays only two indicators merged together, any number of indicators may be included therein, and the use of two indicators is merely for simplicity.

FIG. 29B is a second example of a merged display in accordance with various embodiments. Merged display 2940 may include first indicator 2902 and second indicator 2904 merged together without any separation. For example, merged display 2920 of FIG. 29A included indicators 2902 and 2902 placed together, however each indicators' general shape and size remained the same. Merged display 2940 may correspond to a scenario where each of the images or video streams depicted within indicators 2902 and 2904 may be placed within a pre-shaped and pre-sized merged display. For example, merged display 2940 may have a general shape of a rectangle, which may be substantially the same height as indicators 2902 and 2904, but may be slightly smaller in width than indicators 2902 and 2904 when combined. Thus, the overall size of merged display 2940 may be smaller than that of merged display 2920. Persons of ordinary skill in the art will recognize that although merged display 2940 is slightly smaller in shape in width as compared to merged display 2920, this is merely exemplary, and merged display 2940 may have a same width as one of indicators 2902 and 2904 and a height that is slightly smaller than the combined height of both indicators (e.g., vertically stacked).

FIG. 29C is a third example of a merged display in accordance with various embodiments. Merged display 2960 may be substantially similar to merged display 2940 of FIG. 29B, with the exception that the former may include both indicators 2902 and 2904 slightly overlapping one another. For example, indicator 2904 may be placed proximate to indicator 2902 such that indicator 2904 overlaps with a portion of indicator 2902. In this particular scenario, the width of merged display 2960 may be slightly smaller than the combined width of indicators 2902 and 2904, however both indicators displayed images and/or video streams may be preserved, similar to merged display 2920 of FIG. 29A.

Figure 30:
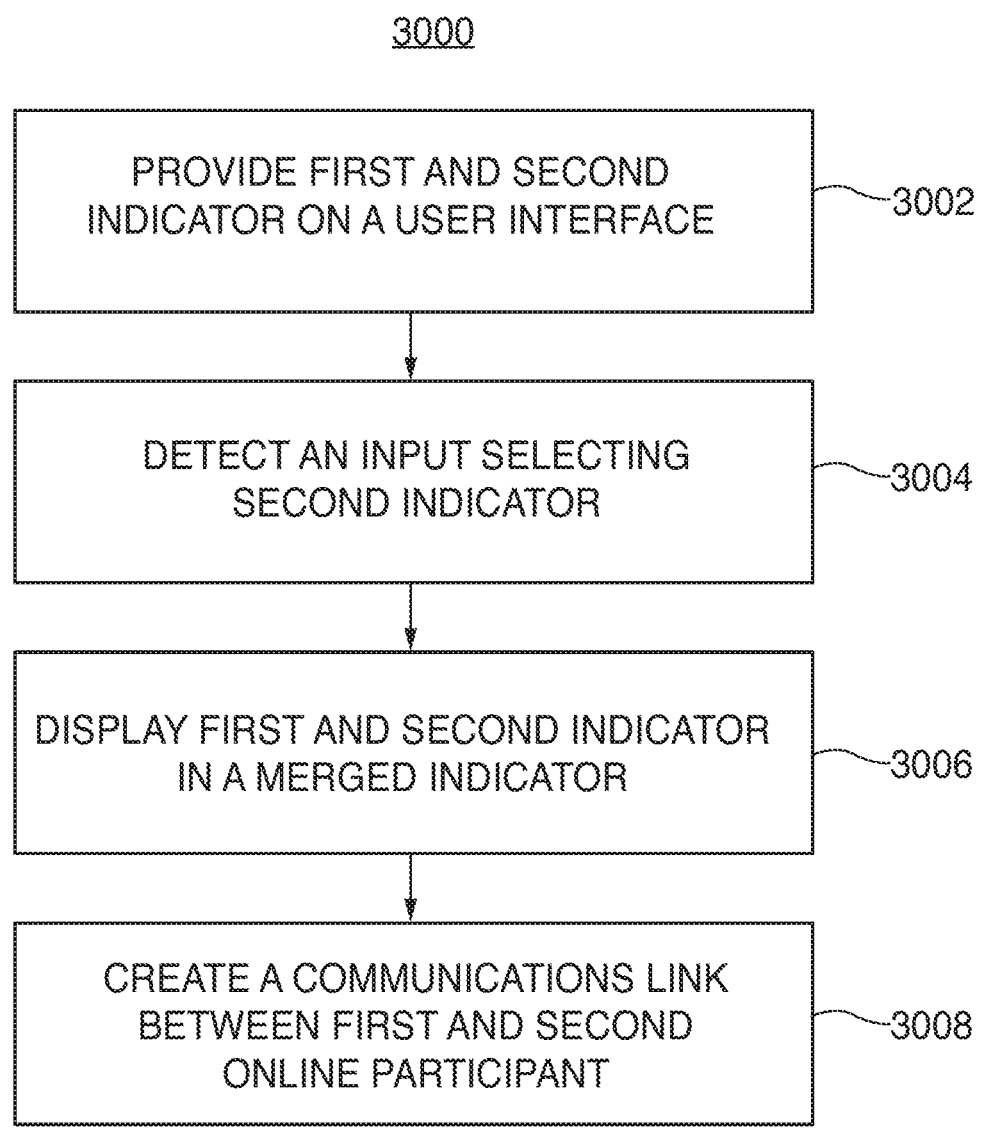
FIG. 30 is an illustrative flowchart of a process for forming group communications in accordance with various embodiments.

FIG. 30 is an illustrative flowchart of a process for forming group communications in accordance with various embodiments. Process 3000 may begin at step 3002. At step 3002, a first indicator corresponding to a first online participant of an event and a second indicator corresponding to a second online participant of an event may be provided on a user interface. For example, user interface 2100 of FIG. 21 may be provided with indicators 2102 and 2104.

In some embodiments, the online participants corresponding to the indicators displayed on the user interface may each be placed in a first communication mode upon accessing the online event. For example, each online participant may be placed in an instant ready-on mode of communication after they have logged into the online event.

In some embodiments, the user interface may be presented on a display screen of a user device, such as user device 200 of FIG. 2. The display screen may be a touch-sensing display, or touchscreen, that allows the user to interact with the user interface by touching the display. Various types of touch-sensing displays may include, but are not limited to, resistive touchscreens, surface acoustic wave ("SAW") touchscreens, capacitive touchscreens, infrared touchscreens, optical touchscreens, dispersive signal touchscreens, or any other type of touchscreen technology, or any combination thereof.

At step 3004, an input may be detected on the display screen presenting the user interface that selects the second indicator. For example, a user may press a finger on the display screen about the area where user interface 2100 presents indicator 2104. The detected input by the finger may be received by the display screen and processed by one or more processors of the user device. In some embodiments, a signal may be sent to a server or a host device in response to the input being detected on the display screen. For example, if the online event is hosted on a server and displayed on a user device, inputs detected by the user device corresponding to the online event may be relied to the server so that the server maintains awareness of each devices interactions within the online event.

In some embodiments, the detected input may correspond to a swipe, a flick, or a drag performed by a user of the user device. For example, the user may drag indicator 2104 along line 2110 towards indicator 2102. In some embodiments, the detected input may instead correspond to the user clicking on the indicator with a mouse or inputting an executable command into a terminal window. However, persons of ordinary skill in the art will recognize that any input may be detected by the user device, and the aforementioned are merely exemplary.

At step 3006, the first and second indicators may be displayed together in a merged display. For example, user interface 2200 may present merged display 2220, which may include indicators 2202 and 2402. Merged display 2220 may correspond to a group including one or more participants of the event. Various examples of merged displays are described with relation to merged displays 2920, 2940, and 2960 of FIG. 29. Persons of ordinary skill in the art will recognize that although only two indicators are displayed within these merged displays, any number of indicators may be included within a group's merged display.

In some embodiments, steps 3004 and steps 3006 may occur at a substantially same time. For example, the input may be detected and the merged display may displayed at a substantially same time.

At step 3008, a communication link may be created between the first online participant and the second online participant. In some embodiments, the communication link may be created in response to the input being detected and/or the merged display being displayed. For example, upon the formation of a group represented by merged display 2220, a communication link may be formed between the online participants corresponding to indicators 2202 and 2204. The communication link may allow the online participants to send and/or receive robust communications with one another. In some embodiments, the creation of the communication link may be in addition to the original communication previously established upon accessing the online event. For example, upon accessing the online event each online participant may be placed in a first communication mode with some or all of the other online participants also accessing the event. In addition to the online participants being placed in the first communication mode with one another, the created communication link may be created to allow the online participants within the group being placed in a second communication mode with one another while still being in a first communication mode with some or all of the other online participants accessing the event.

In some embodiments, in response to being placed in the group, the corresponding online participants may have their communications mode changed from a first communication mode to a second communication mode. For example, as previously mentioned, the online participants corresponding to indicators 2102 and 2104 may initially be in a first communication mode, such as an instant ready-on mode of communication. In response to being placed in a group together and displayed in a merged display, the online participants may have their communications mode changed to be in a second communication mode, such as an intermediate or active mode of communication. In the second mode of communication, the online participants may be capable of receiving and/or transmitting communications with one another at a higher priority level and with more robust capabilities than previously when in the first communication mode.

Figure 31:
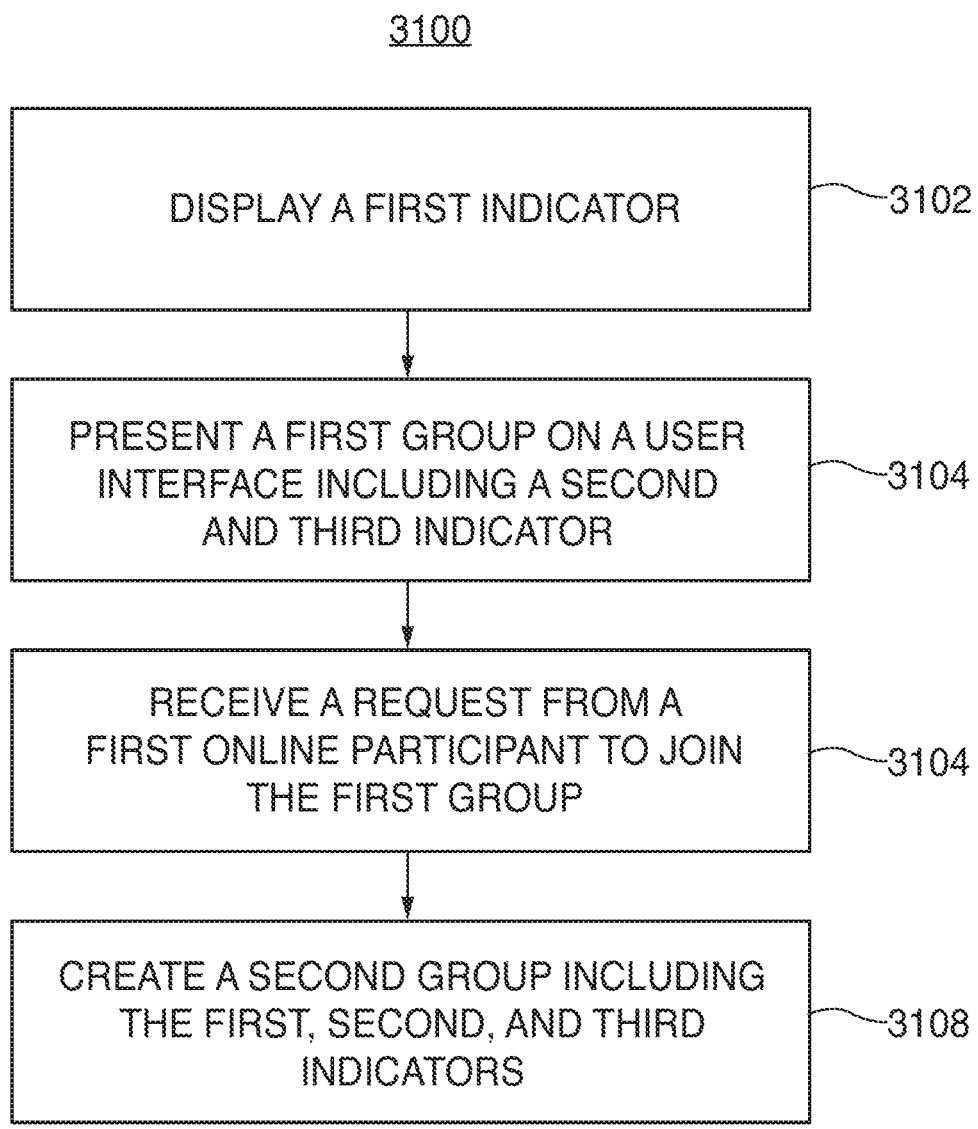
FIG. 31 is another illustrative flowchart of a process for forming group communications in accordance with various embodiments.

FIG. 31 is another illustrative flowchart of a process for forming group communications in accordance with various embodiments. Process 3100 may begin at step 3102. At step 3102, a first indicator may be displayed within a user interface presented on a display screen of a user device. For example, first indicator 2502, corresponding to a first online participant, may be displayed on user interface 2500. In some embodiments, the first online participant may be a presenter or event administrator for the online event. For example, the online event may be an online class and indicator 2502 may correspond to a teacher of the class.

In some embodiments, the first online participant may be in a first communication mode with some or all of the additional online participants accessing the online event. For example, the first online participant may be in an instant ready-on mode of communication with each additional online participant of the event. This may allow the user to receive/transmit communications with any online participant of the event. This may also allow the user to easily change into another communication mode upon request or in response to certain actions. For example, if a user wants to start a video chat with another user, that user's communication mode may be upgraded to an active mode of communication to allow the user to transmit and receive video communications. In this scenario, a new communication link may not need to be established, as the instant ready-on mode of communication may allow the user's communication link to be upgraded.

At step 3104, a first merged display corresponding to a first group may be presented on the user interface. In some embodiments, the first merged display may include a second indicator and a third indicator that respectively correspond to a second online participant and a third online participant accessing the online event. For example, user interface 2500 may present merged display 2520, which may include indicators 2504 and 2506.

In some embodiments, the first online participant may initially be in the first communication mode with each of the second and third online participants. For example, if the first online participant corresponds to a teacher of an online class, the teacher may present contextual materials to each student of the online class using the first communication mode. In some embodiments, the second and third online participants of merged display 2220 may be in a second communication mode with one another. For example, the second and third online participants may be capable of receiving/transmitting robust video communications with one another in the second communication mode. In some embodiments, online participants in a group may be in one communication mode with the other group members while being in another communication mode with the other online participants of the event.

At step 3106, a request may be received by a server hosting the online event from the first online participant to join the first group. For example, in response to viewing merged display 2520 on user interface 2500, the first online participant corresponding to indicator 2502 may request to join the group corresponding to merged display 2520. The request may be made using any suitable mechanism. For example, the online participant requesting to join the group may select merged display 2520 or any of the corresponding group members (e.g., second and third online participants). In some embodiments, in response to requesting to join the group, the user device displaying the user interface may send a signal to the server hosting the online event indicating the online participants desire to join the group. In this particular scenario, the server may, in turn, send a notification to some or all of the group members, notifying them of the pending request. However, in some embodiments, the request to join the group may be sent directly from the online participant's user device to some or all of the corresponding group members' user devices.

In response to the request being sent to each group members' user device (e.g., from the server and/or requesting participant's device), a notification may be provided to the corresponding group member indicating the requesting participant's desire to join the group. In some embodiments, the group members may collectively vote to allow the participant join the group or a single group member may be designated to "speak" for the group (e.g., one group member may control allow voting powers).

As an illustrative example, a user may view merged display 2520 on their user interface and may recognize that some of his/her friends are in the group. The user may then attempt to join the group by clicking on one of his/her friends' indicators. In response to clicking on the indicator (s), the friends may presented with a notification on their user interface that provides them with options to allow or deny the requesting user to join the group. In some embodiments, both friends may have to allow the requesting user to join the group, or a single friend may be able to allow the requesting user to join the group.

At step 3108, a second merged display corresponding to a second group may be created that includes the first indicator, the second indicator, and the third indicator. The second group may be displayed on a user interface after it has been created. For example, merged display 2420 of FIG. 24 may be presented in response to the first online participant's request to join the group, which includes the second and third online participant, being granted.

In some embodiments, in response to joining the group, the first online participant's communication mode may be changed from the first communication mode to the second communication mode. For example, initially the first online participant may have been in an instant ready-on mode of communication and the members of the group may have been in an active mode of communication. In response to joining the group, the first online participant's communication mode may upgrade from the instant ready-on mode of communication to the active mode of communication.

In some embodiments, the created second group may be substantially similar to the first group. For example, the second group may be substantially similar to the first group with the exception that the it may now include the added first indicator displayed within it on the user interface. In this particular scenario, a "separate" second group may not be formed and displayed within the user interface, and the original group may simply have the additional indicator added to its displayed merged display. However, persons of ordinary skill in the art will recognize that both the original first group and the created second group may be displayed simultaneously on the user interface.

Figure 32:
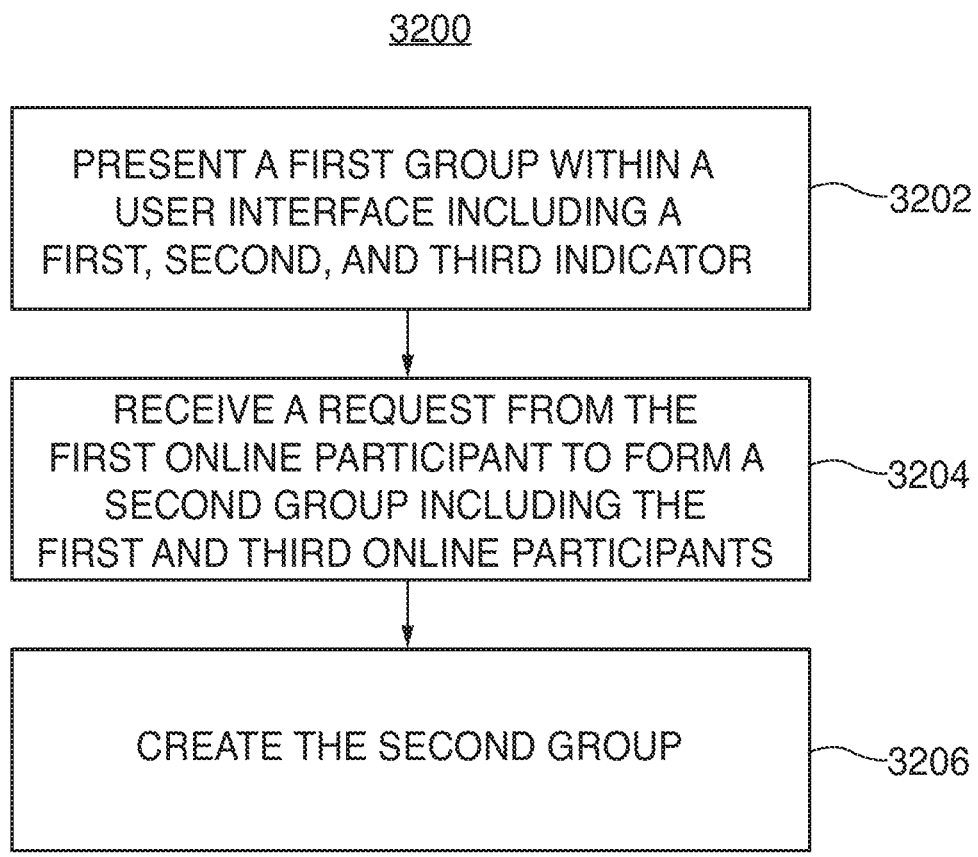
FIG. 32 is still another illustrative flowchart of a process for forming group communications in accordance with various embodiments.

FIG. 32 is still another illustrative flowchart of a process for forming group communications in accordance with various embodiments. Process 3200 may begin at step 3202. At step 3202, an online event may be displayed on a user interface including a first merged display corresponding to a first group, where the user interface may be displayed on a user device. The first merged display may, in some embodiments, include a first indicator corresponding to a first online participant, a second indicator corresponding to a second online participant, and a third indicator corresponding to a third online participant accessing the online event. For example, merged display 2420 of FIG. 24 may be displayed on user interface 2400, and may include first indicator 2402, second indicator 2404, and third indicator 2406. In some embodiments, step 3202 may be substantially similar to step 3108 of FIG. 31, and the previous description may apply.

At step 3204, a request may be received from the first online participant for a second group to be formed including both the first online participant and the third online participant. For example, the first online participant corresponding to indicator 2402 may send a request to the third online participant corresponding to indicator 2406 to form a second group.

At step 3206, the second group may be created. For example, a sub-group corresponding to merged display 2630 of FIG. 26 may be created in response to the first and third online participants accepting the request to form the subgroup. In some embodiments, the second group may be displayed on the user interface of the user device. For example, user interface 2600 may present the online event including merged display 2620, which includes second indicator 2604, corresponding to the second online participant, as well as merged display 2630, which includes indicators 2602 and 2606 respectively corresponding to the first and third online participants.

In some embodiments, the request to form a group may be for the first and third online participants to form a sub-group within the group they are already members of. For example, the first and third online participants may form the sub-group in response to the first online participant's request to form the sub-group with the third online participant being accepted. In this particular scenario, both of the first and third online participant may still remain in a group with the second online participant. For example, merged display 2620 may include indicator 2604, corresponding to the second online participant, as well as indicators 2602 and 2606, respectively corresponding to the first and third online participants, who may be members of the sub-group. In some embodiments, the second online participant may be unaware of the sub-group's formation as merged display 2630 may not be visible on the display screen of non-members of the sub-group.

In some embodiments, each of the first, second, and third online participants located within the group may be in a first communication mode with one another, such as an active mode of communication. This may, for example, allow the group members to communicate with one another at a higher priority level than communications the group members may receive from other online participants of the event. However, in response to forming a sub-group, the first and third online participants may be placed in a second mode of communication with one another. In the second mode of communication, the first and third online participants may be able to transmit and receive communications between one another at a higher priority level than communications transmitted and received between the members of the group. In some embodiments, the first and third online participants in the sub-group may be in the second mode of communication with one another, while also being in the first mode of communication with the second online participant in the group. For example, communications transmitted from the third online participant to the first online participant may receive a higher prioritization than communications transmitted from the second online participant to the first online participant.

Figure 33:
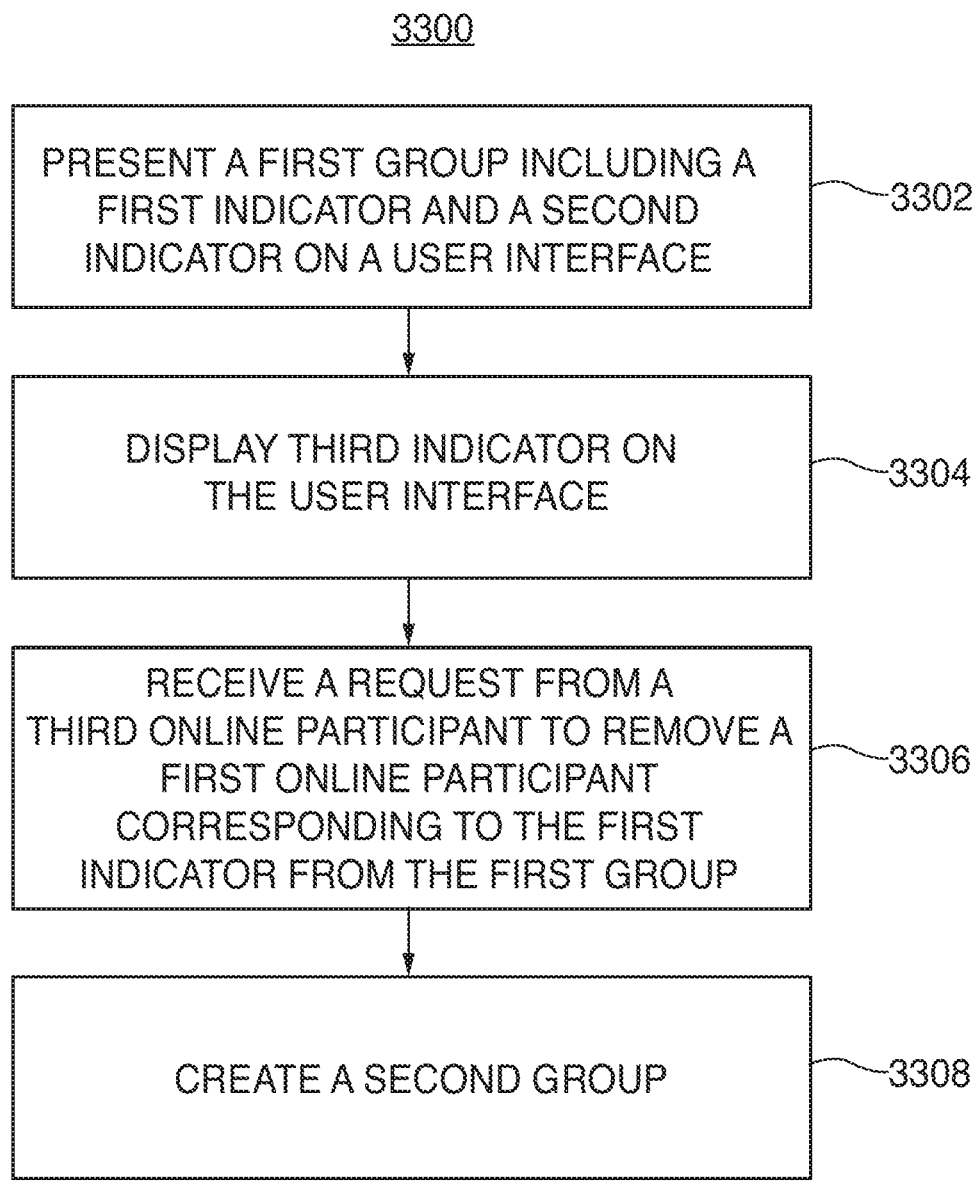
FIG. 33 is still yet another illustrative flowchart of a process for forming group communications in accordance with various embodiments.

FIG. 33 is still yet another illustrative flowchart of a process for forming group communications in accordance with various embodiments. Process 3300 may begin at step 3302. At step 3302, a first merged display corresponding to a first group may be presented on a user interface displaying an online event presented on a display screen of a user device. The first merged display may include a first indicator, corresponding to a first online participant of the online event, and a second indicator, corresponding to a second online participant of the online event. For example, user interface 2700 may include merged display 2720. Merged display 2720 may include first indicator 2702, corresponding to a first online participant of the event, as well as second indicator 2704, corresponding to a second online participant of the event.

At step 3304, a third indicator corresponding to a third online participant of the online event may be displayed on the user interface. For example, third indicator 2706 may be displayed on user interface 2700.

At step 3306, the third online participant may send a request to the server hosting the online event asking that the first online participant be removed from the first group. For example, the third online participant may see merged display 2720 on their user interface, and may notice that one of their friends. In this particular scenario, the third online participant may select the indicator corresponding to their friend's online participant to try and form a group with that person.

In some embodiments, the requesting participant may seek to only form a group with the online participant(s) that they have selected. For example, the third online participant corresponding to indicator 2706 may click on indicator 2704 corresponding to the second online participant. In response to clicking on indicator 2704, the third online participant may send a request to the server hosting the online event that indicates their desire to form a group with that user. The server may then send a notification to the second online participant to inform them that the third online participant seeks to start a group with them. The second online participant may then accept or reject the request.

In some embodiments, a user of the user device may select an indicator corresponding to an online participant who may already be in a group (e.g., indicator 2704), and in response to that user's selection, the online participant may be removed from their current group. For example, a host or event administrator may be capable of controlling groups and therefore if they select a particular participant to join a group, the server may automatically cause that participant to leave their current group and join the new group without asking permission. However, persons of ordinary skill in the art will recognize that any selection technique may be used.

At step 3308, a second group may be created that includes the second online participant and the third online participant. For example, merged display 2820 may include indicators 2804 and 2806, which respectively correspond to the second and third online participants. In this particular scenario, the second online participant may have been removed from their initial group, which included the first and second online participants, and placed in the second group.

The various embodiments described herein may be implemented using a variety of means including, but not limited to, software, hardware, and/or a combination of software and hardware. The embodiments may also be embodied as computer readable code on a computer readable medium. The computer readable medium may be any data storage device that is capable of storing data that can be read by a computer system. Various types of computer readable media include, but are not limited to, read-only memory, random-access memory, CD-ROMs, DVDs, magnetic tape, or optical data storage devices, or any other type of medium, or any combination thereof. The computer readable medium may be distributed over network-coupled computer systems. Furthermore, the above described embodiments are presented for the purposes of illustration are not to be construed as limitations.

What is claimed is:

1. A method for combining user communications for a plurality of online participants of a real-time online event, comprising:

providing, on a user interface, a real-time online event window comprising real-time communications from a first online participant accessing the online event, a second online participant accessing the online event, and a third online participant accessing the online event;

detecting an input from the first online participant using the user interface, the input corresponding to a selection of a second indicator representing the second online participant;

presenting, in response to the input, a merged display on the user interface such that the merged display is seen by any of the plurality of online participants, wherein the merged display displays a first indicator representing the first online participant located proximate the second indicator representing the second online participant, and comprises a first real-time audiovisual stream from the first online participant and a second real-time audiovisual stream from the second online participant; and creating, in response to the input, a separate communications link between the first online participant and the second participant such that the first online participant and the second online participant at least one of:
transmit prioritized communications to one another; and
receive prioritized communications from one another.

2. The method of claim 1, wherein the merged display overlaps the online event window.

3. The method of claim 2, wherein the first audiovisual stream comprises at least one of:
an audio stream and an image received from a first user device corresponding to the first online participant; and
a video stream received from the first user device.

4. The method of claim 1, wherein creating the separate communications link comprises maintaining a first communications link between the first online participant, the second online participant, and the third online participant such that additional real-time communications continue to be at least one of sent and received within the online event window from at least one of the first online participant, the second online participant, and the third online participant.

5. The method of claim 4, further comprising:
transmitting any additional real-time communications directed to at least one of the first online participant and second online participant at a lower priority level than the prioritized communications.

6. The method of claim 5, wherein the additional real-time communications comprise at least one of:
communications from the third online participant;
communications from the plurality of online participants each accessing the online event; and
communications from at least one online participant within a group of online participants comprising at least one of the first online participant and the second online participant.

7. The method of claim 1, wherein the user interface is displayed on at least one of:
a first user device corresponding to the first online participant; and
a second user device corresponding, to the second online participant.

8. The method of claim 1, wherein the merged display displays at least one of:
the first indicator and the second indicator converged into a single third indicator;
the first indicator overlapping at least a portion of the second indicator; and
the second indicator overlapping at least a portion of the first indicator.

9. The method of claim 8, wherein:
the first indicator comprises video corresponding to the first online participant; and
the second indicator comprises video corresponding to the second online participant.

10. The method of claim 7, wherein:
the user interface is displayed on a touch-sensitive display screen; and
the input is detected via the touch-sensing display screen.

11. A non-transitory computer readable medium containing instructions that, when executed by at least one processor of a device, cause the device to:
provide, on a user interface, a real-time online event window comprising real-time communications from a plurality of online participants of a real-time online event comprising a first online participant accessing the online event, a second online participant accessing the online event, and a third online participant accessing the online event;
detect an input from the first online participant using the user interface, the input corresponding to a selection of an indicator representing the second online participant;
present, in response to the input, a merged display on the user interface such that the merged display is seen by any of the plurality of online participants, wherein the merged display displays a first indicator representing the first online participant located proximate the second indicator representing the second online participant, and comprises a first real-time audiovisual stream from the first online participant and a second real-time audiovisual stream from the second online participant; and
create, in response to the input, a separate communications link between the first online participant and the second participant such that the first online participant and the second online participant at least one of:
transmit prioritized communications to one another; and
receive prioritized communications from one another.

12. The non-transitory computer readable medium of claim 11, wherein the merged display overlaps the online event window.

13. The non-transitory computer readable medium of claim 12, wherein the first audiovisual stream comprises at least one of:
an audio stream and an image received from a first user device corresponding to the first online participant; and
a video stream received from the first user device.

14. The non-transitory computer readable medium of claim 11, wherein creating the separate communications link comprises maintaining a first communications link between the first online participant, the second online participant, and the third online participant such that additional real-time communications continue to be at least one of sent and received within the online event window from at least one of the first online participant, the second online participant, and the third online participant.

15. The non-transitory computer readable medium of claim 14, containing further instruction that, when executed by the at least one processor of the device, further cause the device to:
transmit any additional real-time communications directed to at least one of the first online participant and second online participant at a lower priority level than the prioritized communications.

16. The non-transitory computer readable medium of claim 15, wherein the additional real-time communications comprise at least one of:
communications from the third online participant;
communications from the plurality of online participants each accessing the online event; and
communications from at least one online participant within a group of online participants comprising at least one of the first online participant and the second online participant.

17. The non-transitory computer readable medium of claim 11, wherein the user interface is displayed on at least one of:
a first user device corresponding to the first online participant; and
a second user device corresponding to the second online participant.

18. The non-transitory computer readable medium of claim 11, wherein the merged display displays at least one of:

the first indicator and the second indicator converged into a single third indicator;

the first indicator overlapping at least a portion of the second indicator; and the second indicator overlapping at least a portion of the first indicator.

19. The non-transitory computer readable medium of claim 18, wherein:

the first indicator comprises video corresponding to the first online participant; and the second indicator comprises video corresponding to the second online participant.

20. The non-transitory computer readable medium of claim 11, wherein:

the user interface is displayed on a touch-sensitive display screen; and the input is detected via the touch-sensing display screen.

21. A device for combining user communications, comprising:

a touch-sensitive display screen;

storage;

communication circuitry; and at least one processor operable to:

provide, on a user interface, a real-time online event window comprising real-time communications from a plurality of online participants of a real-time online event comprising a first online participant accessing the online event, a second online participant accessing the online event, and a third online participant accessing the online event;

detect an input from the first online participant using the user interface, the input corresponding to a selection of an indicator representing the second online participant;

present, in response to the input, a merged display on the user interface such that the merged display is seen by any of the plurality of online participants, wherein the merged display displays a first indicator representing the first online participant located proximate the second indicator representing the second online participant, and comprises a first real-time audiovisual stream from the first online participant and a second real-time audiovisual stream from the second online participant; and create, in response to the input, a separate communications link between the first online participant and the second participant such that the first online participant and the second online participant at least one of:

transmit prioritized communications to one another; and receive prioritized communications from one another.

* * * * *